(12) United States Patent
Sare et al.

(10) Patent No.: US 6,652,642 B2
(45) Date of Patent: Nov. 25, 2003

(54) CALCINED KAOLIN PIGMENTS HAVING IMPROVED COMBINATION OF PHYSICAL AND APPLIED PROPERTIES, THEIR PRODUCTION AND USE

(75) Inventors: Edward J. Sare, Macon, GA (US); Stephen C. Raper, Byron, GA (US); Tommy L. Adkins, Cochran, GA (US); Julie Figlar, Macon, GA (US)

(73) Assignee: Imerys Kaolin, Inc., Roswell, GA (US)

( * ) Notice: Subject to any disclaimer, the term of this patent is extended or adjusted under 35 U.S.C. 154(b) by 11 days.

(21) Appl. No.: 09/978,203

(22) Filed: Jan. 16, 2002

(65) Prior Publication Data

US 2002/0088376 A1 Jul. 11, 2002

Related U.S. Application Data

(60) Provisional application No. 60/240,861, filed on Oct. 17, 2000.

(51) Int. Cl.[7] ............................................... C04B 14/10
(52) U.S. Cl. ....................................... 106/486; 106/484
(58) Field of Search .................................. 106/486, 484

(56) References Cited

U.S. PATENT DOCUMENTS

| | | |
|---|---|---|
| 2,992,936 A | 7/1961 | Rowland |
| 3,586,523 A | 6/1971 | Fanselow et al. |
| 4,154,899 A | 5/1979 | Hershey et al. |
| 4,196,012 A | 4/1980 | Windle |
| 4,400,372 A | 8/1983 | Muhler et al. |
| 4,427,450 A * | 1/1984 | Kostsnsek ................... 106/486 |
| 4,898,620 A | 2/1990 | Rayfield et al. |
| 4,906,300 A | 3/1990 | Rice |
| 5,007,964 A | 4/1991 | Tsukisaka et al. |
| 5,011,534 A | 4/1991 | Berube et al. |
| 5,120,365 A | 6/1992 | Kogler |
| 5,151,124 A | 9/1992 | Rice |
| 5,236,989 A | 8/1993 | Brown et al. |
| 5,458,680 A | 10/1995 | Shurling, Jr. et al. |
| 5,645,635 A | 7/1997 | Behl et al. |
| 5,861,209 A | 1/1999 | Haskins et al. |
| 5,882,396 A * | 3/1999 | Hiorns ........................ 106/464 |

(List continued on next page.)

FOREIGN PATENT DOCUMENTS

| | | |
|---|---|---|
| EP | 0777014 | 4/1997 |
| GB | 498421 | 1/1939 |
| GB | 1223414 | 2/1971 |
| GB | 1 253 603 | 11/1971 |
| GB | 1 364 105 | 8/1974 |
| GB | 2 179956 A | 3/1987 |
| GB | 2 277 743 A | 9/1994 |
| WO | 99/24360 | 5/1999 |
| WO | 00/62886 | 10/2000 |

OTHER PUBLICATIONS

Zeller, Robert C., "Optical Properties of Calcium Carbonate in Paper Coating," *Coat. Conf. [Proc.]*, 1980, pp. 103–109. (Articel abstracted by CAS on Database CAPLUS on STN, AN: 1980:448867 CAPLUS).

*Primary Examiner*—C. Melissa Koslow
*Assistant Examiner*—Shalie Manlove
(74) *Attorney, Agent, or Firm*—Finnegan, Henderson, Farabow, Garrett & Dunner, L.L.P.

(57) ABSTRACT

The present invention relates to calcined kaolin products, their production, and use. More specifically, the invention relates to calcined kaolin-containing products having a median diameter particle size of from about 0.5 μm to about 10 μm, and a multimodal particle size distribution defined herein. The calcined kaolin products of the invention possess a combination of physical properties and applied properties not previously seen together in calcined kaolin pigments. The products according to the invention find use as flattening (or matting) agents, and as fillers or extenders in paint and coating compositions. More generally, the inventive products may be used wherever calcined kaolins are used.

55 Claims, 68 Drawing Sheets

U.S. PATENT DOCUMENTS

| | | |
|---|---|---|
| 5,938,833 A | 8/1999 | Willis et al. |
| 6,103,005 A | 8/2000 | Sare et al. |
| 6,136,086 A | 10/2000 | Hen et al. |
| 6,149,723 A | 11/2000 | Pruett et al. |
| 6,150,289 A | 11/2000 | Chen et al. |
| 6,156,117 A | 12/2000 | Freeman et al. |
| 6,183,858 B1 | 2/2001 | Kanazaki |
| 6,203,894 B1 | 3/2001 | Chao et al. |

\* cited by examiner

CALCINED KAOLIN PIGMENTS HAVING IMPROVED COMBINATION OF PHYSICAL AND APPLIED PROPERTIES, THEIR PRODUCTION AND USE

RELATED APPLICATIONS

This application claims the benefits of provisional U.S. Application No. 60/240,861, filed Oct. 17, 2000.

FIELD OF THE INVENTION

The present invention relates to calcined kaolin products, their production, and use. More specifically, the invention relates to calcined kaolin products having an apparent mean particle size of from about 0.5 μm to about 10 μm, and a multimodal particle size distribution defined herein. The calcined kaolin products of the invention possess a combination of physical and applied properties not previously seen together in calcined kaolin containing pigments. The products according to the invention find use as flattening (or matting) agents, and as fillers or extenders in paint and coating compositions. More generally, the inventive products may be used wherever calcined kaolins are used.

BACKGROUND OF THE INVENTION

Particulate kaolins exist naturally in the hydrous form. In this form, kaolinite minerals form crystal structures that are linked together by hydroxyl containing moieties. Particulate kaolins may be converted to a calcined form by thermal processes. Such processes result in a dehydroxylation of the kaolin and an aggregation of the particles, and convert the crystal structure to an amorphous form.

Calcined kaolins inure benefits to application composition, such as improved opacity, compared with other pigments, e.g. calcium carbonate and hydrous kaolins. Accordingly, calcined kaolins find widespread use as pigments in paints, plastics, rubbers, sealants, ceramics, cementitious products, and other application compositions. Specifically, calcined kaolins confer desirable physical and optical (applied) properties to such compositions. As flattening (or matting) agents, they help to control the gloss and sheen of the surfaces of the substrates to which they are applied. As opacifiers, they impart brightness, whiteness, and other desirable optical properties. As extenders, they allow partial replacement of titanium dioxide and other more expensive pigments with minimal loss of whiteness or opacity.

Generally, the properties of kaolin pigments are influenced by the morphology of the particles that make up the pigment. Kaolin particle morphology for both hydrous and calcined kaolins is influenced by such factors as the size (expressed in terms of particle size distribution, or PSD, and median particle size), shape, and texture of the individual particles and of agglomerates thereof. Thus, kaolin pigments having a large percentage of small, or fine, calcined kaolin particles and a narrow PSD are known to make good opacifiers. See, e.g., Berube et al., U.S. Pat. No. 5,011,534, and Fanselow et al., U.S. Pat. No. 3,586,523. In contrast, calcined kaolins having relatively large, or coarse, particle size are known to be useful in making good paint compositions. See, e.g., Sare et al., U.S. Pat. No. 6,103,005.

A need in the art exists for calcined kaolin pigments that possess both good optical and physical properties in a single pigment product, however. The present invention satisfies this need. It provides a pigment having the characteristics of a flattening agent and opacifying agent in a single product. The pigments of the invention possess other useful qualities as well.

SUMMARY OF THE INVENTION

The present invention provides calcined kaolin products that embody a combination of physical and optical properties not previously available in a single calcined kaolin composition. More specifically, the calcined kaolin products of the invention possess a unique combination of good flattening (or matting) characteristics and good optical characteristics compared to previously available calcined kaolin pigments. The inventive products also serve as extenders, allowing the partial replacement of expensive titanium dioxide pigments without unacceptable loss of opacity or tint strength.

The calcined kaolin products of the invention are suited for use in paint or coating compositions in which any one of these characteristics are desired. They are particularly suited for use as pigments in paint or coating compositions in which a combination of two or more of these characteristics are desired. The products of the invention may also be useful wherever kaolins are used, such as in making filled plastics, rubbers, sealants, cables, ceramic products, cementitious products, and paper products and paper coatings.

In one embodiment, the inventive product comprises a blend of at least one calcined kaolin component and at least one calcined or hydrous kaolin component. The resulting blend will have a median particle size of from about 0.5 μm (micrometers or microns) to about 10 μm, and a multimodal particle size distribution (PSD). The multimodal PSD, when measured using SEDIGRAPH 5100, will exhibit at least two distinguishable components (or modes) of the composition: at least one of the distinguishable components will correspond to a fine calcined or hydrous kaolin component and occur at a particle size less than about 1 μm, and at least one other of the distinguishable components will correspond to a coarse calcined or hydrous kaolin component and occur at a particle size of greater than about 2 μm.

The blended products of this embodiment may be made by a method comprising:
 (a) obtaining a coarse calcined or hydrous kaolin having a mean particle size greater than about 2 μm;
 (b) obtaining a fine calcined or hydrous kaolin having a mean particle size less than about 1 μm; provided that at least one of said components (a) or (b) comprise calcined kaolin, and
 (c) blending the coarse kaolin of (a) and the fine kaolin of (b) to produce the pigment product.

The product of this method may be referred to as a blended product, reflecting the fact that at least one of the coarse or fine feeds has been calcined prior to blending.

In another embodiment, the inventive product comprises a co-calcined kaolin composition having median diameter particle size of from about 0.5 μm to about 10 μm and a multimodal particle size distribution. The multimodal particle size distribution, when measured using SEDIGRAPH 5100, will exhibit at least two distinguishable components (or modes) of the composition: at least one distinguishable component will correspond to a fine calcined component and occur at a particle size less than about 1 μm, and at least one other distinguishable component will correspond to a coarse calcined component and occur at a particle size greater than about 2 μm.

The calcined kaolin containing products of this embodiment may be made by blending a coarse hydrous kaolin and fine hydrous kaolin components and then calcining the blend. More specifically, the products of this embodiment may be made by a method comprising:
 (a) obtaining a coarse hydrous kaolin having a mean particle size greater than about 2 μm;

(b) obtaining a fine hydrous kaolin having a mean particle size less than about 1 μm; and (c) blending the coarse hydrous kaolin of (a) and the fine hydrous kaolin of (b); and (d) calcining the blend of (c) to produce the pigment product.

The product of this method may be referred to as a co-calcined product, reflecting the fact that the coarse and fine hydrous kaolin feeds have been blended prior to calcining.

The present invention also provides paint compositions and coated products comprising the pigments of the invention. More detailed expositions and examples of these and other aspects of the invention are provided below. It is to be understood that both the foregoing general description and the following detailed description are exemplary and explanatory only and are not restrictive of the invention, as claimed.

DETAILED DESCRIPTION OF THE INVENTION

Figure 1:
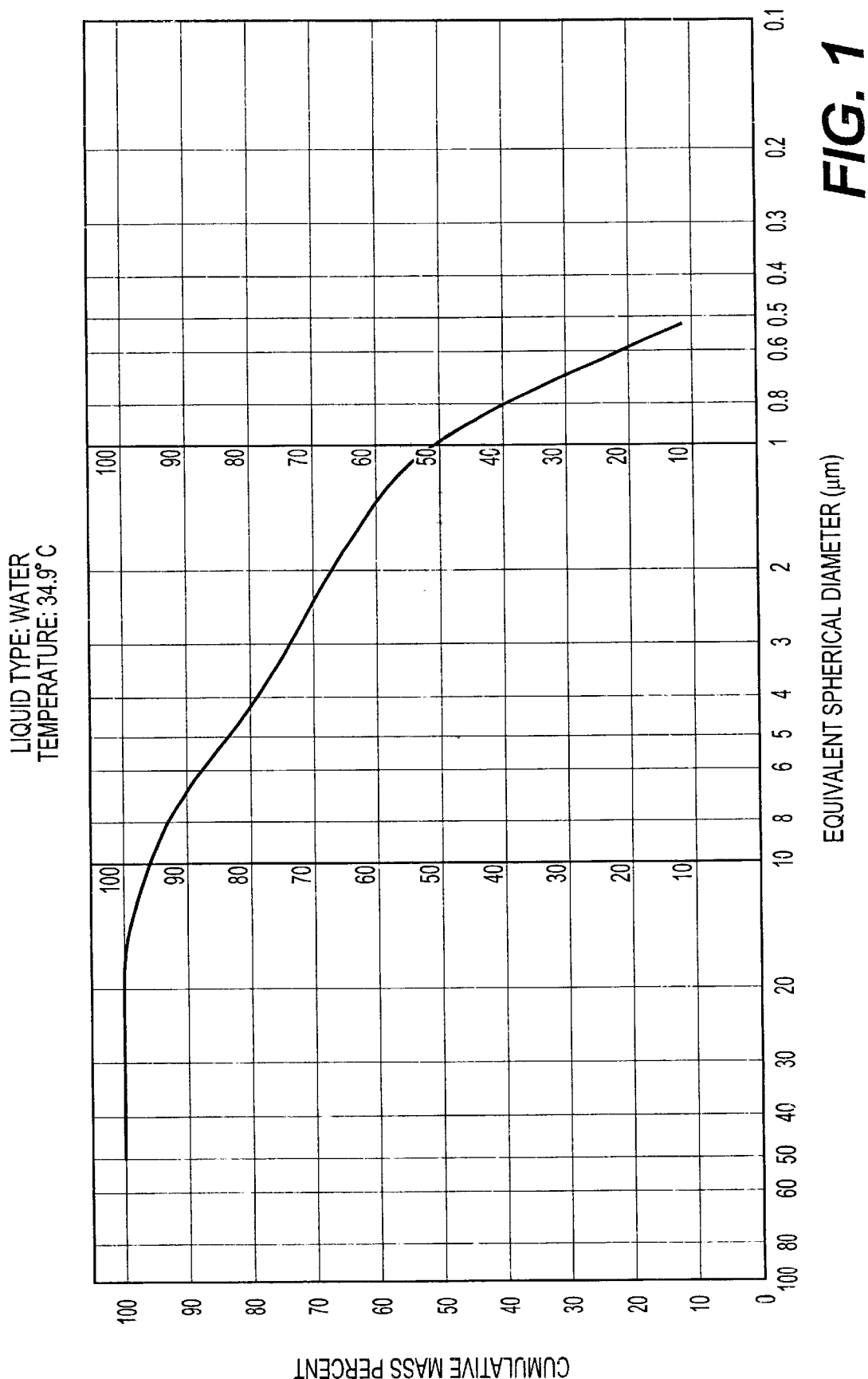
FIG. 1 depicts a SEDIGRAPH 5100 plot for the calcined kaolin product of Example 1.

The particle sizes referred to in this disclosure are measured by techniques capable of revealing the multimodal character of the compositions' PSD. Particle sizes referred to in this disclosure are measured, and expressed, as "equivalent spherical diameter," or "ESD." Median particle size is the value, $d_{50}$, at which there are 50% by weight of the particles present in the composition which have an ESD less than that value, as determined by the well-known SEDIGRAPH 5100 machine method. All PSD data measured and reported in this disclosure, including in the examples and the Figures, were taken in a known manner, with measurements made in water at the standard temperature of 34.9° C. It is to be noted that all percentages and amounts expressed herein are by weight. All amounts, percentages, and ranges expressed herein are approximate.

Particle size distributions may be expressed or plotted in conventional SEDIGRAPH 5100 plots as the cumulative percentage (%) of particles finer than a given size, versus particle size (ESD). Examples of such plots may be found in the accompanying figures. Alternatively, the PSD of the pigment components may be plotted as a histogram. A histogram, as used herein, is a bar graph showing the percentage (%) by weight of particles having a size (ESD) within a predetermined size increment in a series of increments of varying particle size (ESD) plotted along one axis. The size (ESD) values of the mid-points of the ESD increments plotted along the axis are expressed on a logarithmic scale. Such histograms may be referred to as a "log-normal particle size histogram." Examples of such histograms may also be found in the accompanying figures.

The modality of the particle size distribution is an important feature of the present invention. Modality may be verified by reference to SEDIGRAPH 5100 plots of cumulative mass percent finer than a given particle size vs. diameter. SEDIGRAPH 5100 plots will reveal a multimodal PSD when there is seen at least two distinguishable components, at least one corresponding to the aforementioned coarse component, and at least one corresponding to the aforementioned fine component. Such components may be distinguished by the presence of at least one inflection point, indicating a change in slope in the SEDIGRAPH plot. In terms of the SEDIGRAPH 5100 plots, a multimodal PSD is one where at least two inflection points are seen in the plots. If the PSD contains two inflection points, the PSD will be bimodal.

Alternatively, the modality of the PSD of the present invention may be visualized by reference to the histogram presentation just described. In terms of the histogram, a multimodal PSD is one where at least two peaks are seen in the particle size distribution in the histogram plot. If the PSD contains two peaks, the PSD will be bimodal.

The present invention comprises calcined kaolin containing products having good flattening characteristics and good opacifying characteristics in a single product. In application coating compositions, the inventive products can show an overall combination of optical properties and gloss and sheen control that is better than expected from a simple linear relationship of these properties based on blending of the individual components. In one embodiment, the inventive product comprises a blend of at least one calcined kaolin component and at least one calcined or hydrous kaolin component. The resulting blend will have a median particle size of from about 0.5 μm (micrometers or microns) to about 10 μm, and a multimodal particle size distribution (PSD). The multimodal PSD, when measured using SEDIGRAPH 5100, will exhibit at least two distinguishable components (or modes): at least one of the distinguishable components will correspond to a fine calcined or hydrous kaolin component and occur at a particle size less than about 1 μm, and at least one other of the distinguishable components will correspond to a coarse calcined or hydrous kaolin component and occur at a particle size of greater than about 2 μm.

The blended products of this embodiment may be made by a method comprising:

(a) obtaining a coarse calcined or hydrous kaolin having a mean particle size greater than about 2 μm;

(b) obtaining a fine calcined or hydrous kaolin having a mean particle size less than about 1 μm; with the proviso that at least one of said components (a) or (b) comprise calcined kaolin, and (c) blending the coarse kaolin of (a) and the fine kaolin of (b) to produce the pigment product.

The product of this method may be referred to as a blended product, reflecting the fact that at least one of the coarse or fine feeds has been calcined prior to blending.

In another embodiment, the inventive product comprises a co-calcined kaolin composition having median diameter particle size of from about 0.5 μm to about 10 μm and a multimodal particle size distribution. The multimodal particle size distribution, when measured using SEDIGRAPH 5100, will exhibit at least two distinguishable components: at least one distinguishable component will correspond to a fine calcined component and occur at a particle size less than about 1 μm, and at least one other distinguishable component will correspond to a coarse calcined component and occur at a particle size greater than about 2 μm.

The calcined kaolin containing products of this embodiment may be made by blending a coarse hydrous kaolin and fine hydrous kaolin components and then calcining the blend. More specifically, the products of this embodiment may be made by a method comprising:

(a) obtaining a coarse hydrous kaolin having a mean particle size greater than about 2 μm;

(b) obtaining a fine hydrous kaolin having a mean particle size less than about 1 μm; and (c) blending the coarse hydrous kaolin of (a) and the fine hydrous kaolin of (b); and (d) calcining the blend of (c) to produce the pigment product.

The product of this method may be referred to as a co-calcined product, reflecting the fact that the coarse and fine feeds has been blended prior to calcining.

In the case of the co-calcining method, thorough dry blending may be accomplished by methods known to those skilled in the art. Dry feeds may be pulverized, optionally before, after, or before and after, blending. Spray dried beads must be pulverized prior to blending, according to methods known in the art.

The fine hydrous kaolin and the coarse hydrous kaolin may be blended by methods known in the art. The hydrous coarse and hydrous fine fractions may be in dry or wet form when blended. When in the wet form, each fraction may be in either a dispersed or flocculated state prior to blending. Thus, a flocculated coarse fraction may be blended with a flocculated fine fraction; a dispersed coarse fraction may be blended with a flocculated fine fraction; a dispersed coarse fraction may be blended with a dispersed fine fraction; and/or a flocculated coarse fraction may be blended with a dispersed fine fraction. Compositions comprising blends of coarse hydrous kaolins and fine calcined kaolins are preferred to compositions comprising blends of coarse calcined kaolins and fine hydrous kaolins. A portion of hydrous coarse or fine kaolin may be added to the co-calcined composition as one of several ways to "fine tune" the properties of the final product if desired.

The multimodal character of the inventive products in any of these embodiments reflects the presence of coarse and fine calcined kaolin components, and optionally other kaolins of different PSD as well. When the pigment comprises only a coarse and a fine fraction, the composition will be bimodal. Compositions comprising three or more fractions will be multimodal.

Without wishing to be bound by theory, it is believed that the relative proportions of coarse and fine components, together with their respective mean particle size, give rise to the previously unseen and advantageous combination of physical and optical characteristics. These characteristics may be adjusted by varying the relative amounts of coarse and fine kaolin feed components, by varying the absolute size of the coarse and/or fine feed components, or both. The multimodal character of the present invention will generally be evident when the composition comprises at least about 10% of one component (coarse or fine) and at most about 90% of another. Trimodal (or higher) blends may also give rise to desired characteristics, however. Presently preferred commercial applications comprise greater than about 50% fine component and less than about 50% coarse component.

Thus, compositions comprising blends of from about 10% coarse:about 90% fine to about 90% coarse:about 10% fine will vary, e.g., the resulting pigment's flattening, opacifying, extender, and oil absorbing (or other) characteristics. The pigments' physical characteristics may also be adjusted by varying the absolute size of either, or both, feed components used. Such combinations of optical and physical properties will generally be more evident in pigments comprising about 20% or more fine (or coarse) fraction: about 80% or less coarse (or fine) fraction. Exemplary compositions according to the present invention may be found in the examples below. The examples and Figures presented in this disclosure illustrate, inter alia, the impact of varying the component feed on the pigments' physical and optical properties.

The median particle size of the product, which may be varied as indicated above, is the "apparent" median particle size. The apparent median particle size could be regarded as the weighted average of the particle size of the products' individual components. The proportion of coarse and fine components will vary with the apparent mean particle size, and with the absolute size and relative amounts of coarse and fine feed components. The products according to the invention embody the aforementioned desirable combination of physical and optical characteristics when the composition has a multimodal character and has an apparent mean particle size from about 0.5 μm to about 10 μm, e.g., from about 2 μm to about 10 μm, or from about 0.6 μm to about 1.3 μm.

The size and ratio of the coarse and fine kaolin components may be adjusted to give rise to a final calcined pigment having the desired apparent median particle size and physical characteristics. For instance, when a pigment having high flattening efficiency is desired, then either a higher percentage of coarse component, or a coarse component having a larger mean particle size, or both, is selected. If a pigment having primarily high opacifying efficiency is desired, then either a higher percentage of fine component, or a fine component of smaller mean particle size, or both, may be selected.

A feature of the present invention is the relative difference between the particle size and steepness of the PSD of each of the coarse and fine feeds. Relative mean particle sizes that are sufficiently different to exhibit a multimodal particle size distribution and the combination of physical and optical characteristics fall within the present invention. Further, the steeper (more narrow) the size distribution of the component feed, the smaller the coarse and fine size difference has to be to maintain a multimodal size distribution and fall within the scope of the present invention.

The co-calcining method (and product) may be preferred over the blending method (and product) for economic reasons. Specifically, the former method requires only one calcining procedure, while the latter requires two. It was surprising, however, that the multimodal blend of fine and coarse hydrous kaolin components resulting from the first method provide corresponding "fine" and "coarse" peaks in a multimodal particle size distribution of the calcined product that are similar in particle size to the mean particle size of the corresponding hydrous kaolin components. In other words, it is surprising that calcining after blending ("co-calcining") yields essentially the same product as calcining before blending. Surprisingly little "averaging" of particle sizing occurs during the calcining process.

As used herein, "calcined kaolin" means a kaolin that has been converted from the corresponding (naturally occurring) hydrous kaolin to the dehydroxylated form by thermal methods. Calcination changes, inter alia, the kaolin structure from crystalline to amorphous. Other properties are changed by the calcining process as well. Calcination is effected by heat treating coarse or fine hydrous kaolin in known manner, e.g., at temperatures of from 500° C. to 1200° C., preferably from 800° C. to 1200° C.

The degree to which hydrous kaolin undergoes changes in crystalline form depends on the amount of heat to which hydrous kaolin is subjected. Initially dehydroxylation of the hydrous kaolin occurs upon exposure to heat. At temperatures below a maximum of about 850–900° C., the product is generally considered to be virtually dehydroxylated with the resultant amorphous structure commonly being referred to as being a metakaolin. Frequently, calcination at this temperature is referred to 'partial calcination', and the product may also be referred to as a 'partially calcined kaolin'. Further heating to temperatures above about 900–950° C. results in further structural changes such as densification. Calcination at these higher temperatures is commonly referred to as being 'full calcination', and the product is commonly referred to as 'fully calcined kaolin'. Additional calcination may cause formation of mullite. Mullite concentrations on the order of from 2% to 3% (by weight) present in the composition according to the invention may be useful in some end-use applications, such as catalyst substrates. "Calcined" (or "calcination"), as used in herein, may encompasses any degree of calcination, including partial (meta) and full.

Effective calcining procedures include, but are not limited to, soak calcining and flash calcining. In soak calcining, a hydrous kaolin is heat treated at one of the aforementioned temperatures for a period of time (e.g., from at least 1 minute to 5 or more hours), sufficient to dehydroxylate the kaolin. In flash calcining, a hydrous kaolin is heated rapidly for a period of less than 1 second, typically less than 0.5 second.

The furnace, kiln, or other heating apparatus used to effect calcining of the hydrous kaolin may be of any known kind. Known devices suitable for carrying out soak calcining include high temperature ovens, and rotary and vertical kilns. Known devices for effecting flash calcining include toroidal fluid flow heating devices, such as those described in WO 99/24360, incorporated herein by reference.

In preparing the products of the invention by co-calcination, the size of the desired coarse and fine feeds will be selected to correspond to the size of coarse and fine components, respectively, in the final blend. Where products are prepared by co-calcining, agglomeration of the particles, particularly the fine particles, takes place during calcination. The size of the feed materials may advantageously be selected to take this agglomeration into account. Additional coarse or fine component (or hydrous component) may be added after blending to "fine tune" the properties of the final mixture as well. See for instance Example 3, and FIGS. 5–8, and Tables 6–7, which follow.

Coarse and fine hydrous (or calcined or partially calcined) kaolin particles suitable for feed in the present invention may be prepared by methods known to those skilled in the art. For example, suitable coarse feed may be obtained in a manner suggested in Sare et al., U.S. Pat. No. 6,103,005, incorporated herein by reference in its entirety. For example, feeds suitable as coarse components of the present invention may be obtained by known methods from particles having a median particle size (median equivalent spherical diameter (ESD) as measured on a Sedigraph 5100) of greater than 2.0 microns, greater than 2.25 microns, more preferably greater than 2.5 microns, greater than 2.75 microns, greater than 3.0 microns, greater than 3.25 microns, or greater than 3.5 microns, also having less than or equal to about 10 to 15% less than 0.5 microns.

Suitable fine feed may be obtained in a manner suggested in Fanselow et al., U.S. Pat. No. 3,586,523, incorporated herein by reference in its entirety. Fine particle sized calcined kaolins commonly used in the paper industry are among those suitable as a fine component feed.

When pigments of the invention are prepared by co-calcining, the amount of coarse hydrous kaolin component to be blended and then calcined may constitute from about 10 wt % to about 90 wt % of the coarse:fine blend, while the amount of the fine hydrous kaolin component may vary from about 90 wt % to about 10 wt %. For example, a blend may contain from about 20 wt % to about 80 wt % of a coarse hydrous component, and from about 80 wt % to about 20 wt % of a fine hydrous component. Or, a blend may contain from about 30 wt % to 70 wt % of a coarse hydrous component, and from about 70 wt % to about 30 wt % of a fine hydrous component. In another example, the blend may contain from about 50 wt % to 70 wt % of a coarse hydrous component, and from about 50 wt % to about 30 wt % of a fine hydrous component. The mean particle size of the fine component of the hydrous kaolin blend may vary from about 0.1 μm to about 1.0 μm, optionally from about 0.3 μm to about 0.8 μm, and the mean coarse component of the hydrous kaolin may contain from about 3 μm to about 15 m, optionally from about 3 μm to about 10 μm. Additional amounts of coarse and/or fine feed (hydrous or calcined) may be added to the blend as needed to "fine tune" the properties of the final blend. Corresponding amounts of calcined components may be blended according to the blending method.

The coarse and fine hydrous kaolin components may be blended in dry form or in the form of a wet aqueous slurry. In the former case, the dry feed is advantageously pulverized before and after blending. In the latter case, the resulting slurry hydrous kaolin is desirably dewatered after blending. Dewatering can be carried out using any method, including for example, filtration, prior to calcining. Appropriate dewatering methods would be readily apparent to those skilled in the art. They include, but are not limited to, rotary vacuum filters and filter press. The dewatered product can be dried by methods known to those skilled in the art. The acid-flocced product can be dried by a direct, separate thermal process, e.g., apron drier, and then pulverized prior to calcination. Alternatively, the flocced product can be simultaneously dried and pulverized, e.g., use of a cage drier. Alternatively, the acid-flocced filter product can be re-dispersed, spray-dried, and then pulverized.

The coarse and fine hydrous kaolin components may be blended using apparatus known in the art. The hydrous coarse and hydrous fine fractions may be blended, especially when in slurry form, in either a dispersed or flocculated state. Flocculation may be accomplished by known methods. Such methods include the use of one or more flocculating agents and/or pH adjustment, followed by filtering or other dewatering procedures. Dispersion may be accomplished using known methods, including use of one or more dispersing agents.

The present invention also provides for paint compositions comprising the products of the invention. Such paint compositions may comprise, in addition to the pigments of the invention, a polymeric binder, a primary pigment such as titanium dioxide, optionally a secondary pigment such as calcium carbonate, silica, nephaline syenite, feldspar, dolomite, diatomaceous earth, and flux-calcined diatomaceous earth. For water-based versions of such paint compositions, any water-dispersible binder, such as polyvinyl alcohol (PVA) and acrylics may be used. Paint compositions of the present invention may also comprise other conventional additives, including, but not limited to, surfactants, thickeners, defoamers, wetting agents, dispersants, solvents, and coalescents.

More non-limiting details and embodiments of the invention will be set forth in the examples and tables that follow, and in the accompanying figures.

EXAMPLES

Example 1

Multimodal 60:40 Calcined Pigment (Inventive)

A calcined product having a median diameter of 1.0 μm, made from a blend of fine processed hydrous kaolin having 91.9 wt % finer than 1 μm and a coarse processed hydrous kaolin having 89.2 wt % less than 10 μm, PSD as determined by SEDIGRAPH 5100, was prepared as follows.

Figure 2:
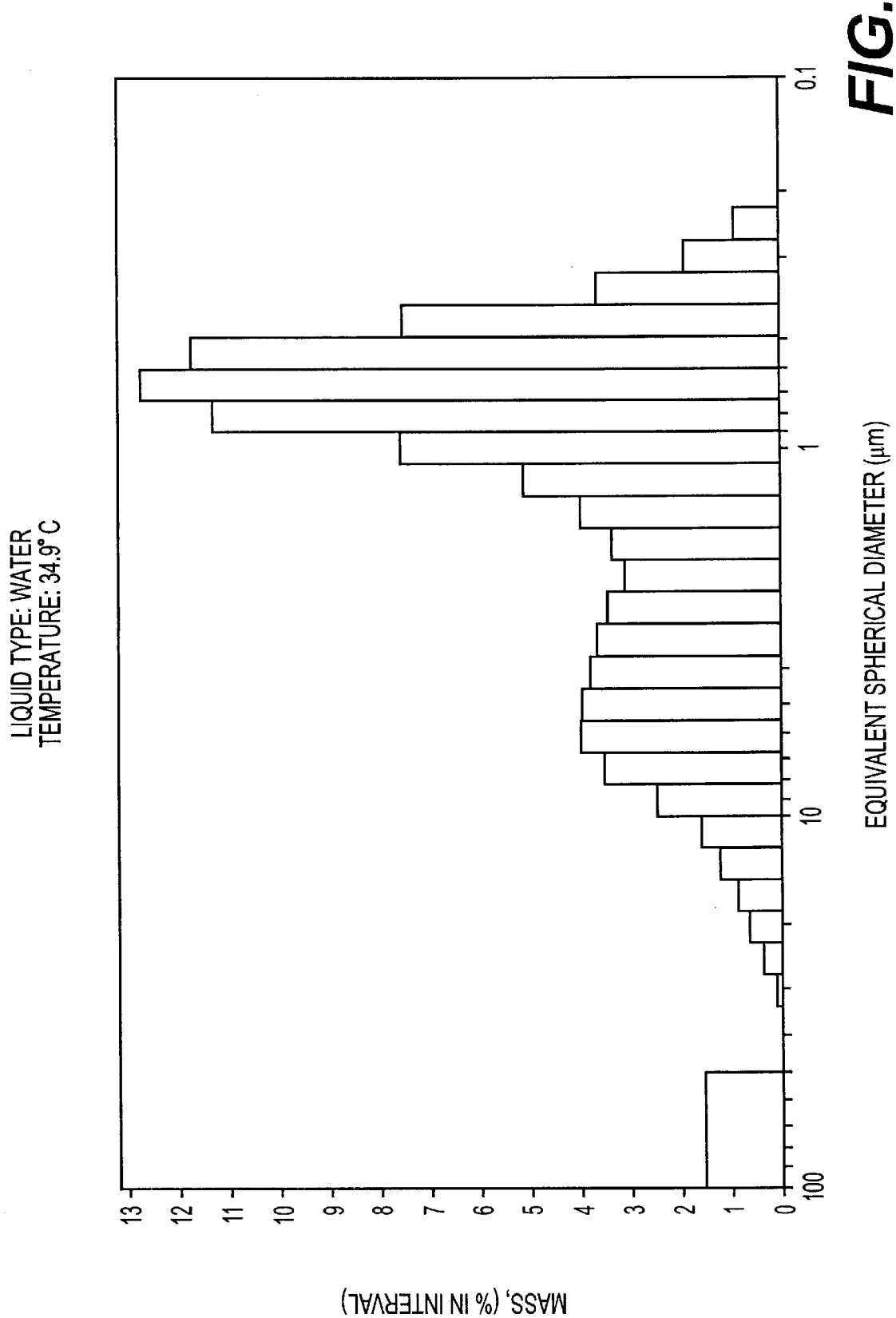
FIG. 2 depicts the information contained in FIG. 1 (the calcined product of Example 1) in histogram form.

2,927 g of an aqueous slurry containing kaolin having a solids content of 41.0 wt % was thoroughly mixed with 10,405 g of an aqueous slurry containing kaolin having a solids content of 17.3 wt %. The resulting hydrous kaolin blend provided, on a dry weight basis, a 60:40 fine:coarse weight ratio. The slurry containing the kaolin blend was flocculated using 10% sulfuric acid to a pH of 3, and was then dewatered by vacuum filtration using Buchner filter. The resulting separated solid material, in the form of a dry cake, was pulverized twice using a micropulverizer. The dry, pulverized hydrous kaolin blend was calcined in an oven at a temperature of 1125° C. for one hour. Following calcination and cooling, the calcined kaolin product was pulverized once using the aforementioned micropulverizer. Various properties of the product are reported in Tables 2 and 3 below, and the particle size distribution of the product is shown in FIGS. 1 and 2 (FIG. 2 in histogram form).

Example 1A

Paint Composition (Inventive)

A paint composition comprising 65% PVC (pigment volume concentration) was prepared using the calcined kaolin product of Example 1. The formulation comprised the ingredients shown in Table 1 as follows in the stated number of pounds weight per 100 gallons of paint.

TABLE 1

| | |
|---|---|
| Water | 339.9 |
| KTPP wetting agent | 1.8 |
| Wetting agent | 7.8 |
| Surfactant | 3.9 |
| Thickener | 3.9 |
| Titanium dioxide | 94.2 |
| Calcined kaolin (sample) | 198.1 |
| Calcium carbonate | 264.4 |
| Defoamer | 2.9 |
| Disperse to a 4N solution then add slowly with mixing: | |
| PVA resin | 213.5 |
| Ethylene glycol | 24.5 |
| Coalescent | 9.8 |
| Water | 45.1 |
| Weight solids % | 56.9 |
| Volume solids % | 37.6 |

Properties of the resulting paint formed into a dry paint film by standard laboratory paint film drawdown equipment and subsequent air drying in an essentially dirt-free drying cabinet were measured according to standard procedures (described later) and the results obtained are set forth in Table 4 below.

Example 1B

Tinted Film (Inventive)

Tinted films were made from paint of Example 1A by adding the equivalent of 11 pounds by weight of phthalo blue dispersion to 100 gallons of paint. Optical properties of the resulting films made using drawdown-related procedures described above were measured and the results are set forth in Table 5 below.

Example 2

Unimodal Conventional Calcined Pigment (Comparative)

Figure 3:
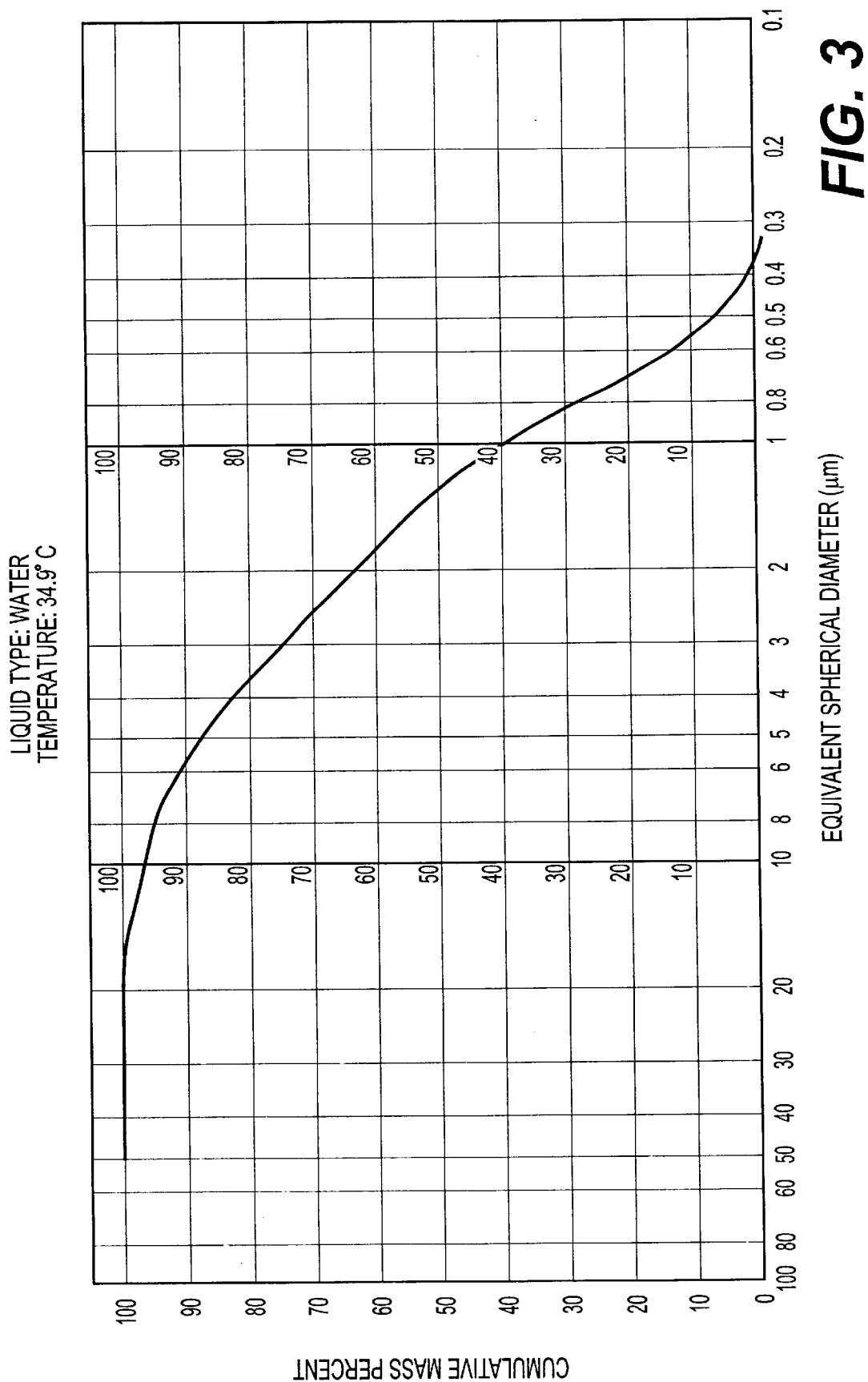
FIG. 3 depicts a SEDIGRAPH 5100 plot for the commercial monomodal calcined kaolin, Glomax® LL of Example 2.
Figure 4:
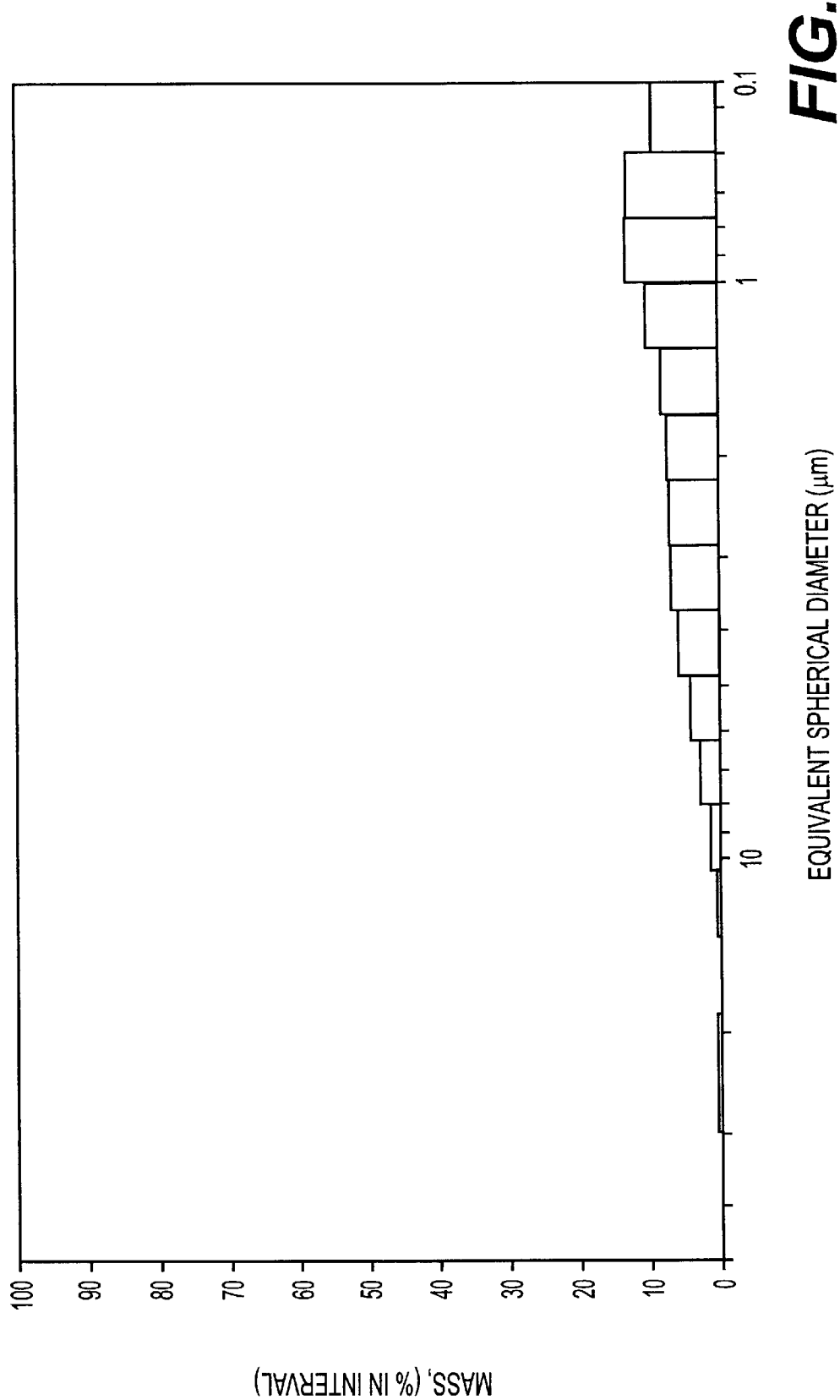
FIG. 4 depicts the information contained in FIG. 3 (the commercial monomodal calcined kaolin, Glomax® LL of Example 2) in histogram form.

Glomax® LL, available from Imerys Kaolin, Inc. Dry Branch, Ga., having a unimodal particle size distribution was used. The SEDIGRAPH 5100 plot and corresponding histogram are presented as FIGS. 3 and 4, respectively.

In Table 2 the particle size properties are as measured in a manner described above using a SEDIGRAPH 5100 instrument for the calcined inventive product of Example 1 and for the commercial, unimodal calcined Glomax® LL. The oil absorption as measured by the ASTM-D-281 method is also summarized in Table 2. The optical properties of the calcined products of Examples 1 and 2 are similarly summarized in Table 3 below.

TABLE 2

| Product | Mean Particle Size (μm) | % by weight <5 μm | % by weight <2 μm | % by weight <1 μm | Oil Absorption |
|---------|---|---|---|---|---|
| Ex 1 | 0.96 | 83.5 | 67.1 | 51.5 | 93 |
| Ex 2 | 1.29 | 88.9 | 63.7 | 40.4 | 70 |

TABLE 3

| Product | Brightness | L | a | b |
|---------|---|---|---|---|
| Ex 1 | 92.8 | 96.8 | −0.6 | 1.9 |
| Ex 2 | 90.8 | 96.8 | −0.8 | 3.4 |

The brightness given in the Table 3 is the GE brightness. GE brightness is a unitless reflectance percentage value measured in a well known manner by a Technibrite TB-1C instrument.

In Table 3 and in subsequent Tables, Components a, b, and L are the color component values on the color space scale as measured by a Hunter Ultrascan XE instrument. "+a" is a measure of red tint; "−a" is a measure of green tint; "+b" is a measure of yellow tint; "−b" is a measure of blue tint; "L" is a measure of whiteness Example 2A Paint Composition (Comparative)

A paint composition comprising 65% PVC (pigment volume concentration) was prepared as in Example 1, except that the unimodal commercial calcined kaolin was substituted for the multimodal composition of Example 1. The paint was formed into a dry paint film. Its properties were measured according to the same procedures used to determine the properties of the paint composition of Example 1A. The results are set forth in Table 4, for ease of comparison to those of Example 1A.

Example 2B

Tint Film (Comparative)

Tinted films were made from paint of Example 2A by adding the equivalent of 11 pounds by weight of phthalo blue dispersion to 100 gallons of paint. Optical properties of the resulting films were measured and the results are set forth in Table 5 below for ease of comparison with the results obtained for Example 1B.

TABLE 4

| Paint | Example 1A | Example 2A |
|---|---|---|
| 60° Gloss | 2.9 | 2.9 |
| 85° Sheen | 2.0 | 2.7 |
| ASTM-E-313 white | 84.7 | 81.0 |
| ASTM-E-313 yellow | 1.7 | 2.6 |

TABLE 4-continued

| Paint | Example 1A | Example 2A |
|---|---|---|
| Brightness | 89.6 | 88.2 |
| L | 95.4 | 95.0 |
| a | −0.9 | −0.9 |
| b | 1.4 | 1.9 |
| Opacity | 95.5 | 94.5 |

In Table 4, gloss and sheen are measured in a known manner using a Hunter Pro-3 Gloss Meter and opacity was measured using a Hunter Ultrascan XE Colorimeter. Opacity is the ratio of the intensity (Y axis) of light reflected from a black surface under test to that reflected from a standard white surface measured in a well known manner. ASTM-E-313 white and yellow are standard measurements of the whiteness and yellowness of near white, opaque film coatings made using a Hunter Ultrascan XE Instrument.

TABLE 5

| Product | Example 1B | Example 2B |
|---|---|---|
| L | 79.6 | 78.2 |
| a | −11.7 | −12.3 |
| b | −17.1 | −17.8 |
| ΔL | −1.4 | — |
| Δa | −0.6 | — |
| Δb | −0.7 | — |
| ΔE | 1.7 | — |

In Table 5, the parameter ΔE is a measure of tint strength. The color vector in color space as defined earlier and is given by the expression:

$$\Delta E = (\Delta L^2 + \Delta a^2 + \Delta b^2)^{1/2}$$

Tables 4 and 5 illustrate a benefit of the invention (Examples 1A and 1B) compared with the prior art (Examples 2A and 2B). The inventive paint composition (Example 1A), for instance, yields both a lower sheen (85%) and simultaneously better overall optical properties (higher whiteness; lower yellowness; higher opacity, and superior tint strength) than comparative paint composition (Example 2A).

Example 3

60:40 Hydrous Kaolin Blend (Inventive)

A hydrous kaolin blend was prepared in the manner described in Example 1, except that the fine and coarse hydrous kaolin components employed to produce a 60:40 (fine:coarse) hydrous blend were as set forth in Tables 6 and 7, respectively. In Tables 6 and 7, X is the particle size of the hydrous kaolin component (in μm), and % is the percent by weight having a size less than X for various values of X.

TABLE 6

(PSD FINE HYDROUS KAOLIN)

| X | % |
|---|---|
| 10 | 100 |
| 5 | 99.1 |

TABLE 6-continued

(PSD FINE HYDROUS KAOLIN)

| X | % |
|---|---|
| 2 | 97.1 |
| 1.5 | 95.8 |
| 1 | 91.9 |
| 0.8 | 88.4 |
| 0.5 | 74.4 |

TABLE 7

(PSD COARSE HYDROUS KAOLIN)

| X | % |
|---|---|
| 20 | 98.7 |
| 10 | 89.2 |
| 8 | 82.3 |
| 5 | 59.0 |
| 4 | 46.7 |
| 2 | 22.5 |
| 1 | 12.8 |

Figure 5:
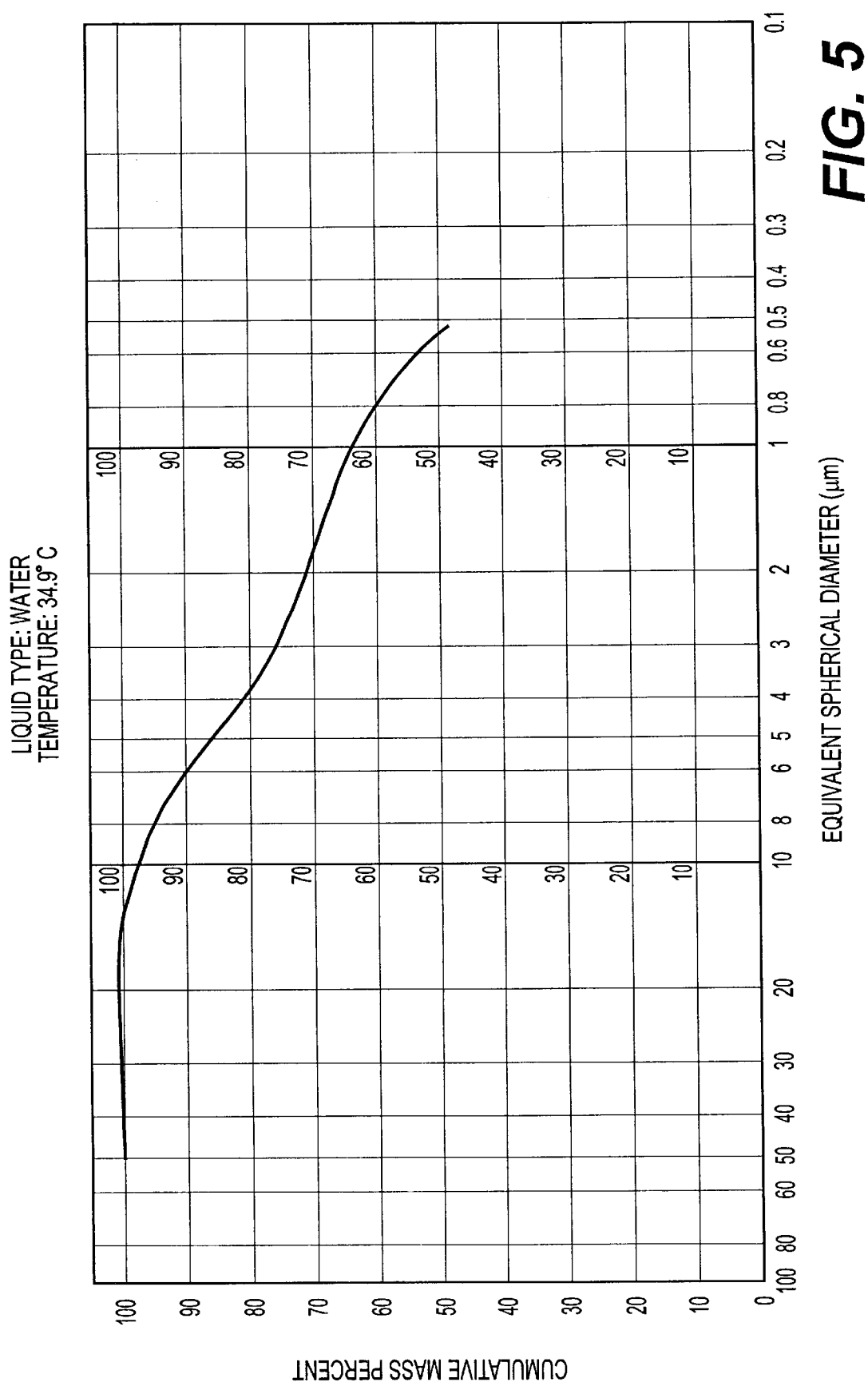
FIG. 5 depicts a SEDIGRAPH 5100 plot for the blend of hydrous kaolin of Example 3 employed in producing the calcined kaolin product of Example 3A.
Figure 6:
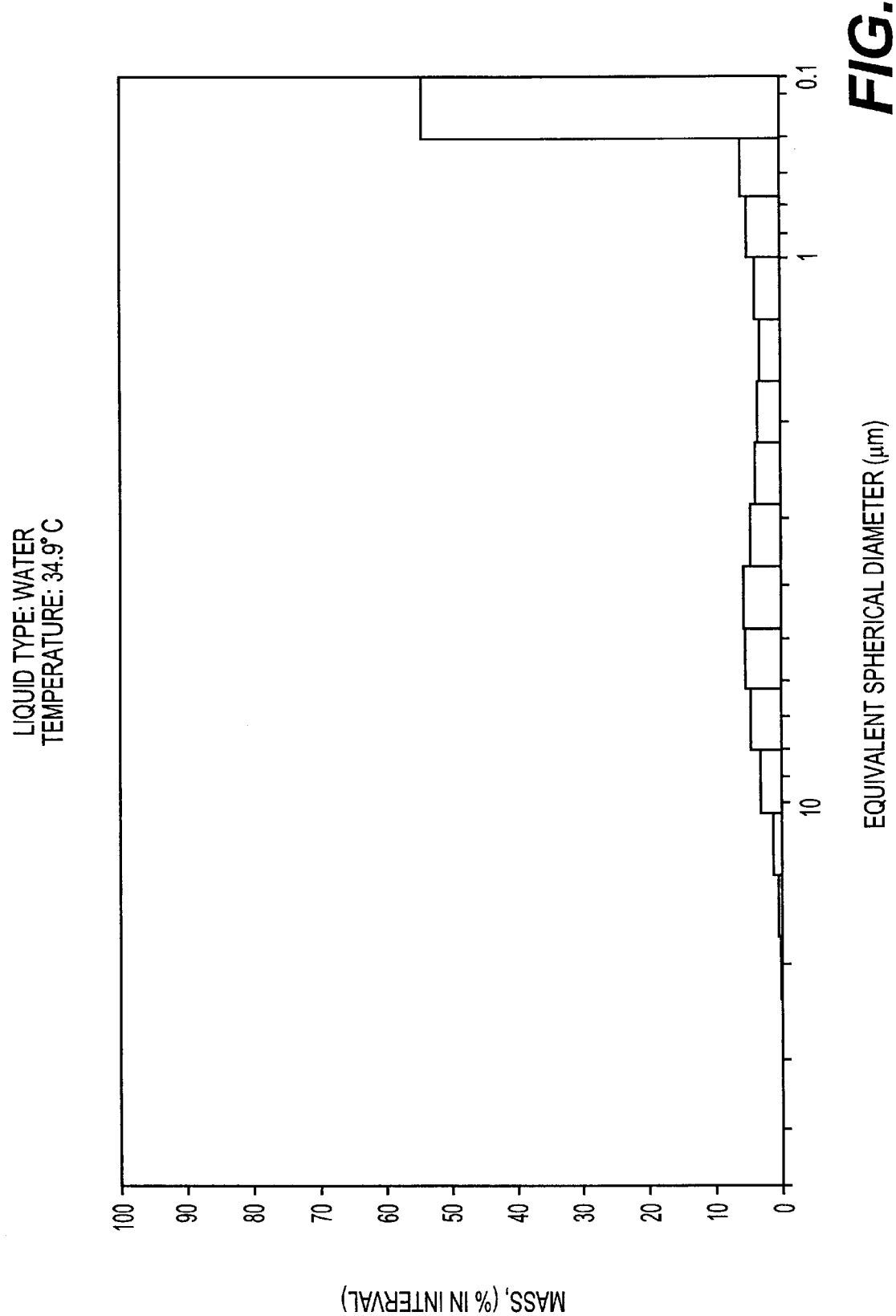
FIG. 6 depicts the information contained in FIG. 5 (the hydrous blend of Example 3) in histogram form.

A blend comprising 60% by weight of the fine hydrous kaolin of Example 3 and 40% by weight of the coarse hydrous kaolin of Example 3 was produced. The hydrous blend had a particle size distribution as shown in FIGS. 5 and 6 (FIG. 6 in histogram form).

Example 3A

60:40 Calcined Kaolin Blend (Inventive)

Figure 7:
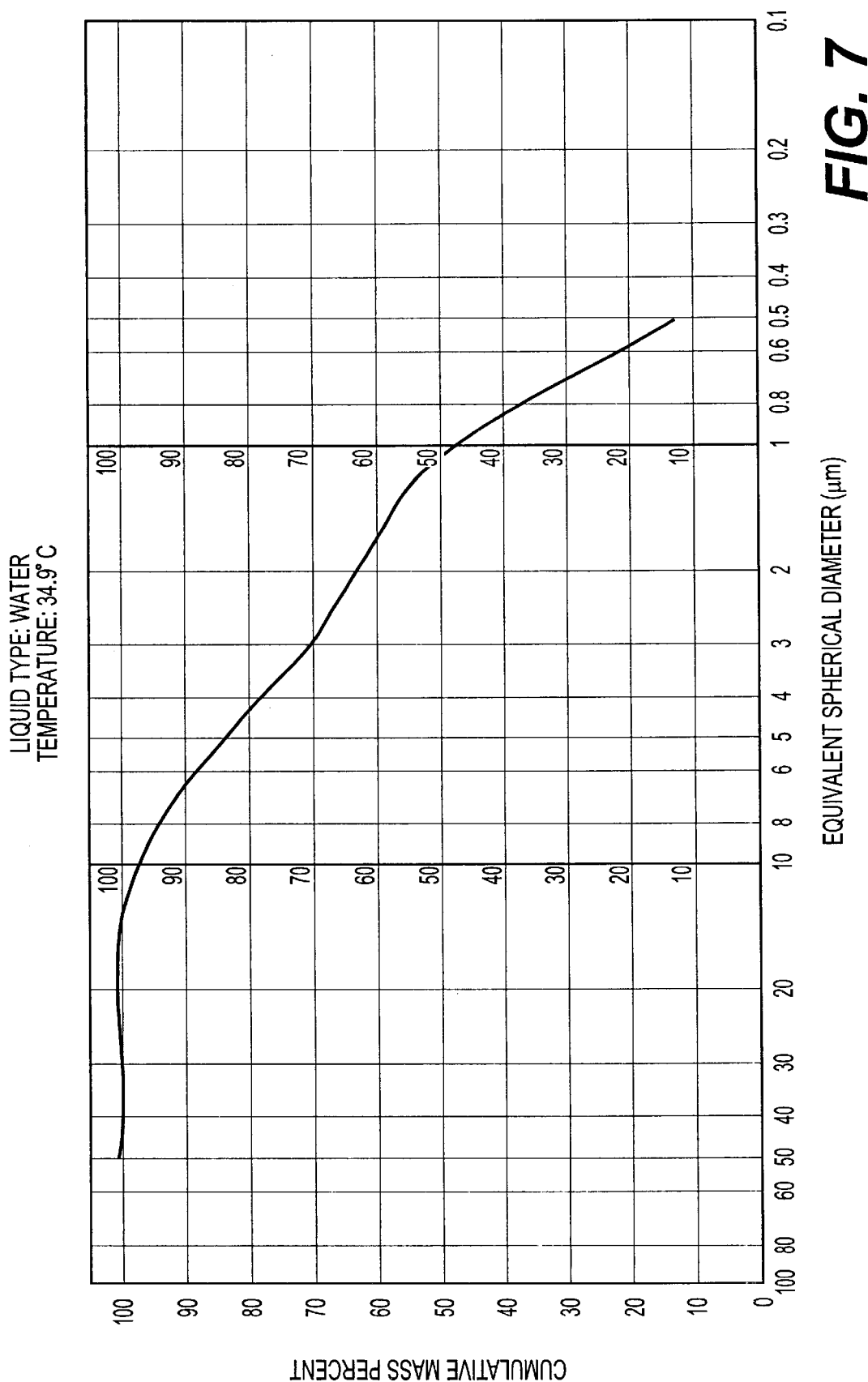
FIG. 7 depicts a SEDIGRAPH 5100 plot for the calcined kaolin product of Example 3A, produced from the hydrous kaolin blend of Example 3 represented in FIGS. 5 and 6.
Figure 8:
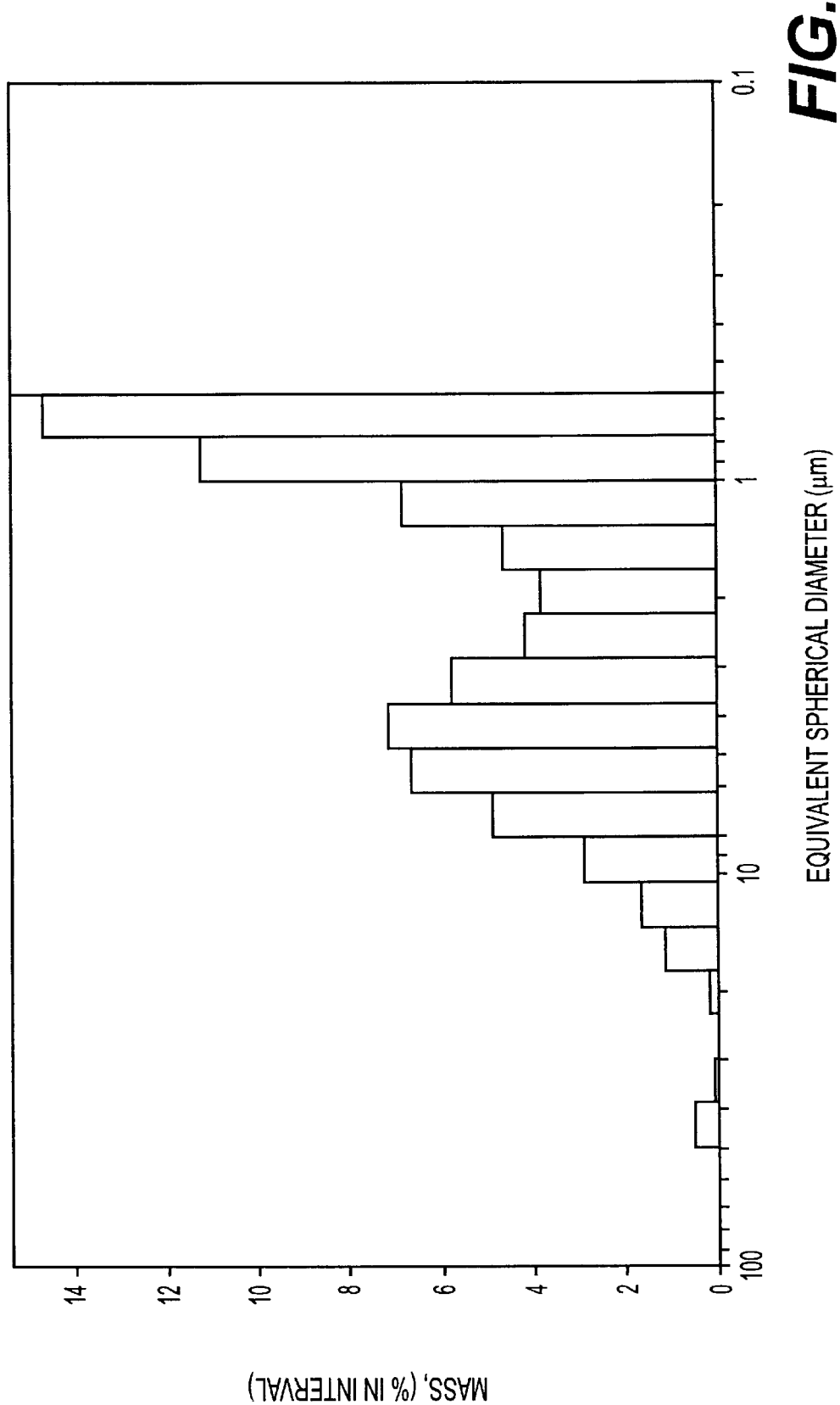
FIG. 8 depicts the information contained in FIG. 7 (the calcined kaolin product of Example 3A) in histogram form.
Figure 9:
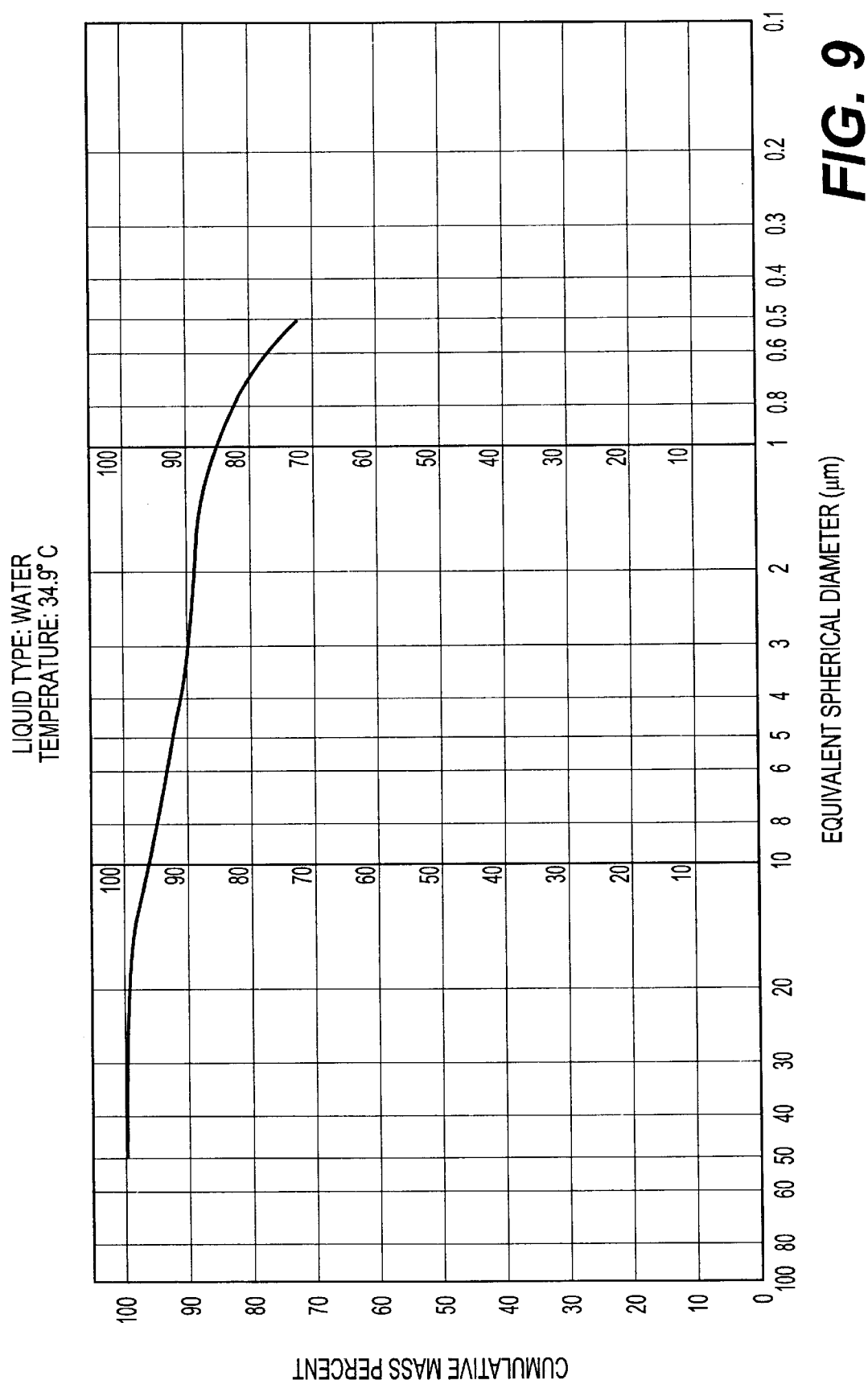
FIG. 9 is a SEDIGRAPH 5100 plot of the 90:10 hydrous blend of Example 6.
Figure 10:
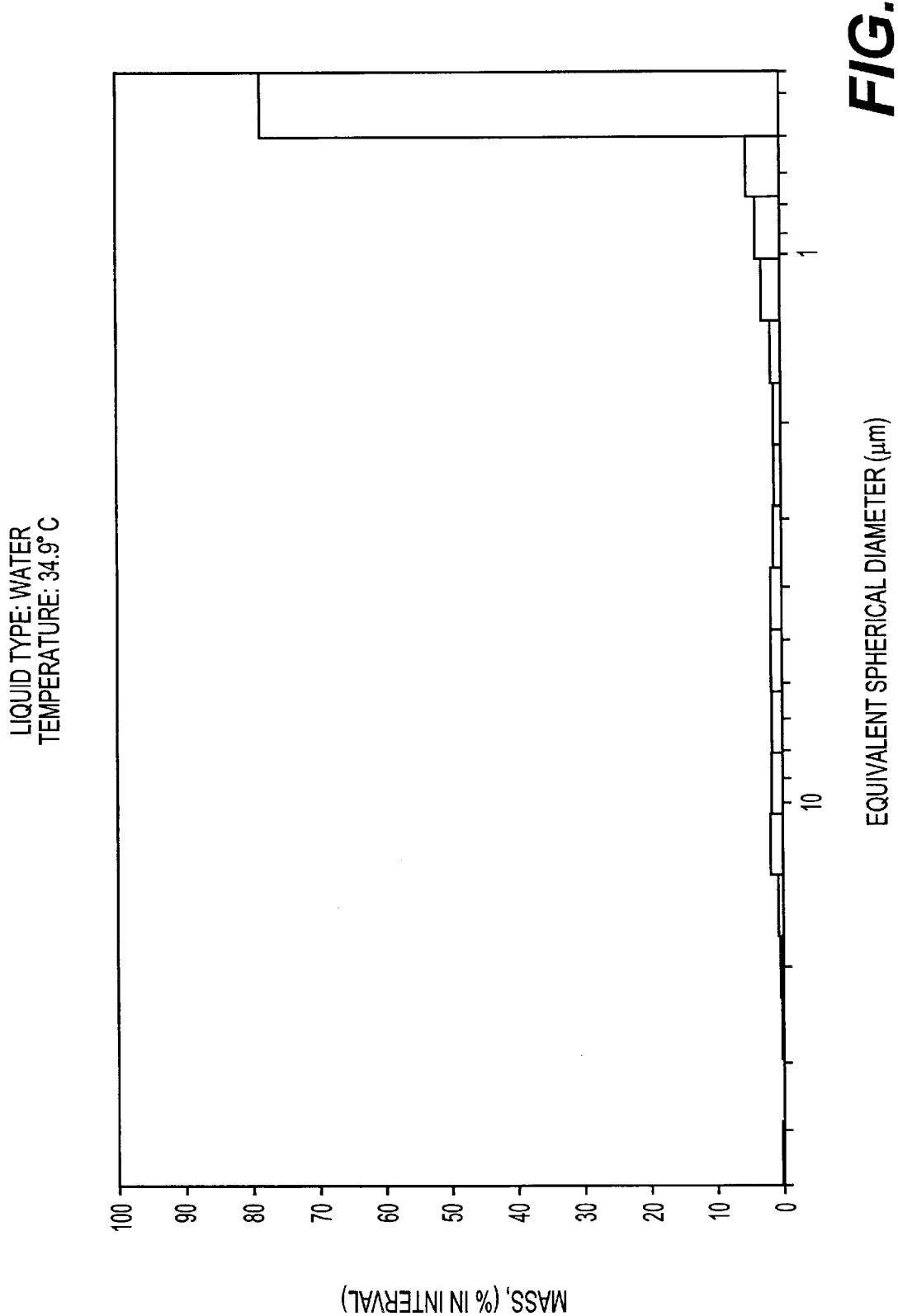
FIG. 10 depicts the information contained in FIG. 9 (the hydrous blend of Example 6) in histogram form.
Figure 11:
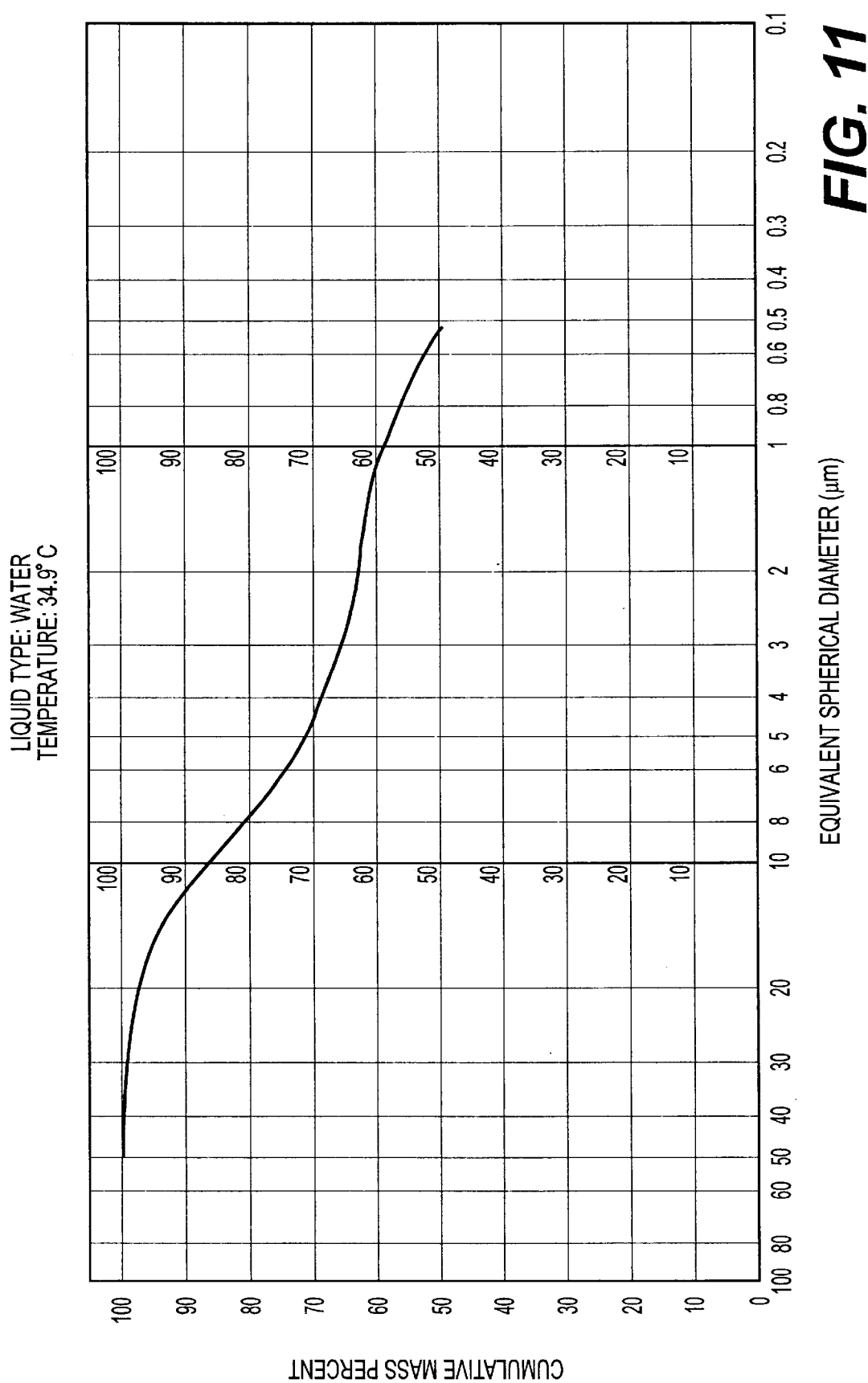
FIG. 11 is a SEDIGRAPH 5100 plot of the 60:40 hydrous blend of Example 6.
Figure 12:
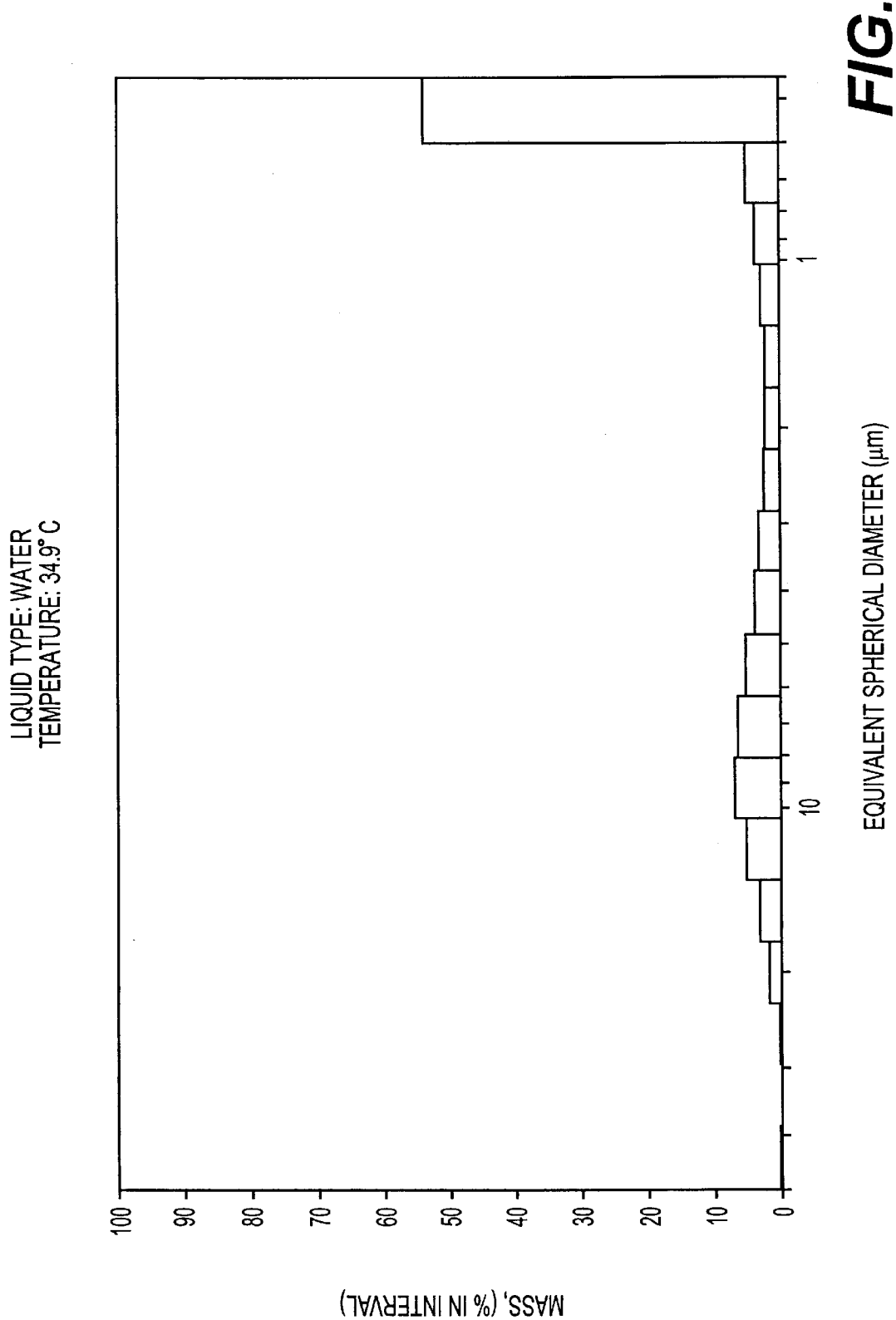
FIG. 12 depicts the information contained in FIG. 11 (the hydrous blend of Example 6) in histogram form.
Figure 13:
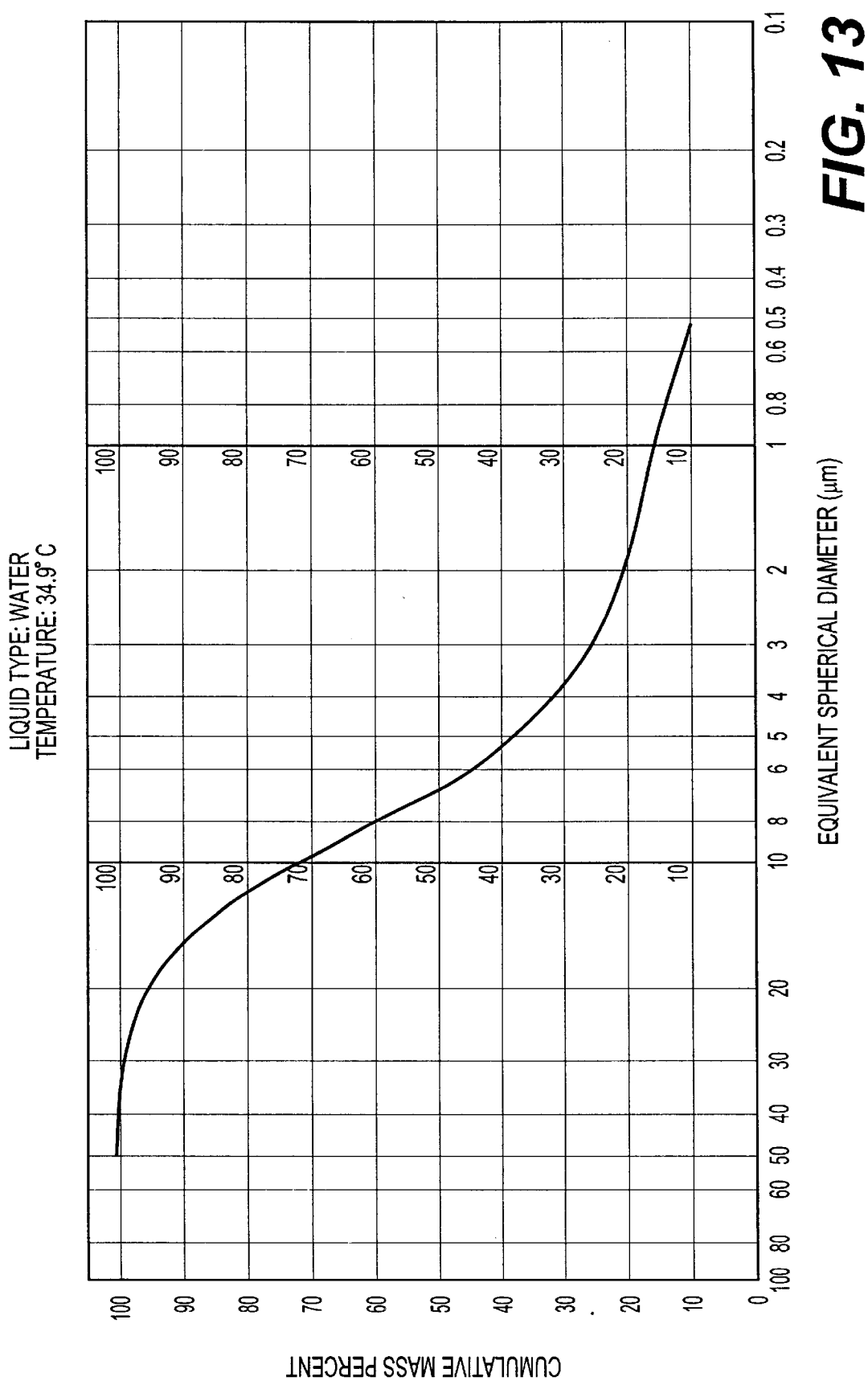
FIG. 13 is a SEDIGRAPH 5100 plot of the 10:90 hydrous blend of Example 6.
Figure 14:
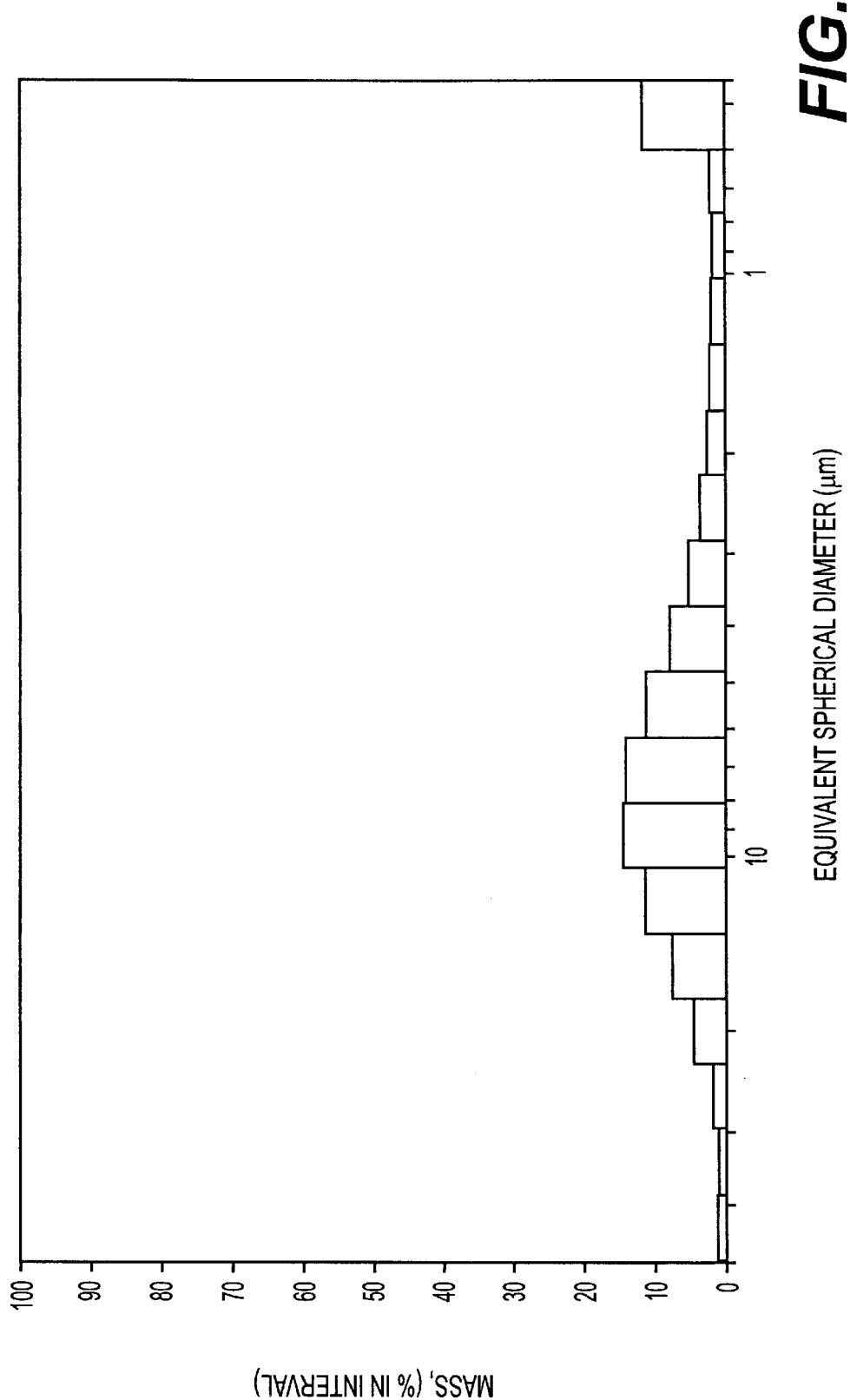
FIG. 14 depicts the information contained in FIG. 13 (the hydrous blend of Example 6) in histogram form.
Figure 15:
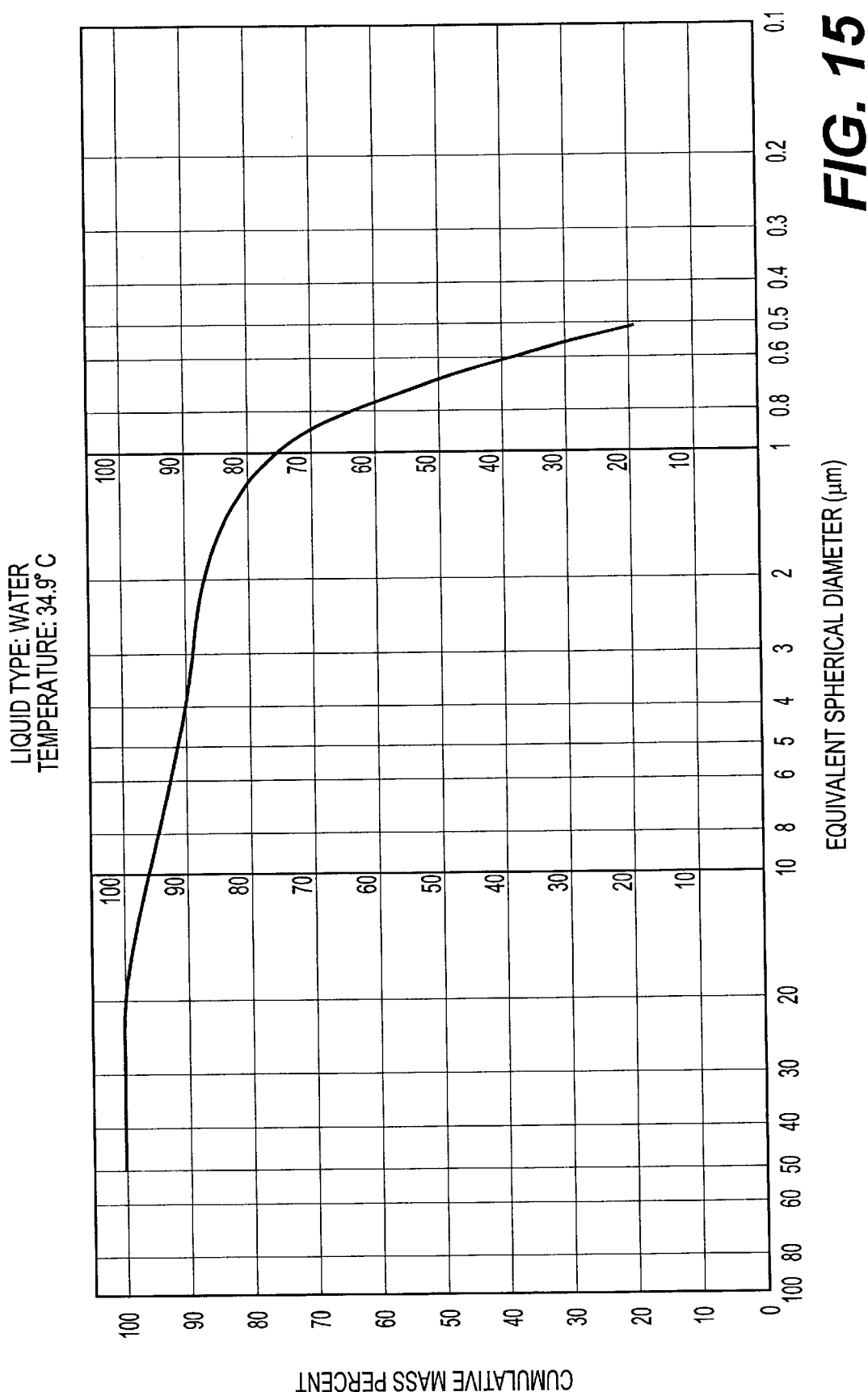
FIG. 15 depicts a SEDIGRAPH 5100 plot of the calcined kaolin product of Example 6A, produced from the 90:10 hydrous kaolin blend of Example 6 represented in FIGS. 9 and 10.
Figure 16:
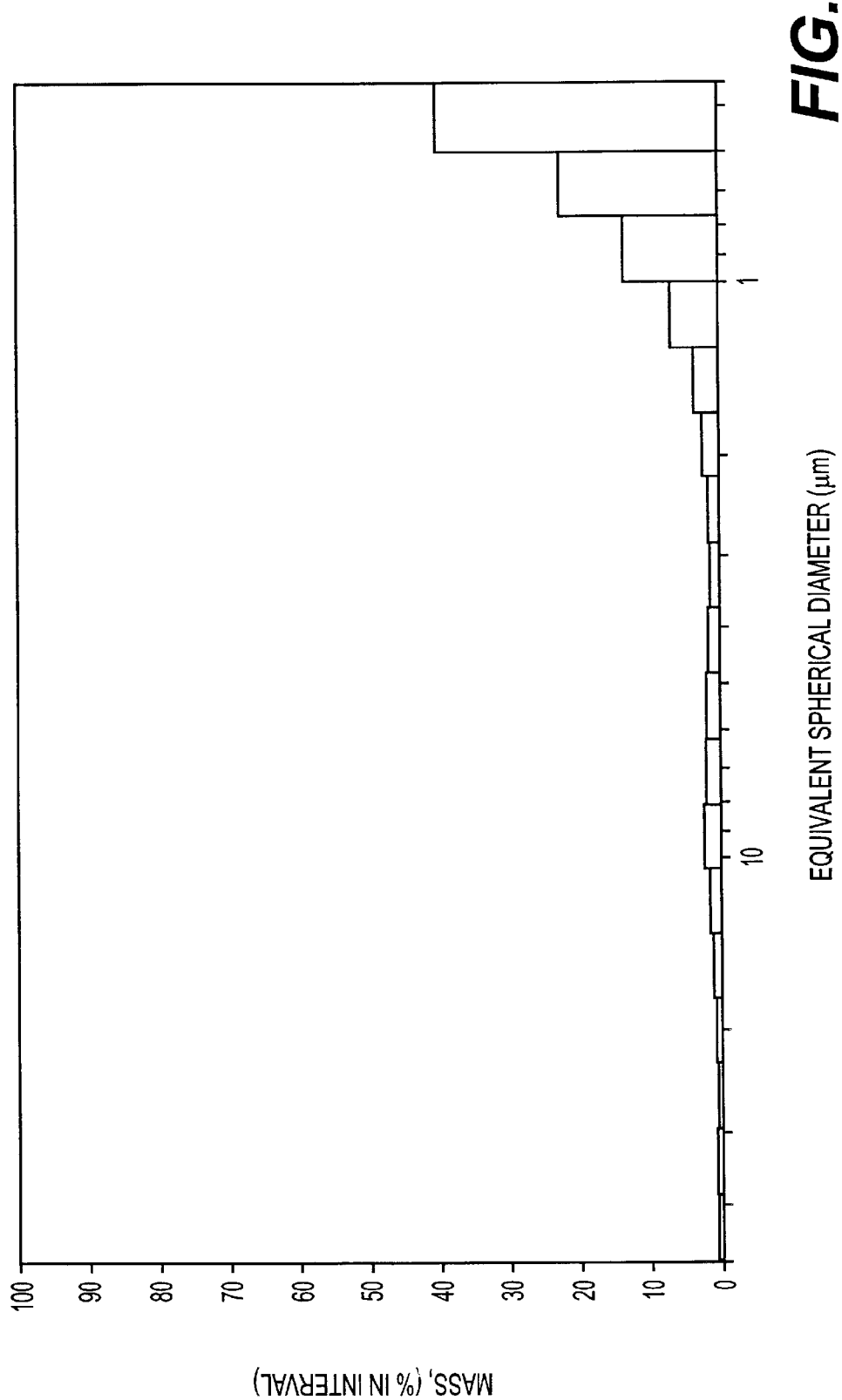
FIG. 16 depicts depicts the information contained in FIG. 15 (the calcined kaolin product of Example 6A produced from the 90:10 hydrous kaolin blend) in histogram form.
Figure 17:
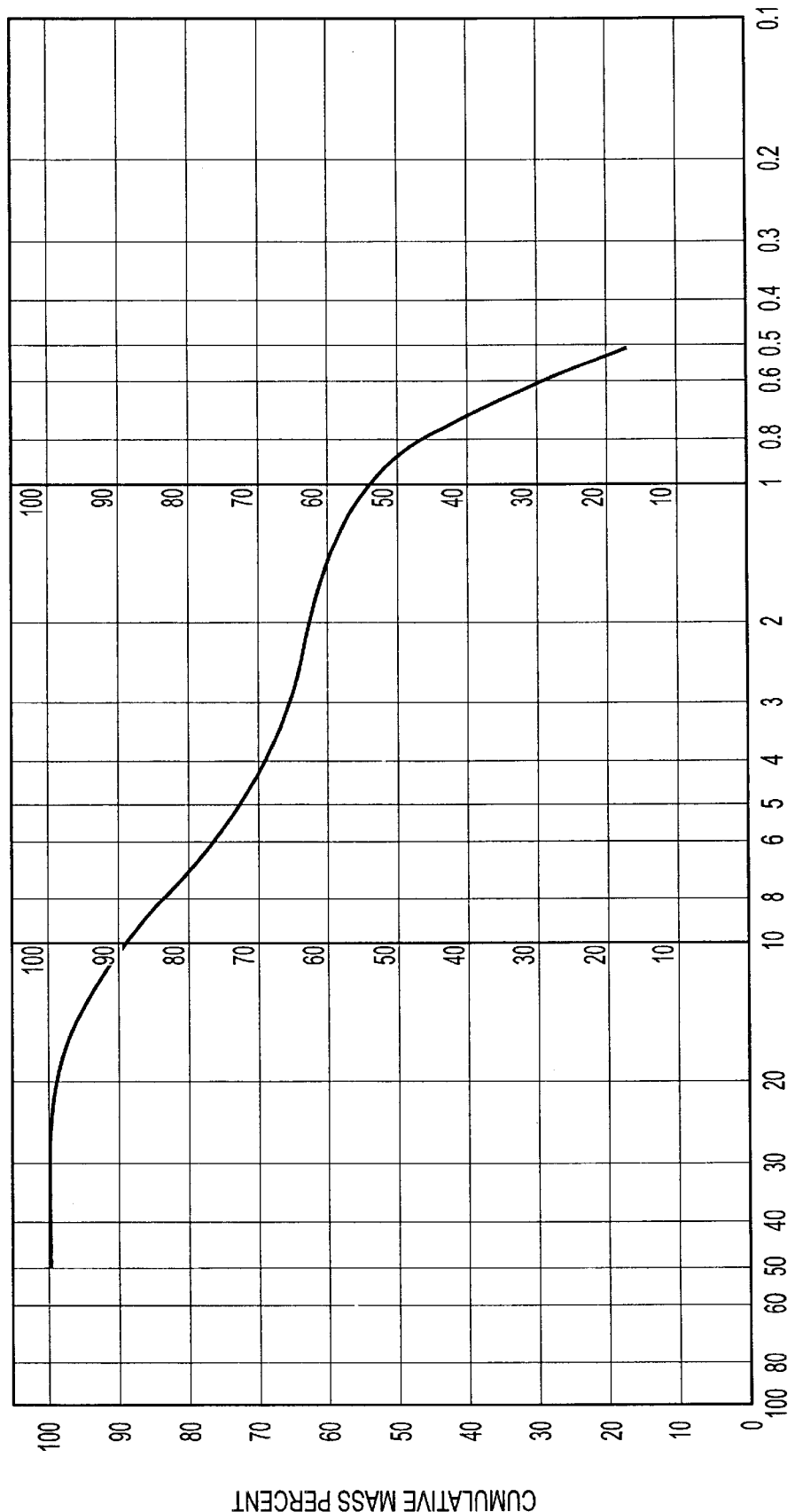
FIG. 17 depicts a SEDIGRAPH 5100 plot of the calcined kaolin product of Example 6A, produced from the 60:40 hydrous kaolin blend of Example 6 represented in FIGS. 11 and 12.
Figure 18:
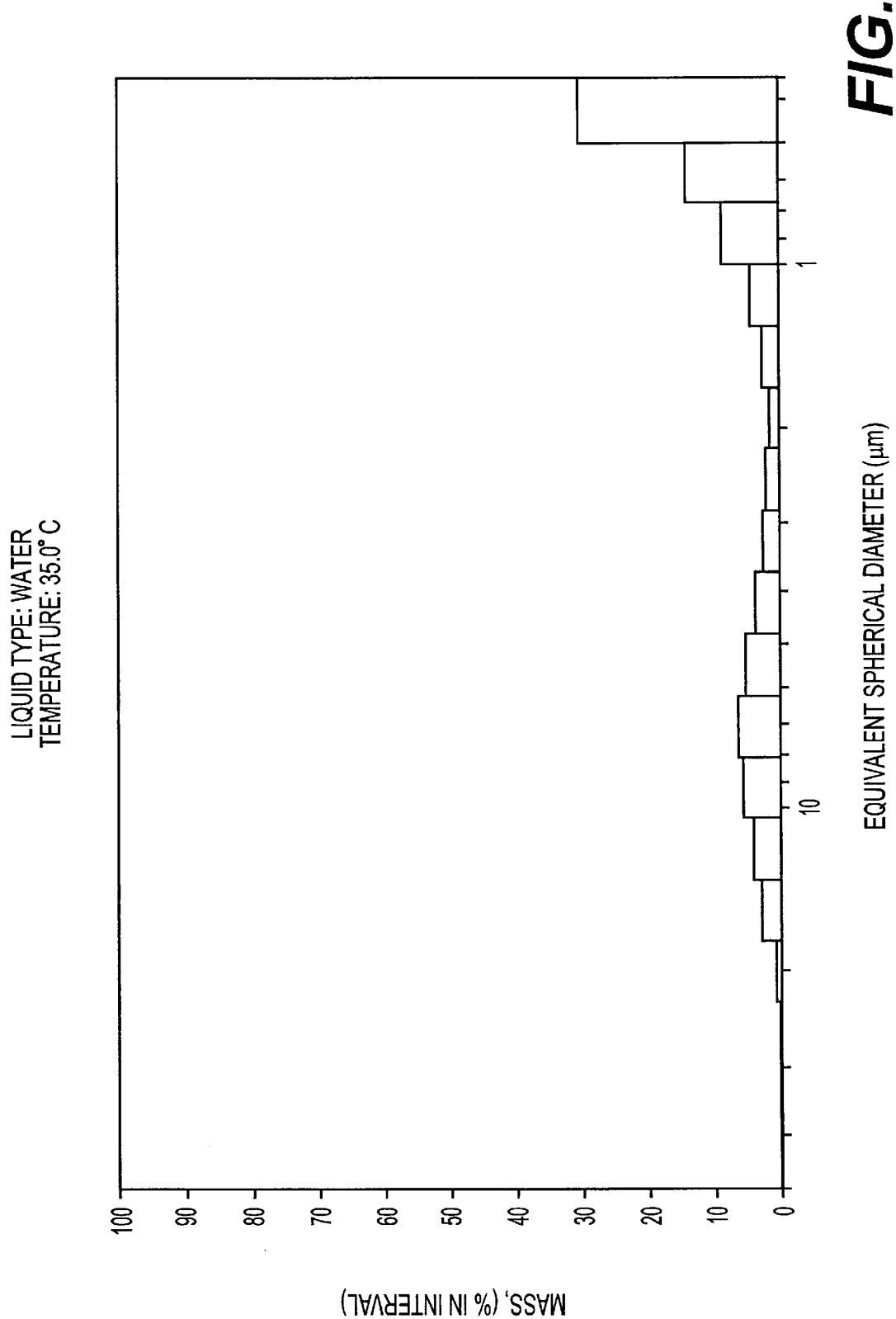
FIG. 18 depicts the information contained in FIG. 17 (the calcined kaolin product of Example 6A produced from the 60:40 hydrous kaolin blend) in histogram form.
Figure 19:
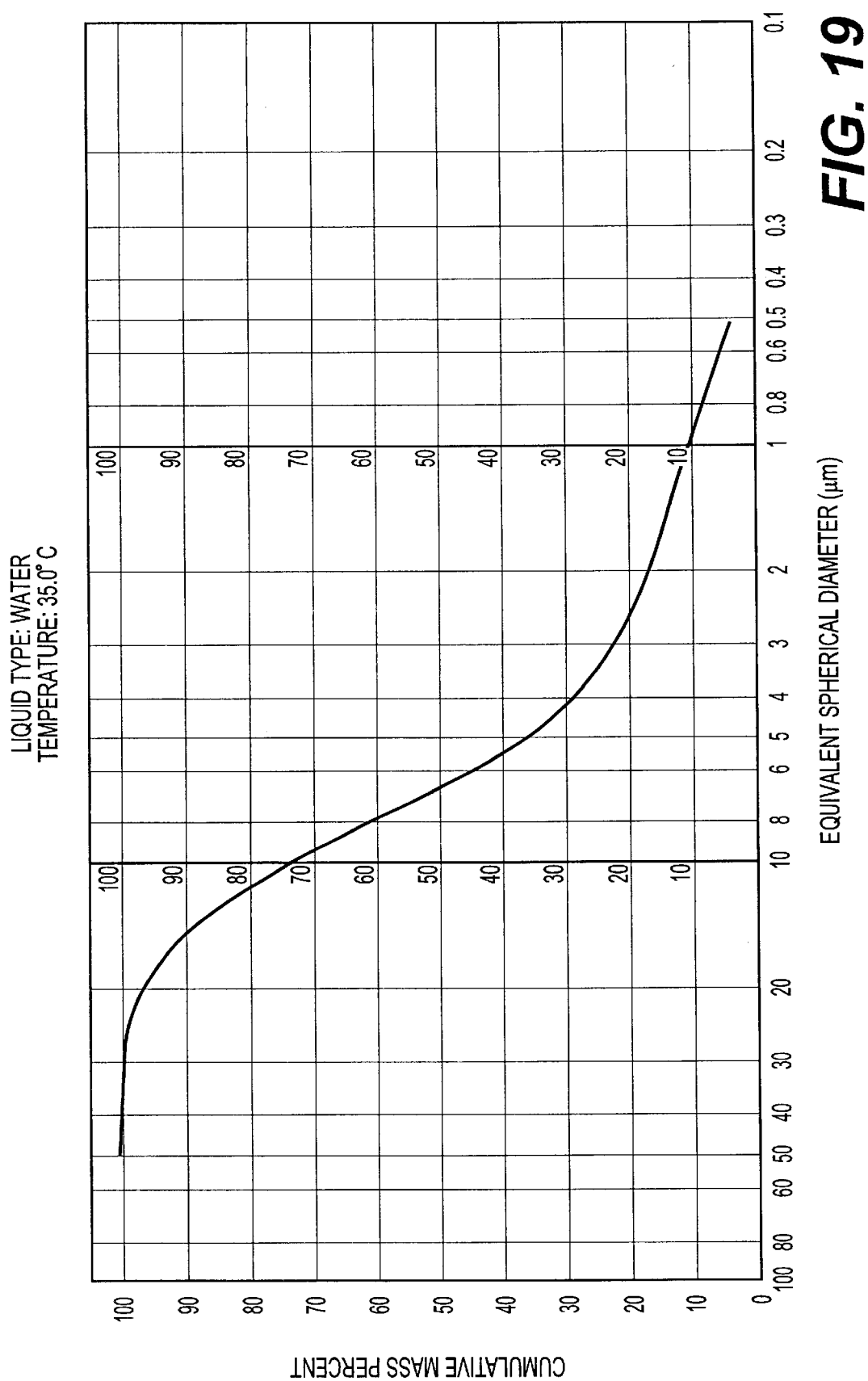
FIG. 19 depicts a SEDIGRAPH 5100 plot of the calcined kaolin product of Example 6A, produced from the 10:90 hydrous kaolin blend of Example 6 represented in FIGS. 13 and 14.
Figure 20:
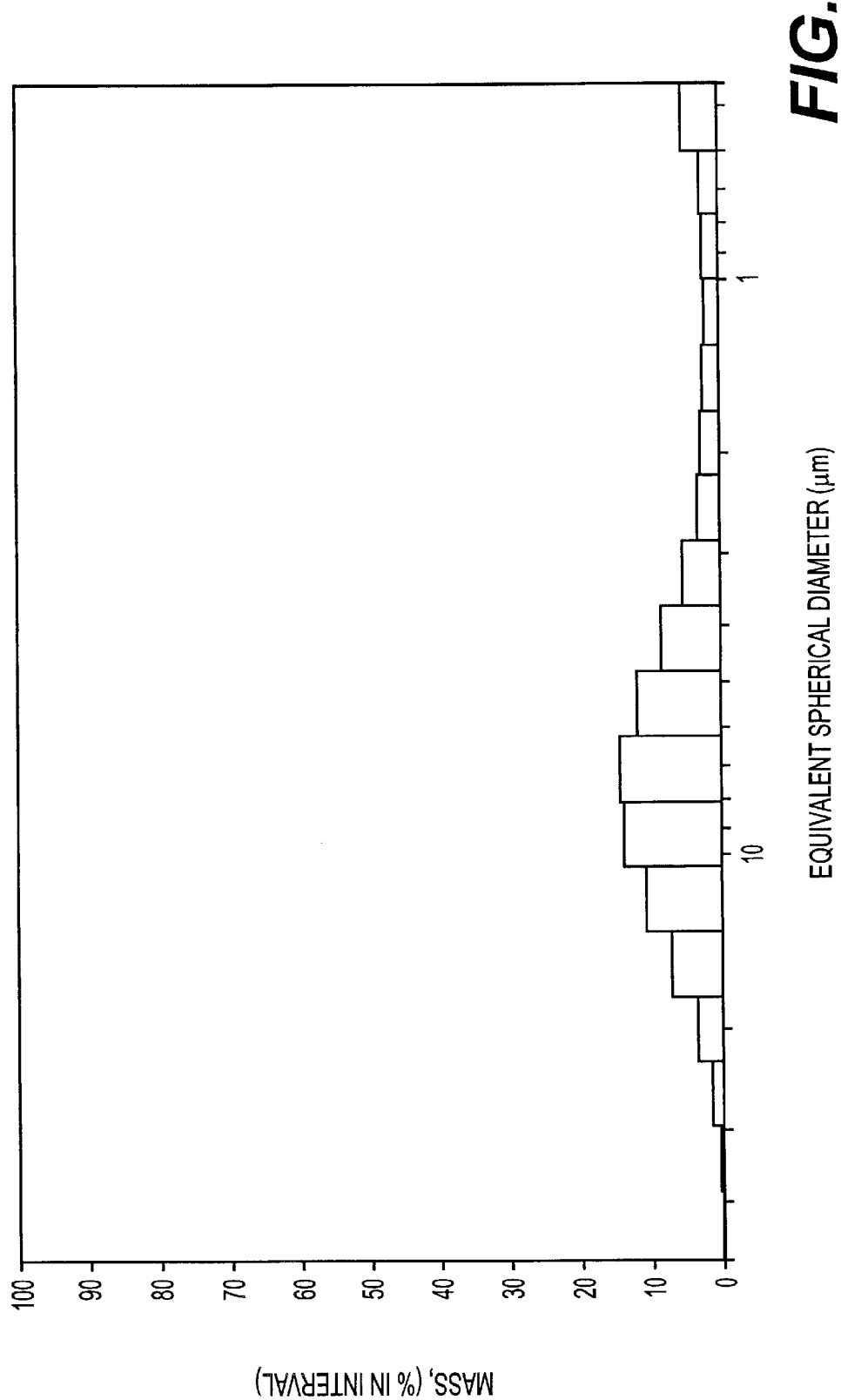
FIG. 20 depicts the information contained in FIG. 19 (the calcined kaolin product of Example 6A produced from the 10:90 hydrous kaolin blend) in histogram form.
Figure 21:
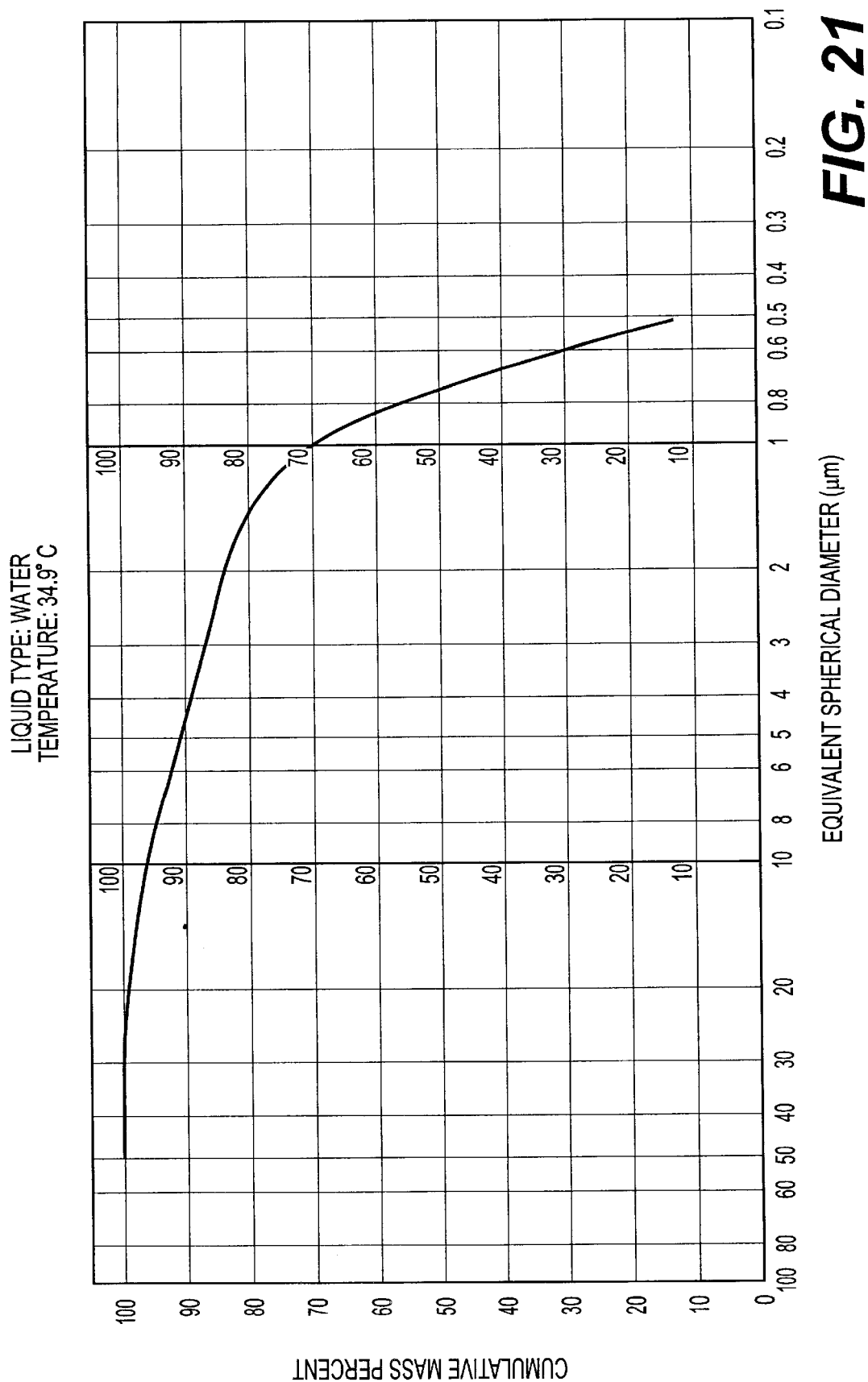
FIG. 21 depicts a SEDIGRAPH 5100 plot of the calcined kaolin product of Example 7A, produced from the 90:10 hydrous kaolin blend of Example 7.
Figure 22:
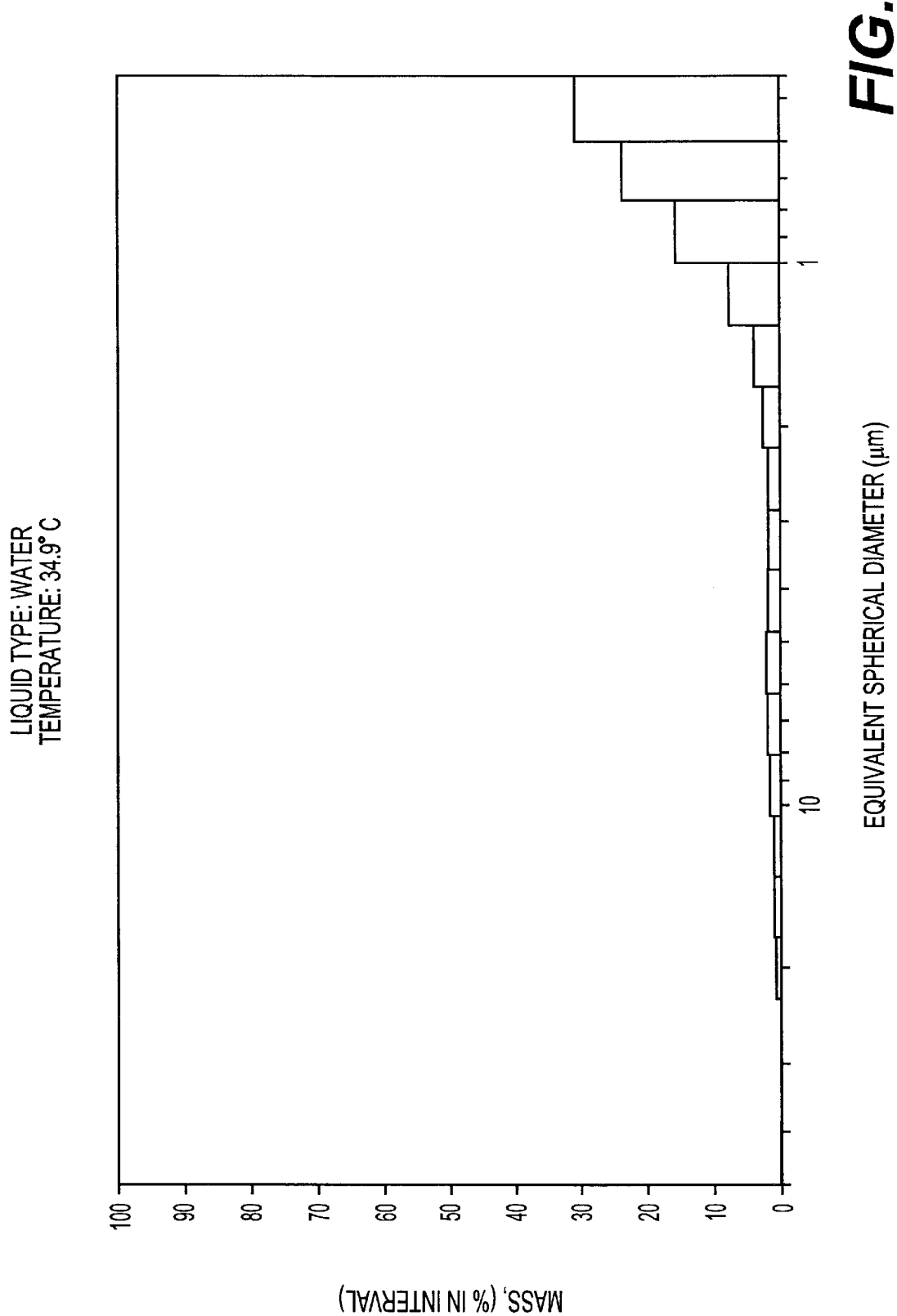
FIG. 22 depicts the information contained in FIG. 21 (the calcined kaolin product of Example 7A produced from the 90:10 hydrous kaolin blend) in histogram form.
Figure 23:
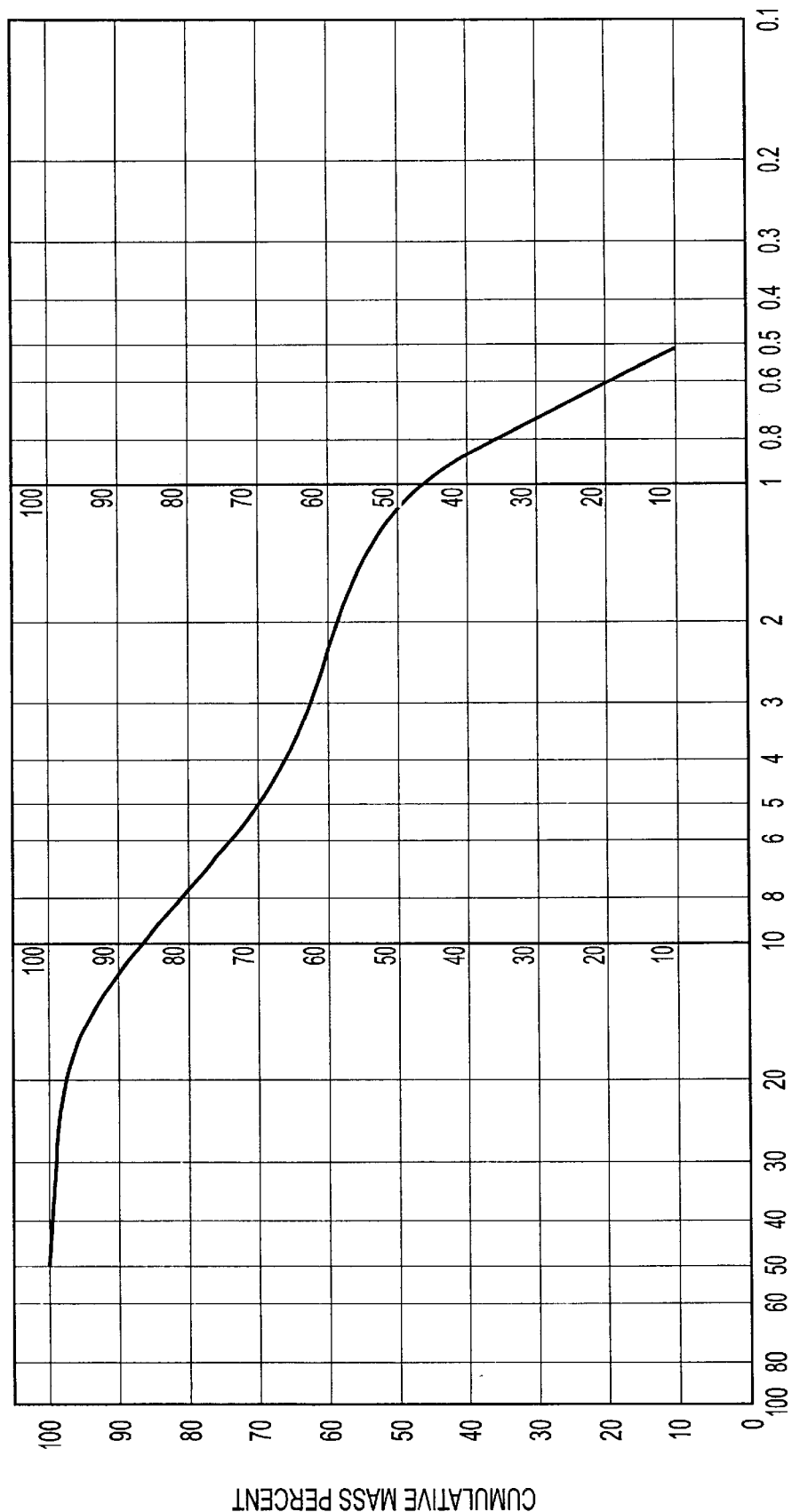
FIG. 23 depicts a SEDIGRAPH 5100 plot of the calcined kaolin product of Example 7A, produced from the 60:40 hydrous kaolin blend of Example 7.
Figure 24:
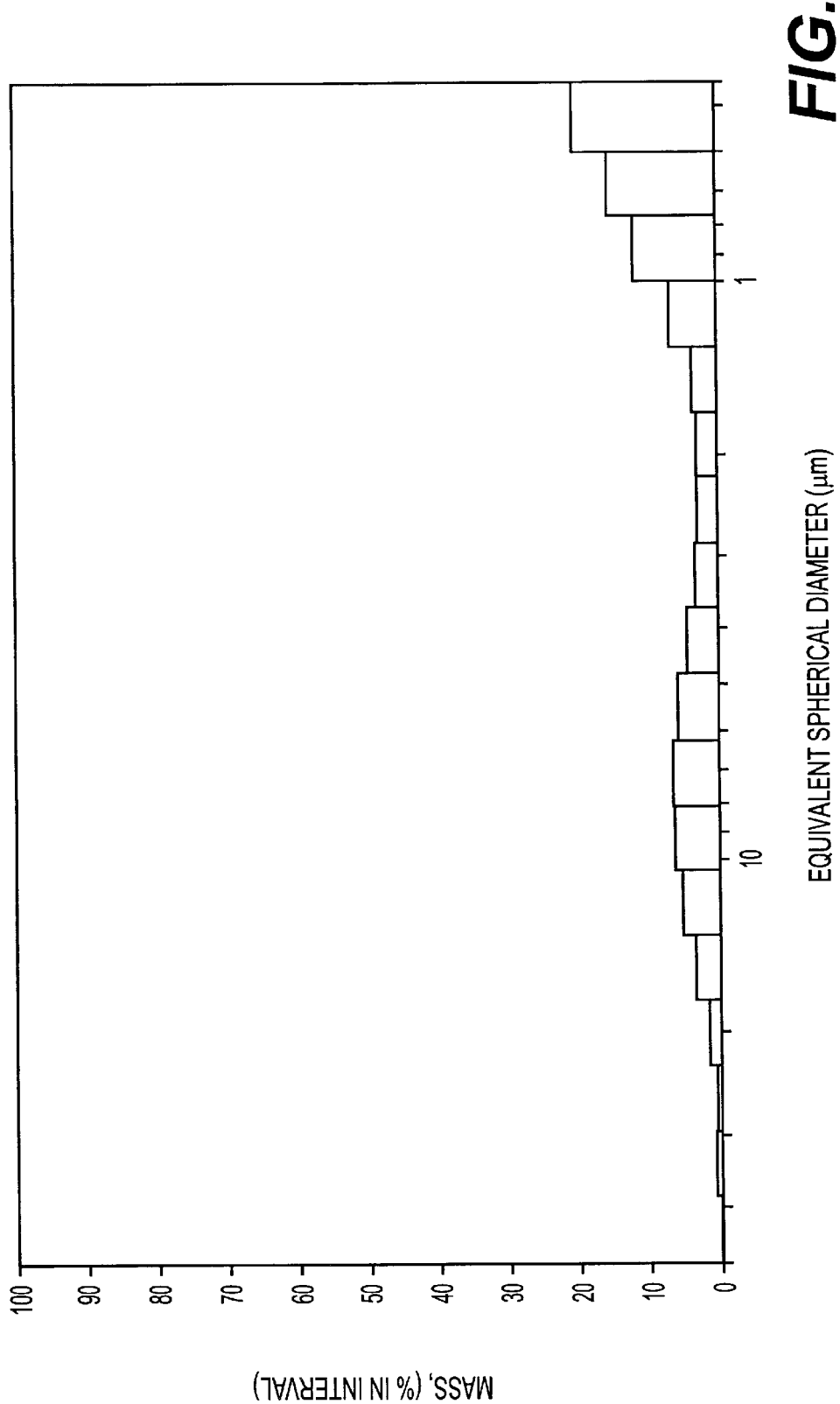
FIG. 24 depicts the information contained in FIG. 23 (the calcined kaolin product of Example 7A produced from the 60:40 hydrous kaolin blend) in histogram form.
Figure 25:
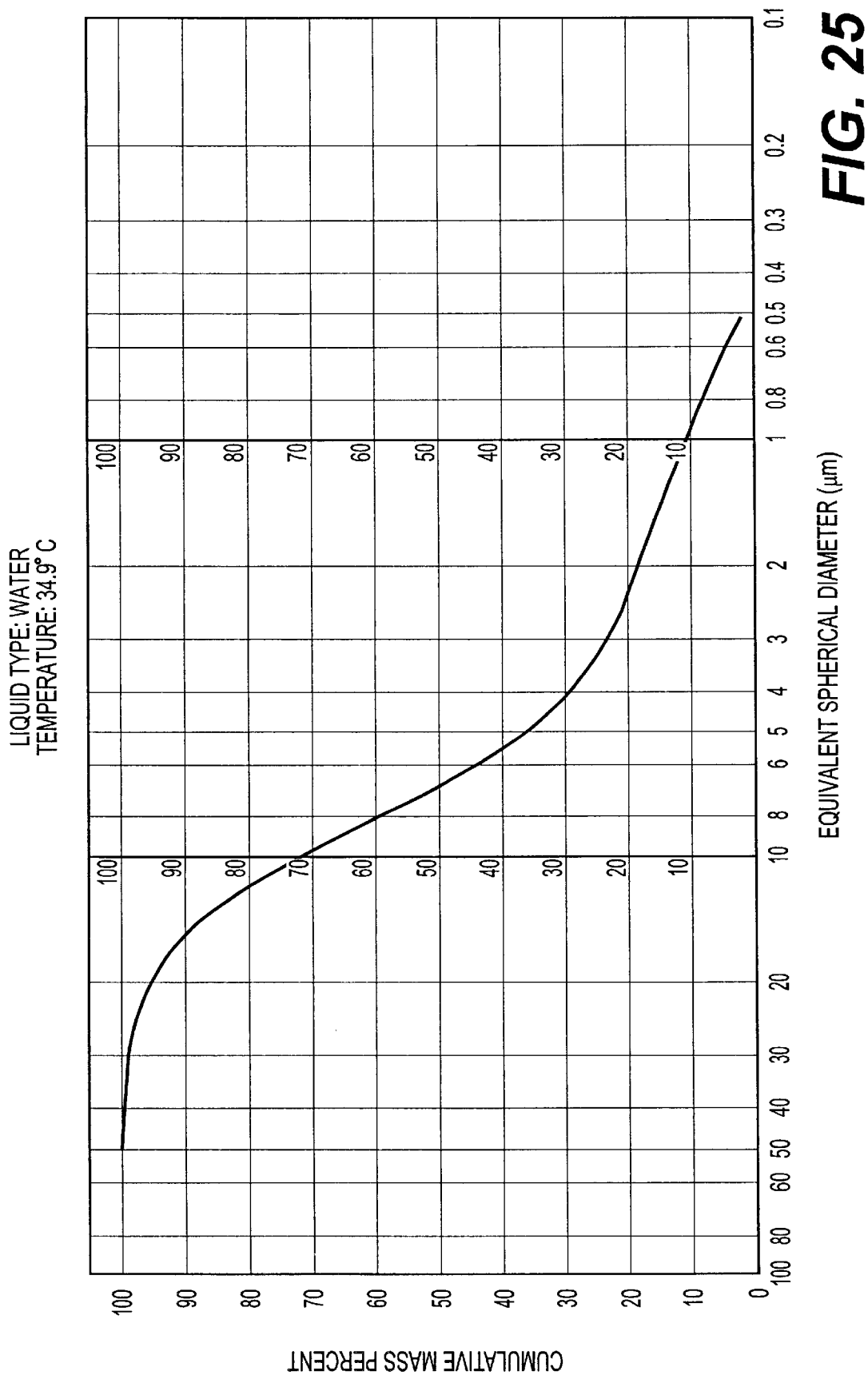
FIG. 25 depicts a SEDIGRAPH 5100 plot of the calcined kaolin product of Example 7A, produced from the 10:90 hydrous kaolin blend of Example 7.
Figure 26:
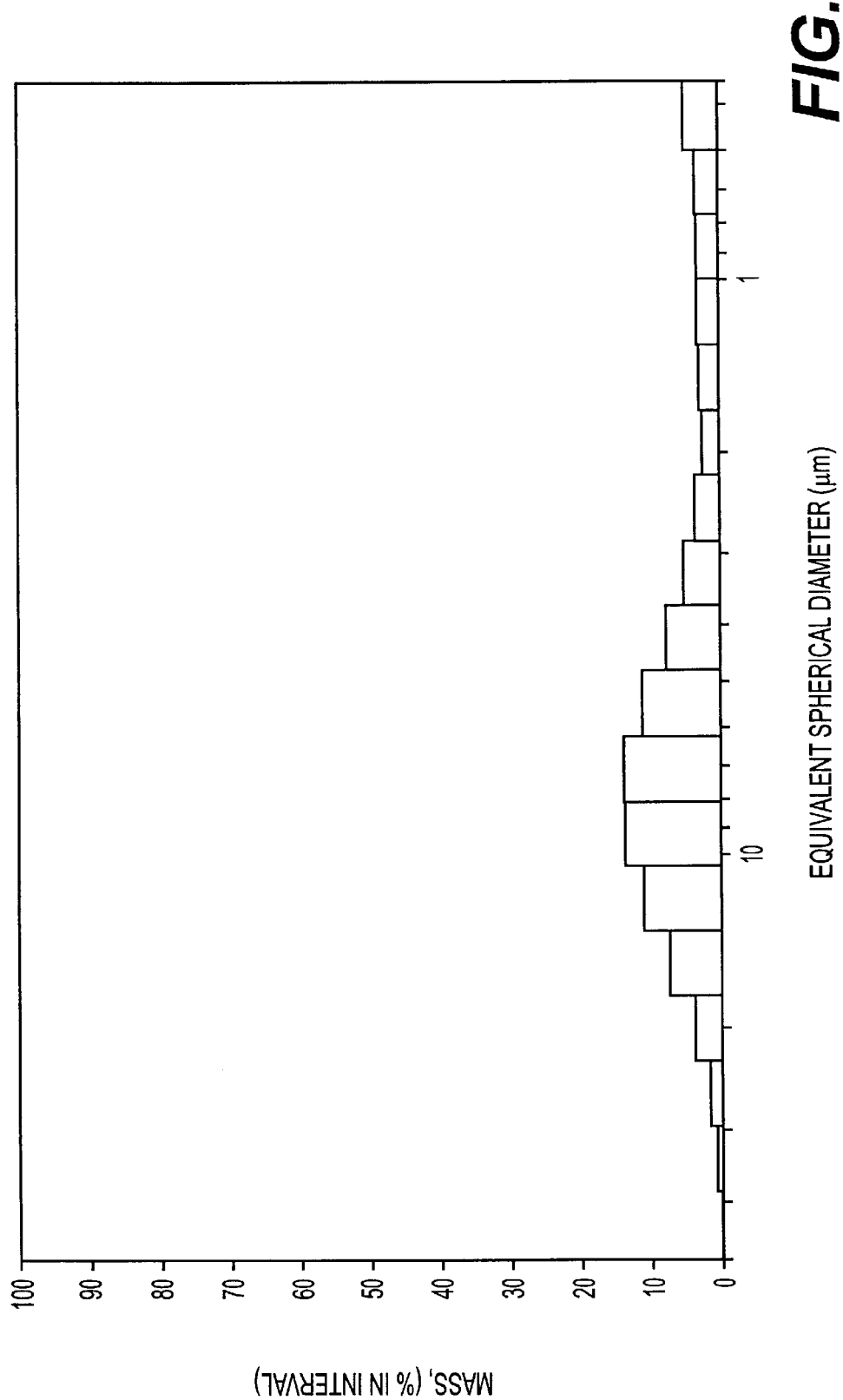
FIG. 26 depicts the information contained in FIG. 25 (the calcined kaolin product of Example 7A produced from the 10:90 hydrous kaolin blend) in histogram form.
Figure 27:
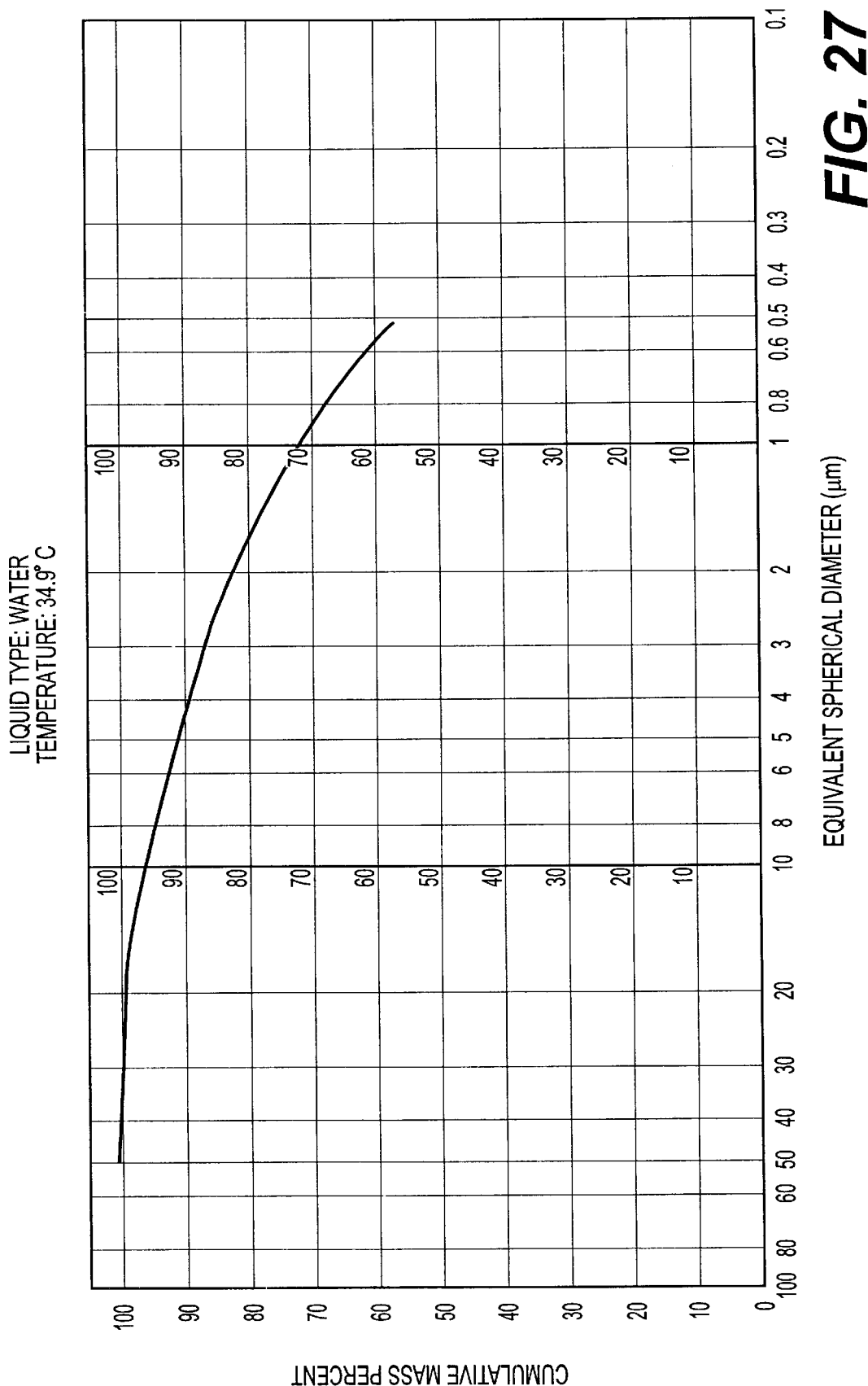
FIG. 27 is a SEDIGRAPH 5100 plot of the 90:10 hydrous blend of Example 8.
Figure 28:
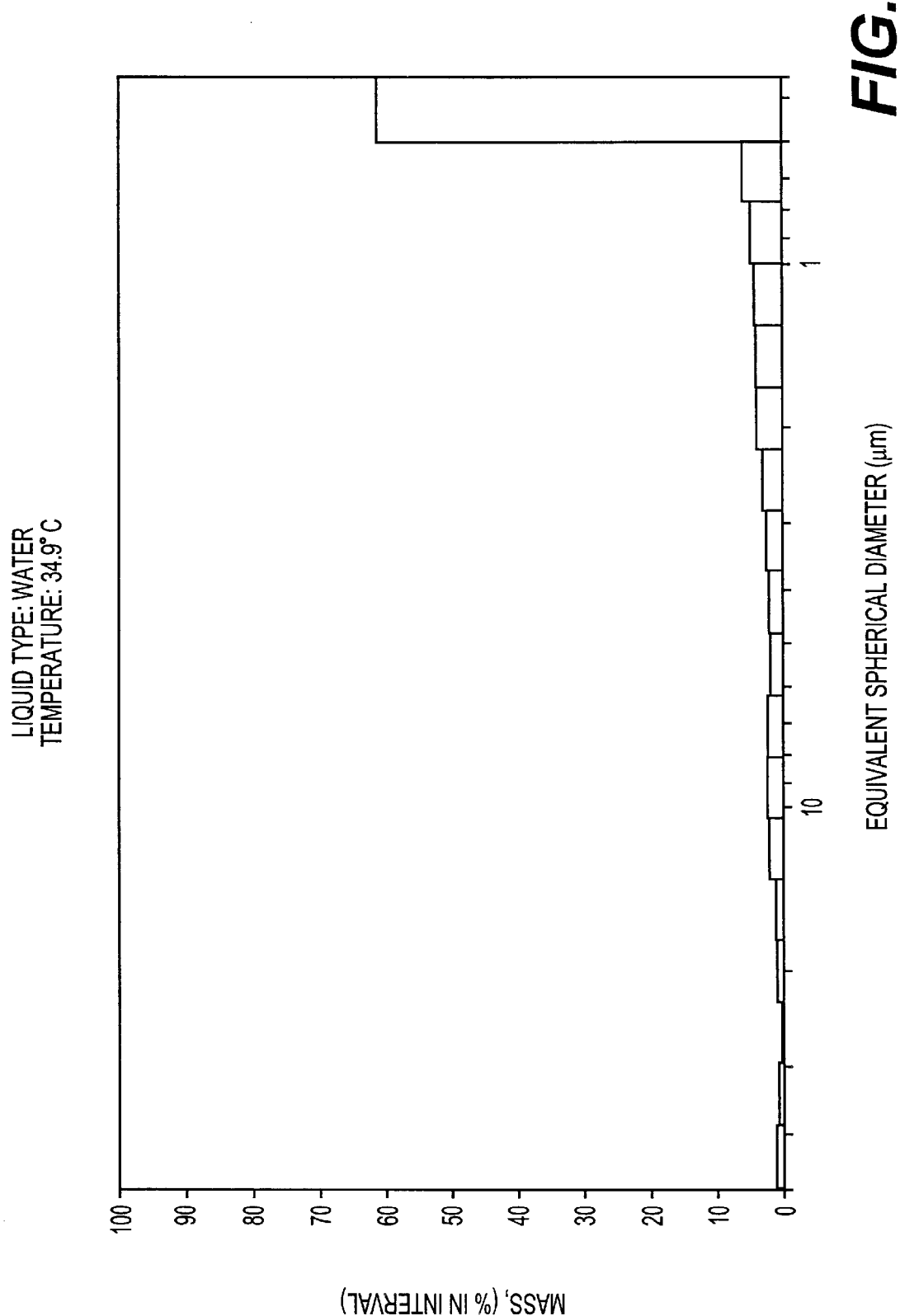
FIG. 28 depicts the information contained in FIG. 27 (the hydrous blend of Example 8) in histogram form.
Figure 29:
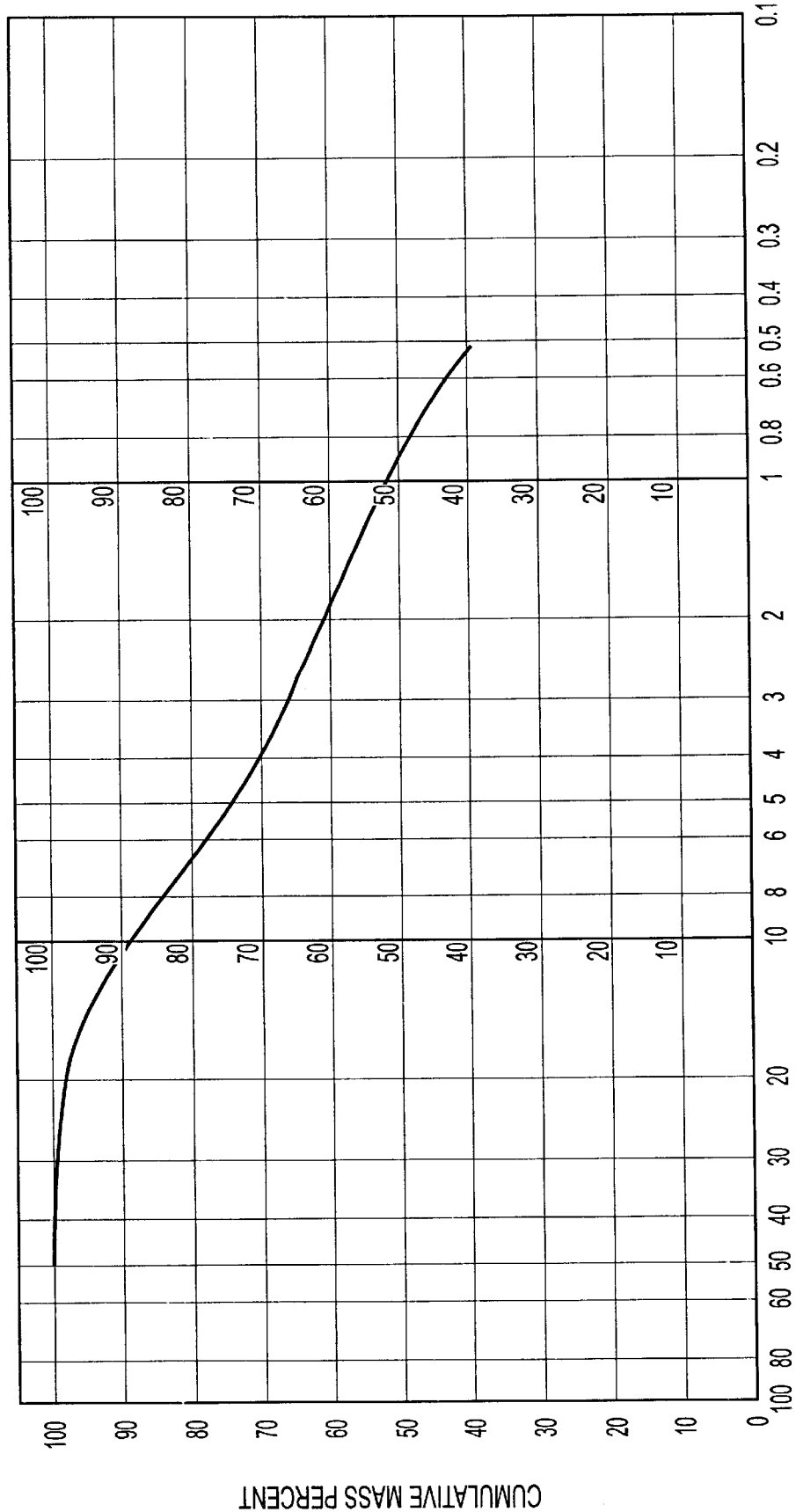
FIG. 29 is a SEDIGRAPH 5100 plot of the 60:40 hydrous blend of Example 8.
Figure 30:
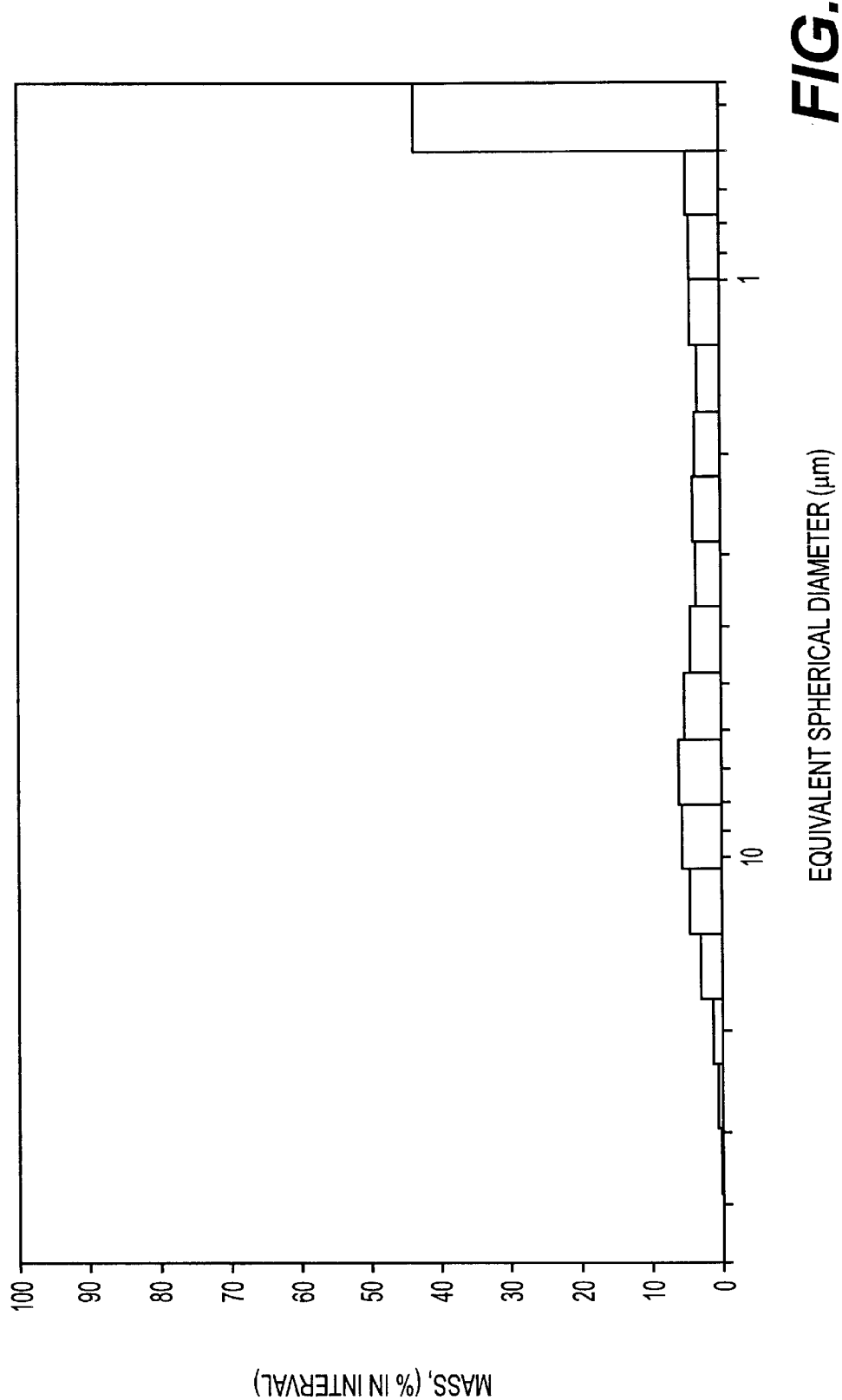
FIG. 30 depicts the information contained in FIG. 29 (the hydrous blend of Example 8) in histogram form.
Figure 31:
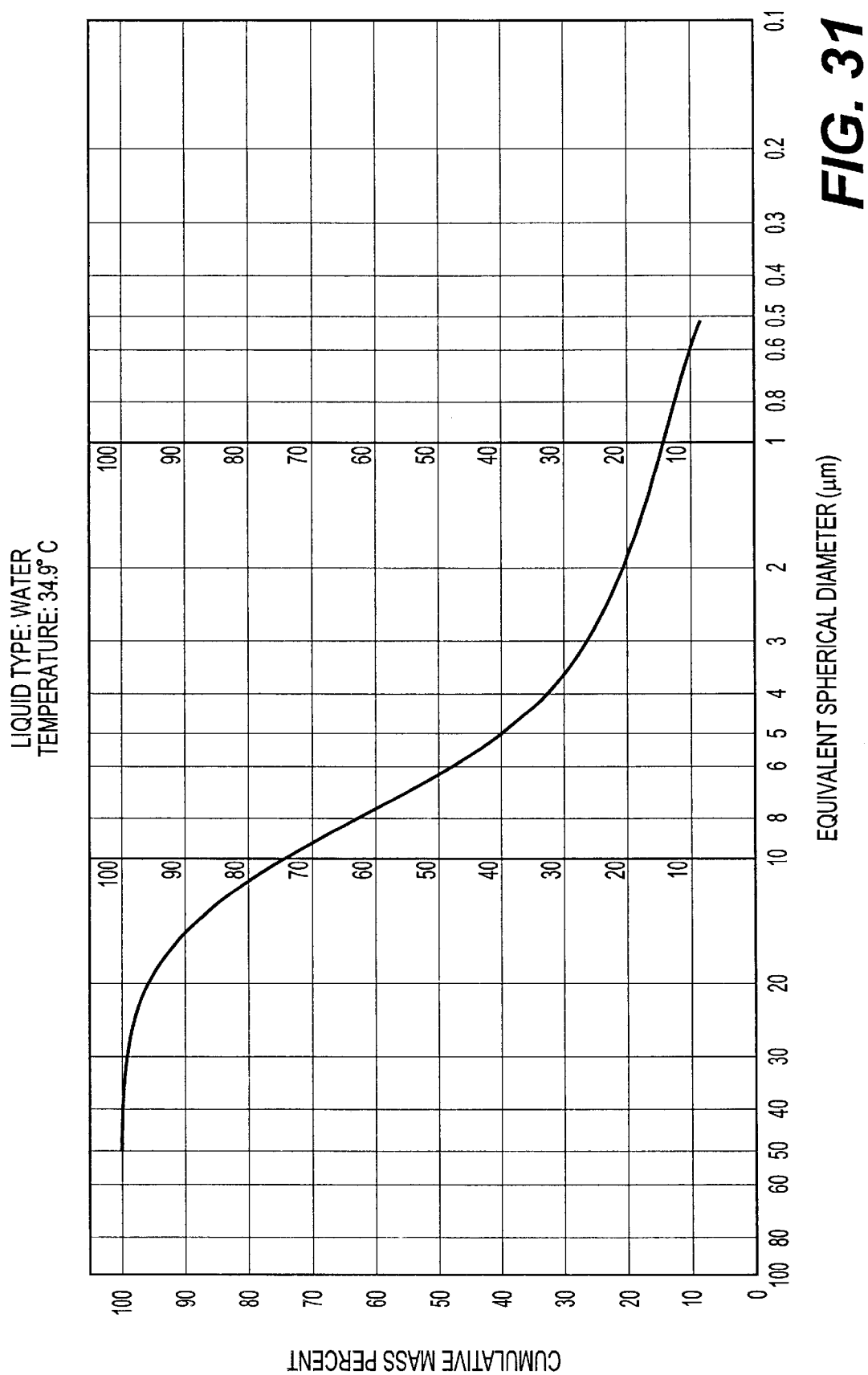
FIG. 31 is a SEDIGRAPH 5100 plot of the 10:90 hydrous blend of Example 8.
Figure 32:
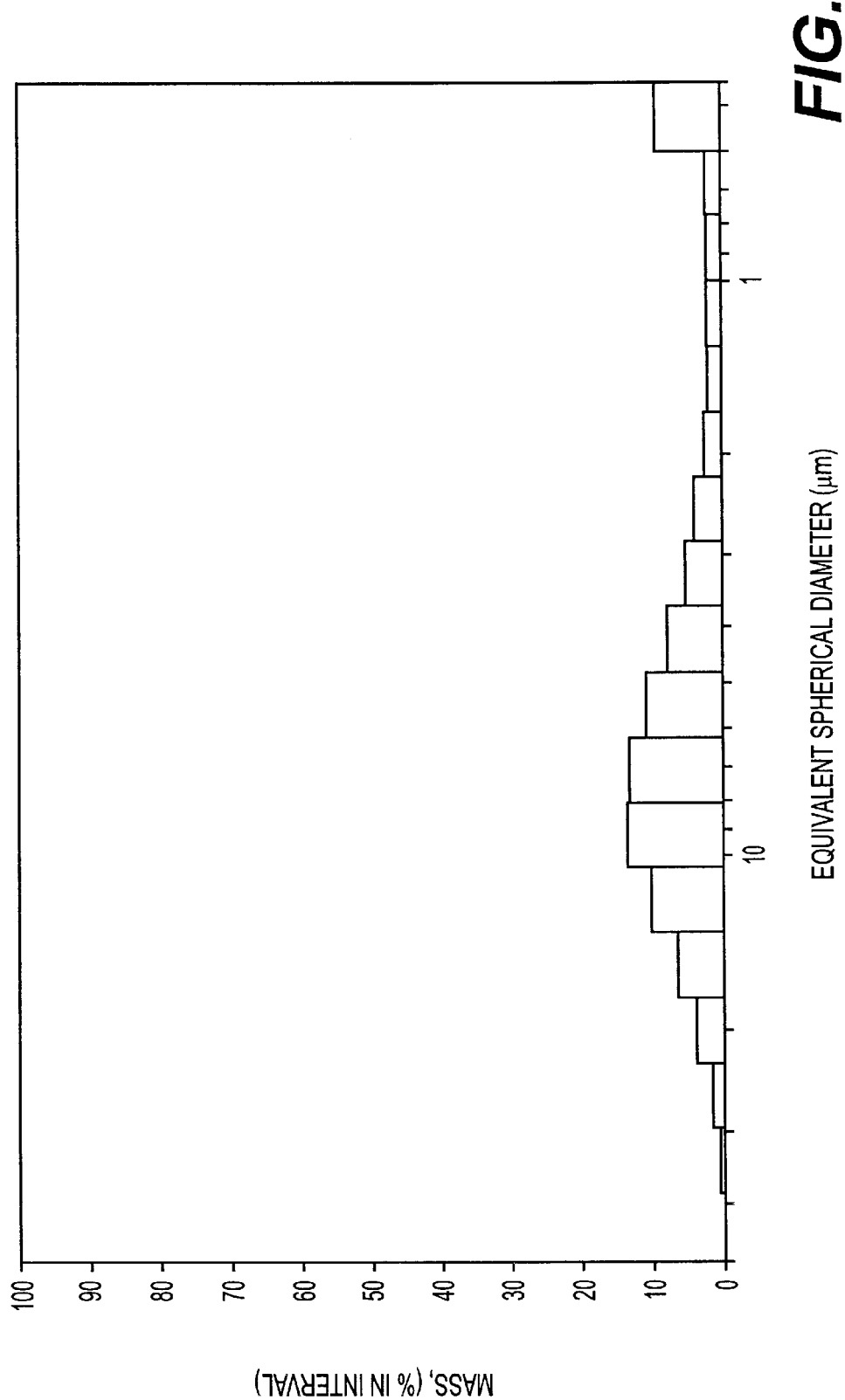
FIG. 32 depicts the information contained in FIG. 31 (the hydrous blend of Example 8) in histogram form.
Figure 33:
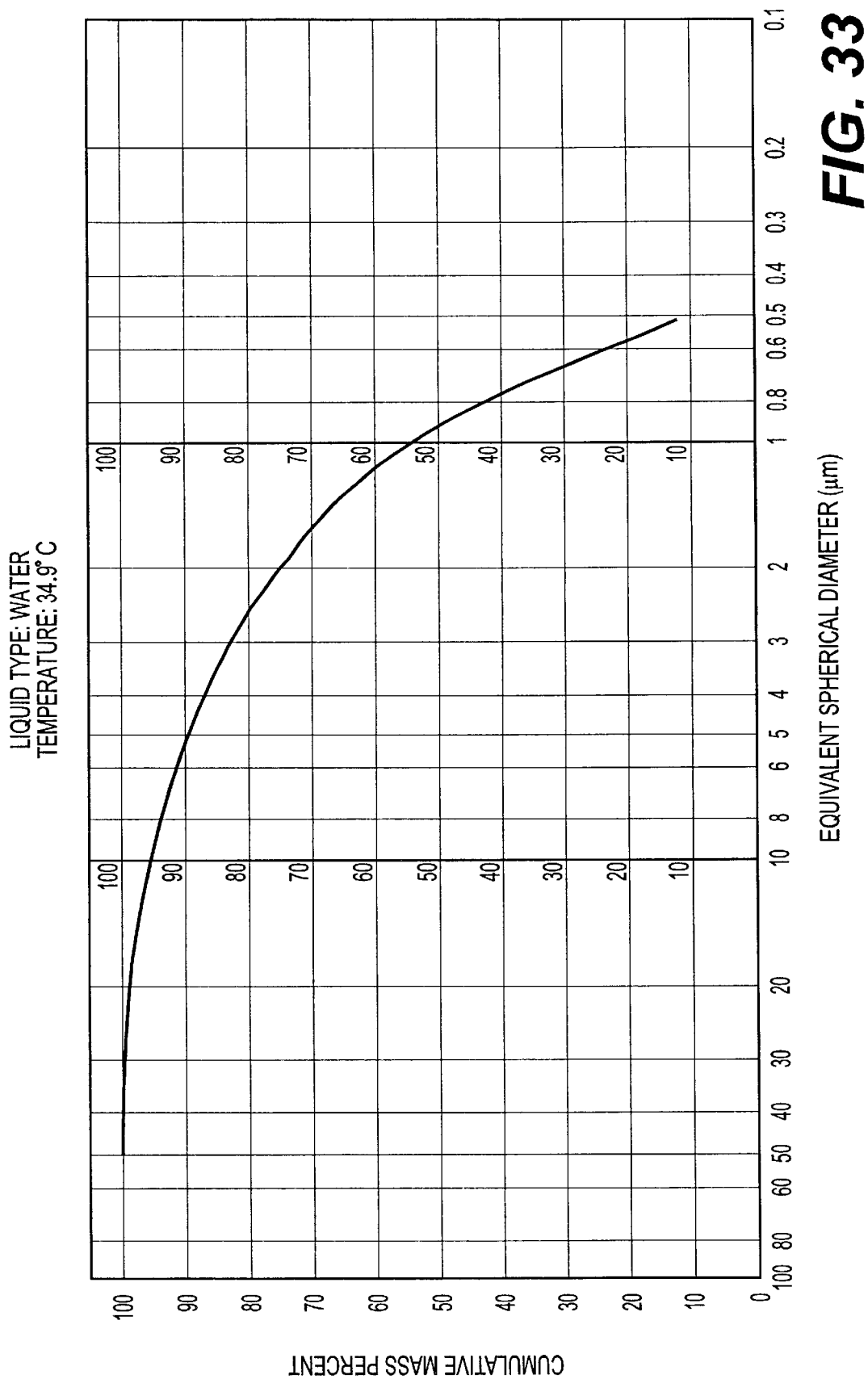
FIG. 33 depicts a SEDIGRAPH 5100 plot of the calcined kaolin product of Example 8A, produced from the 90:10 hydrous kaolin blend of Example 8 represented in FIGS. 27 and 28.
Figure 34:
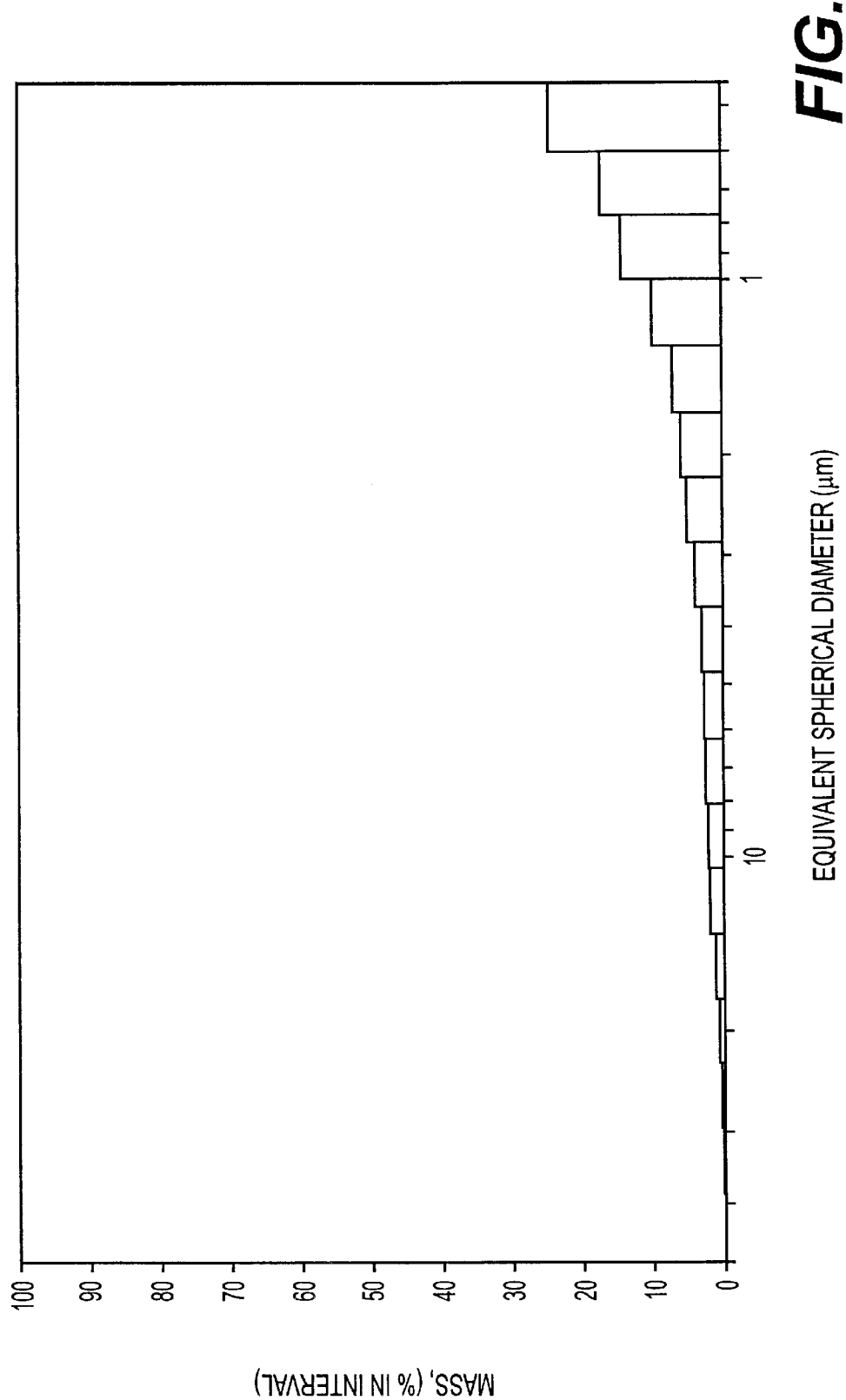
FIG. 34 depicts the information contained in FIG. 33 (the calcined kaolin product of Example 8A produced from the 90:10 hydrous kaolin blend) in histogram form.
Figure 35:
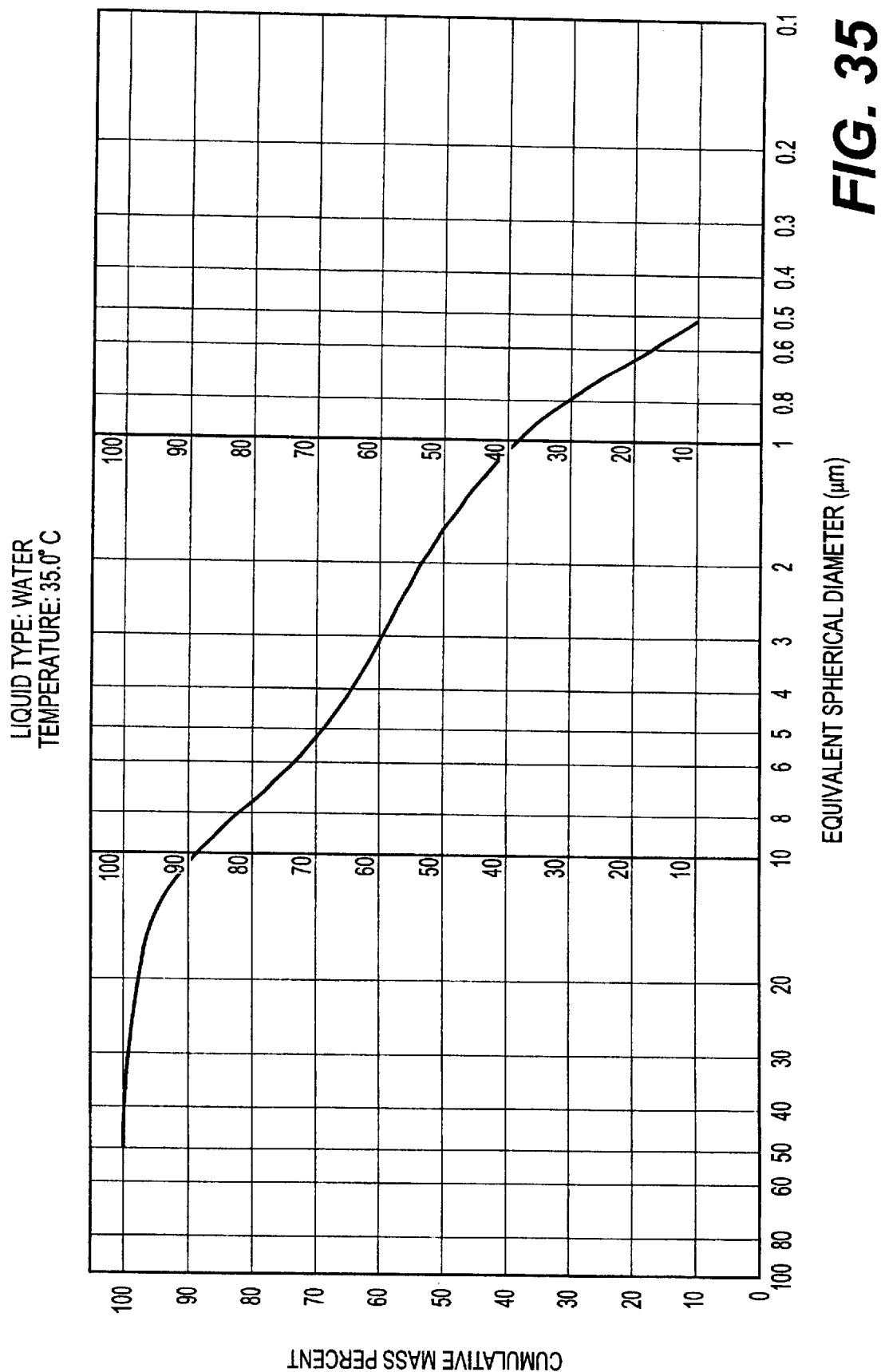
FIG. 35 depicts a SEDIGRAPH 5100 plot of the calcined kaolin product of Example 8A, produced from the 60:40 hydrous kaolin blend of Example 8 represented in FIGS. 29 and 30.
Figure 36:
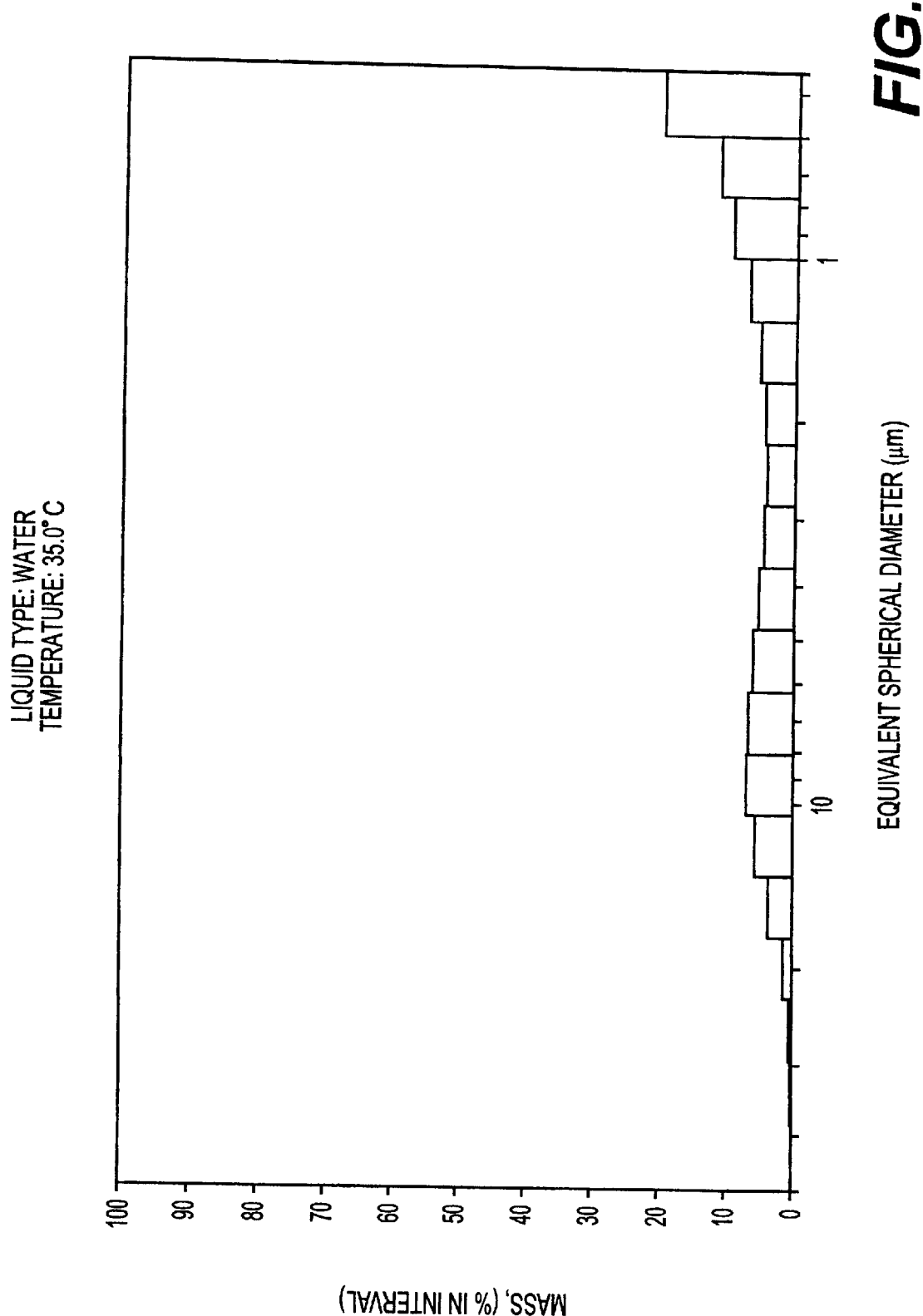
FIG. 36 depicts the information contained in FIG. 35 (the calcined kaolin product of Example 8A produced from the 60:40 hydrous kaolin blend) in histogram form.
Figure 37:
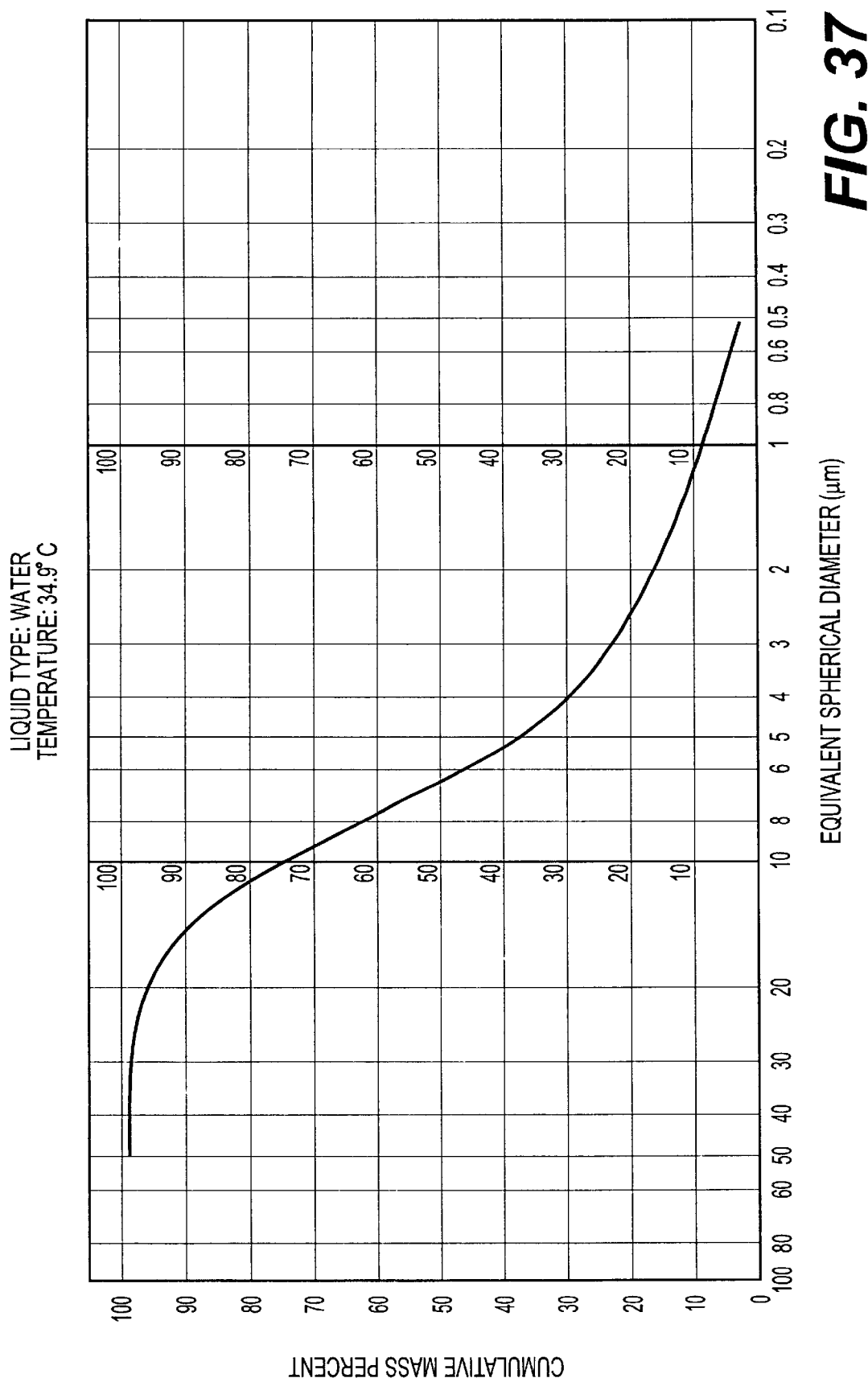
FIG. 37 depicts a SEDIGRAPH 5100 plot of the calcined kaolin product of Example 8A, produced from the 10:90 hydrous kaolin blend of Example 8 represented in FIGS. 31 and 32.
Figure 38:
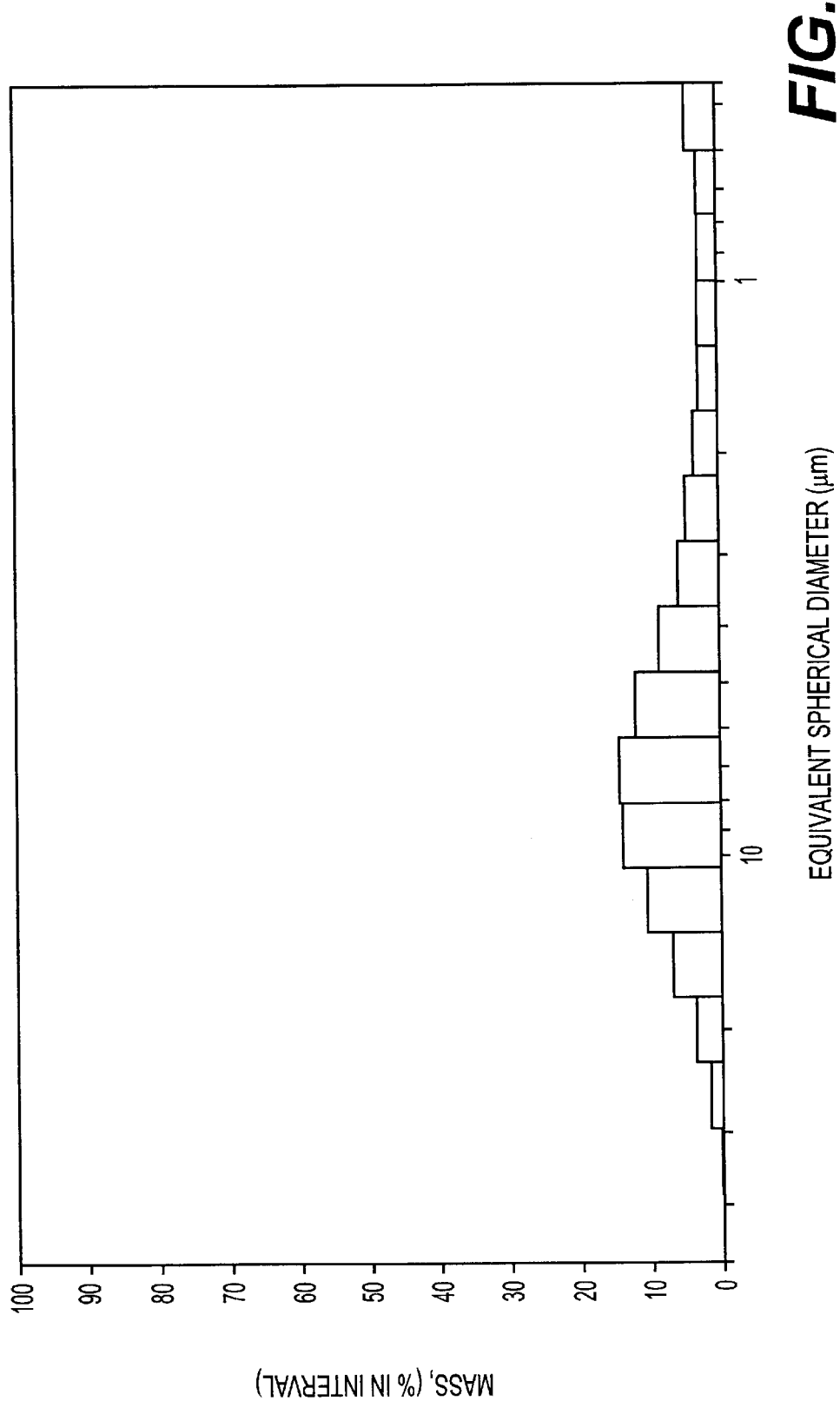
FIG. 38 depicts the information contained in FIG. 37 (the calcined kaolin product of Example 8A produced from the 10:90 hydrous kaolin blend) in histogram form.
Figure 39:
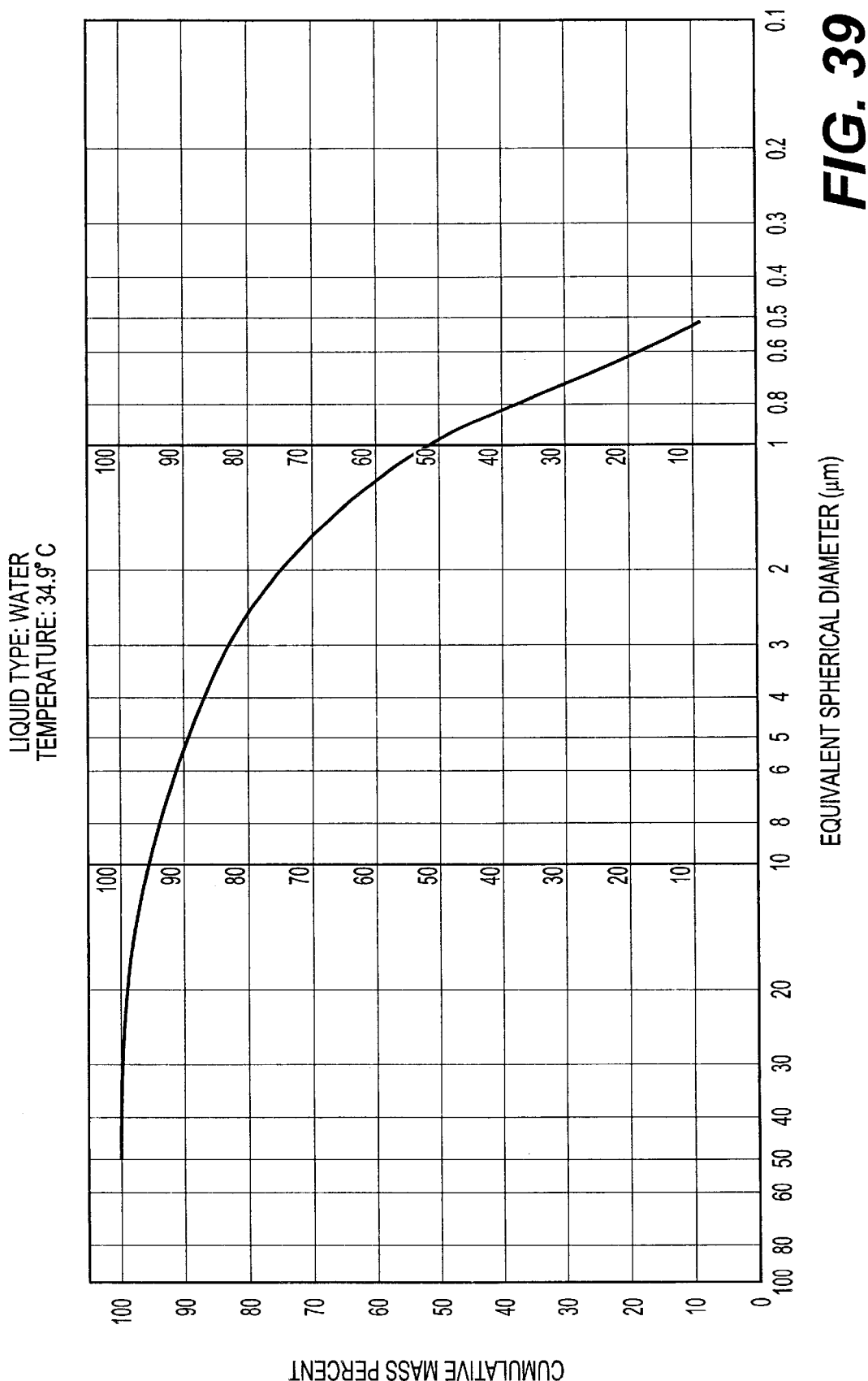
FIG. 39 depicts a SEDIGRAPH 5100 plot of the calcined kaolin product of Example 9A, produced from the 90:10 hydrous kaolin blend of Example 9.
Figure 40:
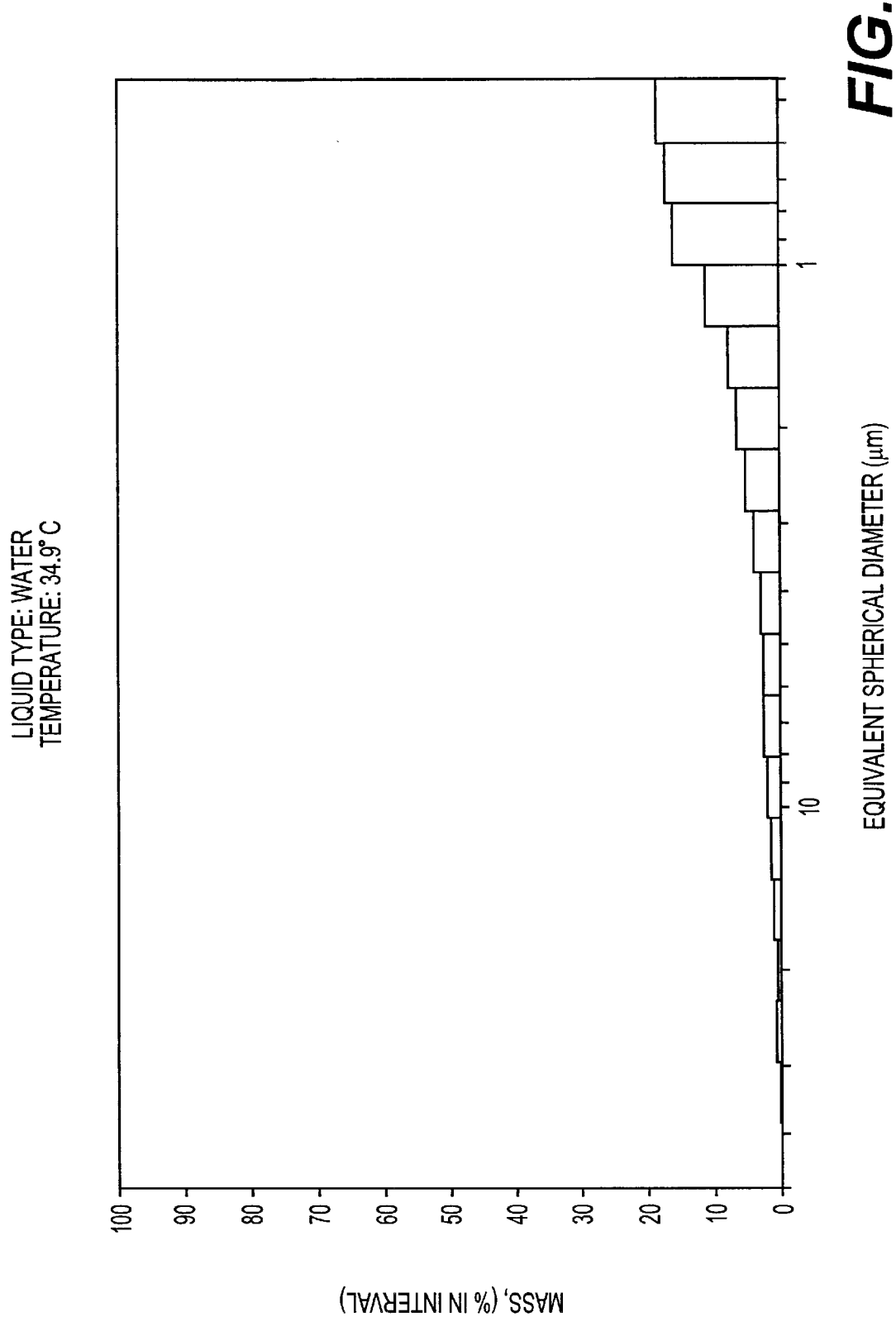
FIG. 40 depicts the information contained in FIG. 39 (the calcined kaolin product of Example 9A produced from the 90:10 hydrous kaolin blend) in histogram form.
Figure 41:
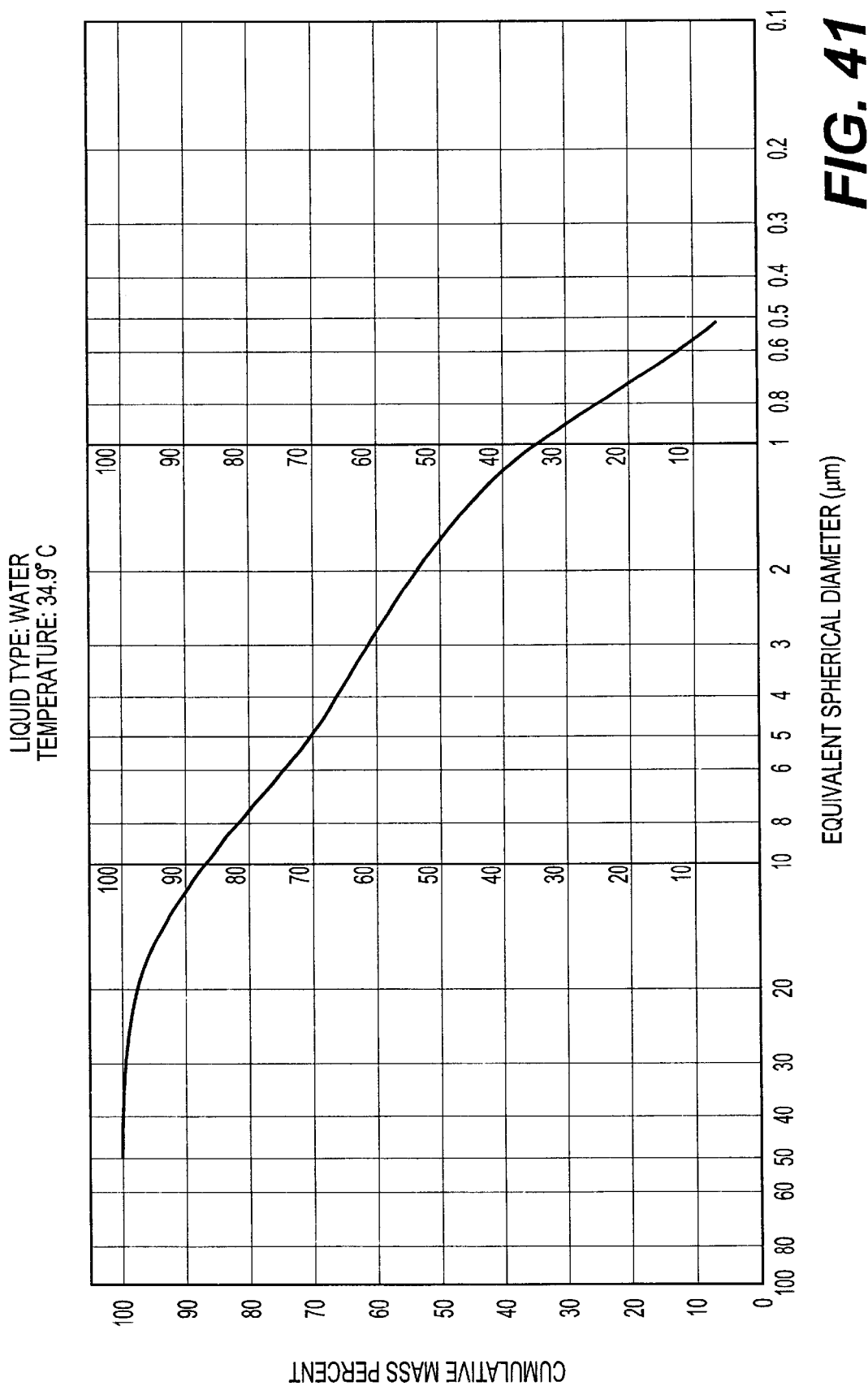
FIG. 41 depicts a SEDIGRAPH 5100 plot of the calcined kaolin product of Example 9A, produced from the 60:40 hydrous kaolin blend of Example 9.
Figure 42:
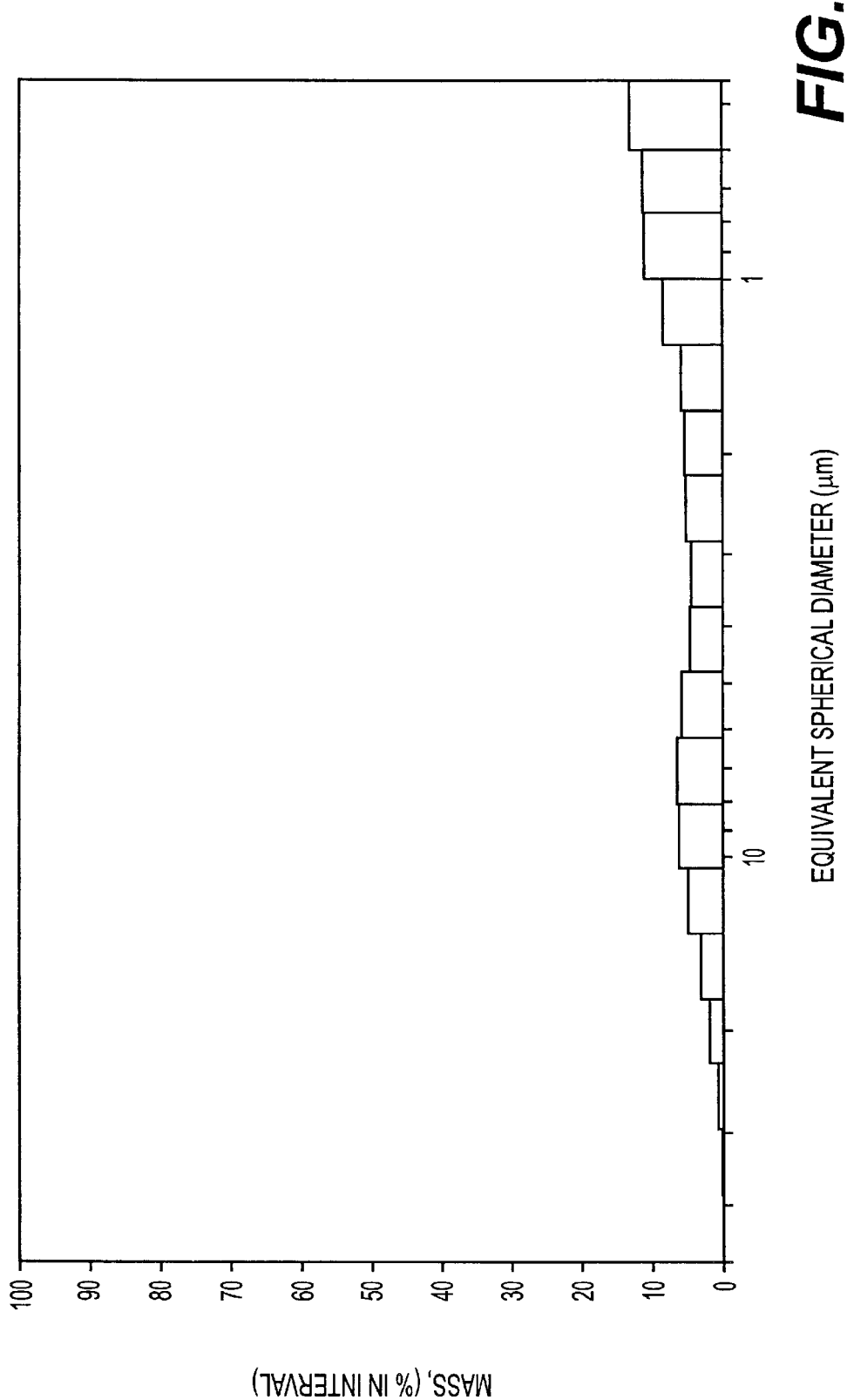
FIG. 42 depicts the information contained in FIG. 41 (the calcined kaolin product of Example 9A produced from the 60:40 hydrous kaolin blend) in histogram form.
Figure 43:
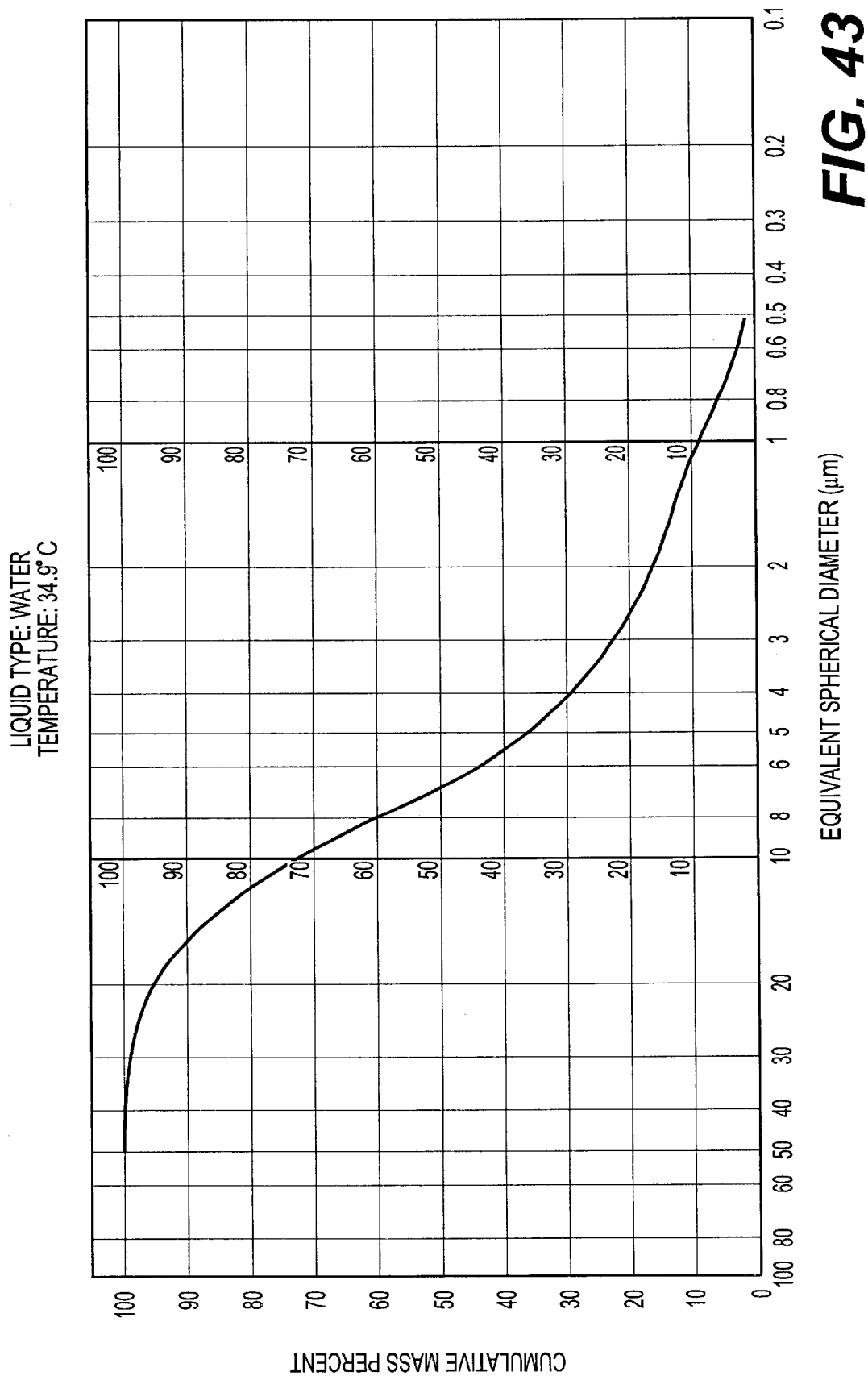
FIG. 43 depicts a SEDIGRAPH 5100 plot of the calcined kaolin product of Example 9A, produced from the 10:90 hydrous kaolin blend of Example 9.
Figure 44:
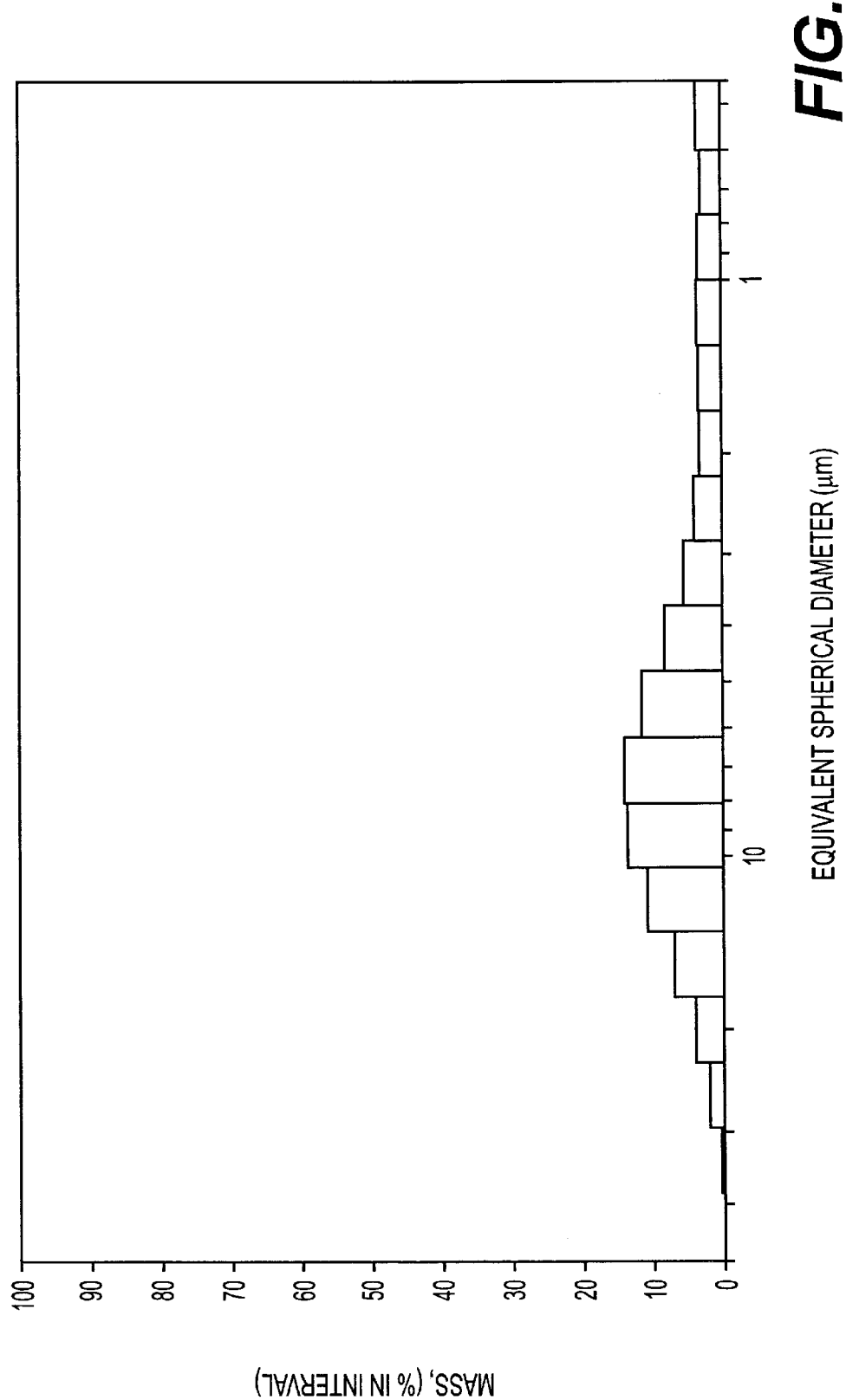
FIG. 44 depicts the information contained in FIG. 43 (the calcined kaolin product of Example 9A produced from the 10:90 hydrous kaolin blend) in histogram form.
Figure 45:
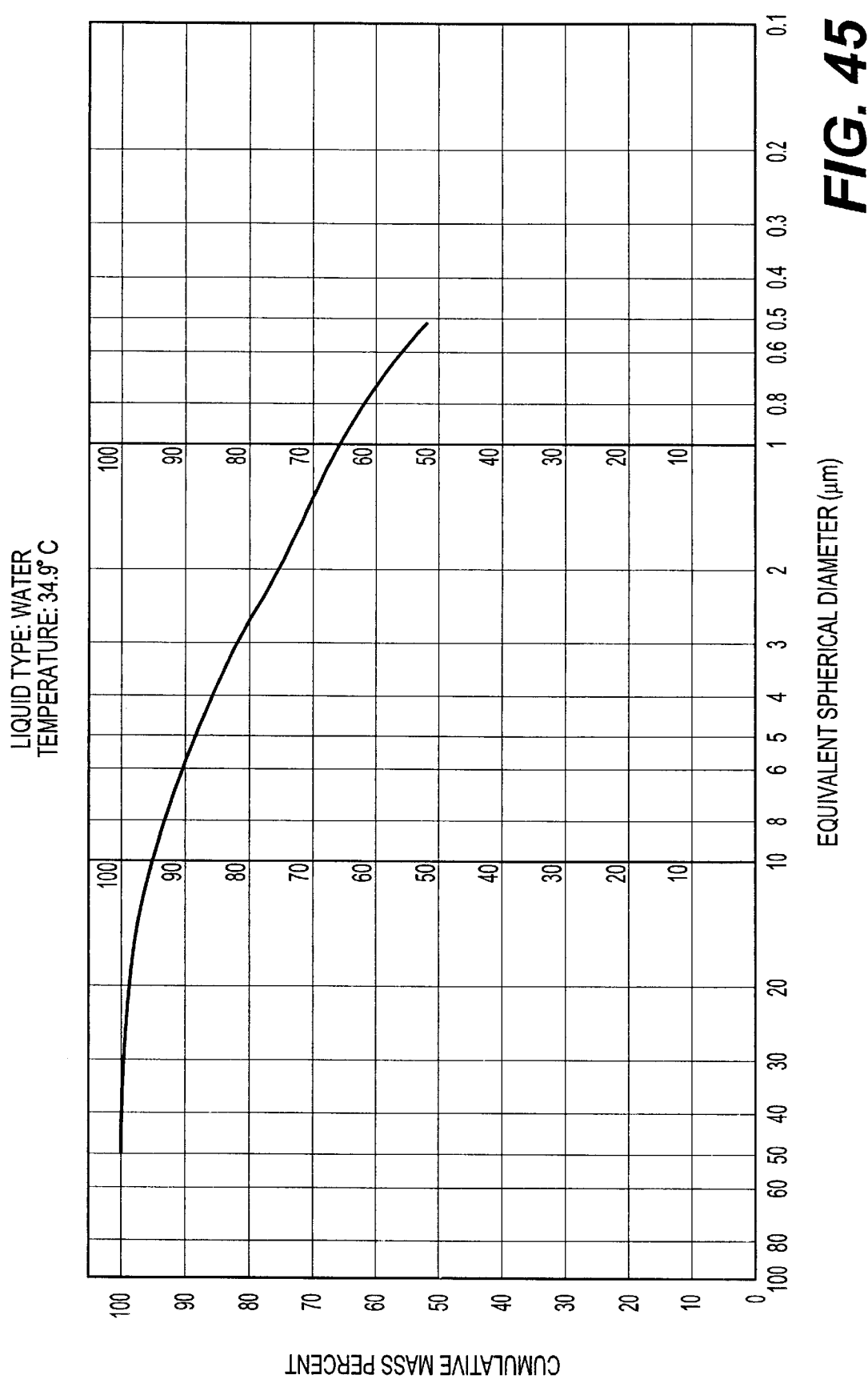
FIG. 45 is a SEDIGRAPH 5100 plot of the 90:10 hydrous blend of Example 10.
Figure 46:
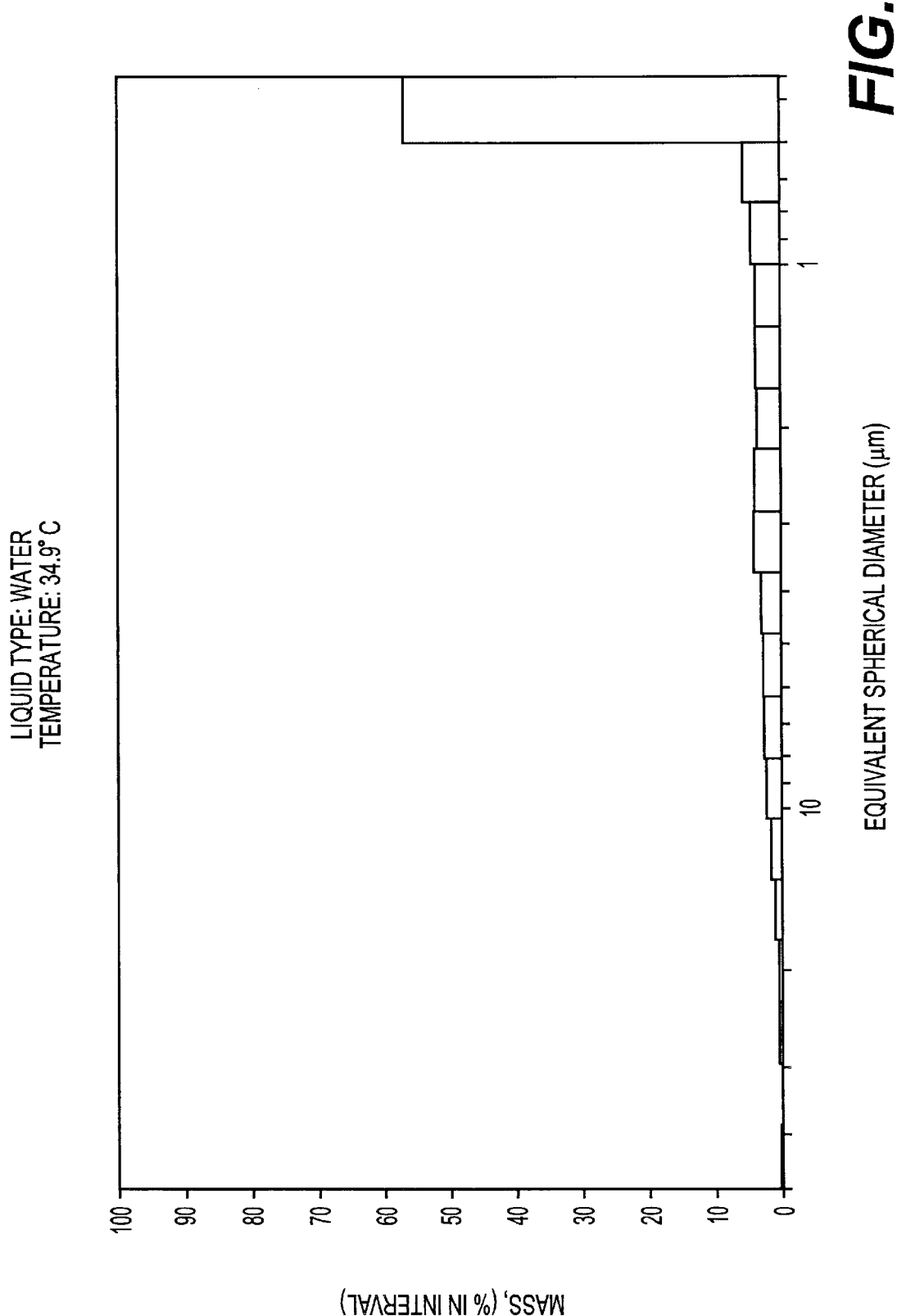
FIG. 46 depicts the information contained in FIG. 45 (the hydrous blend of Example 10) in histogram form.
Figure 47:
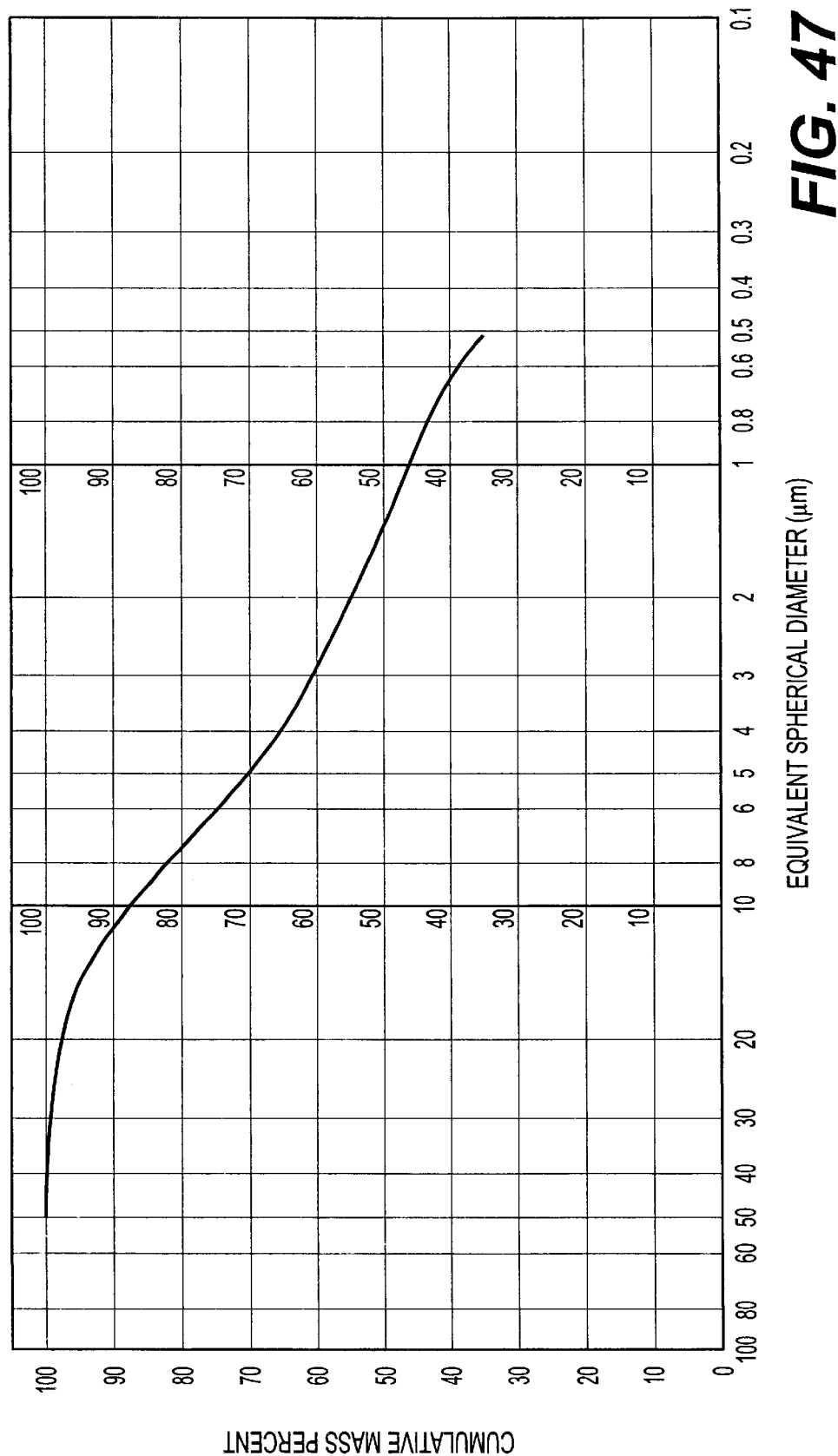
FIG. 47 is a SEDIGRAPH 5100 plot of the 60:40 hydrous blend of Example 10.
Figure 48:
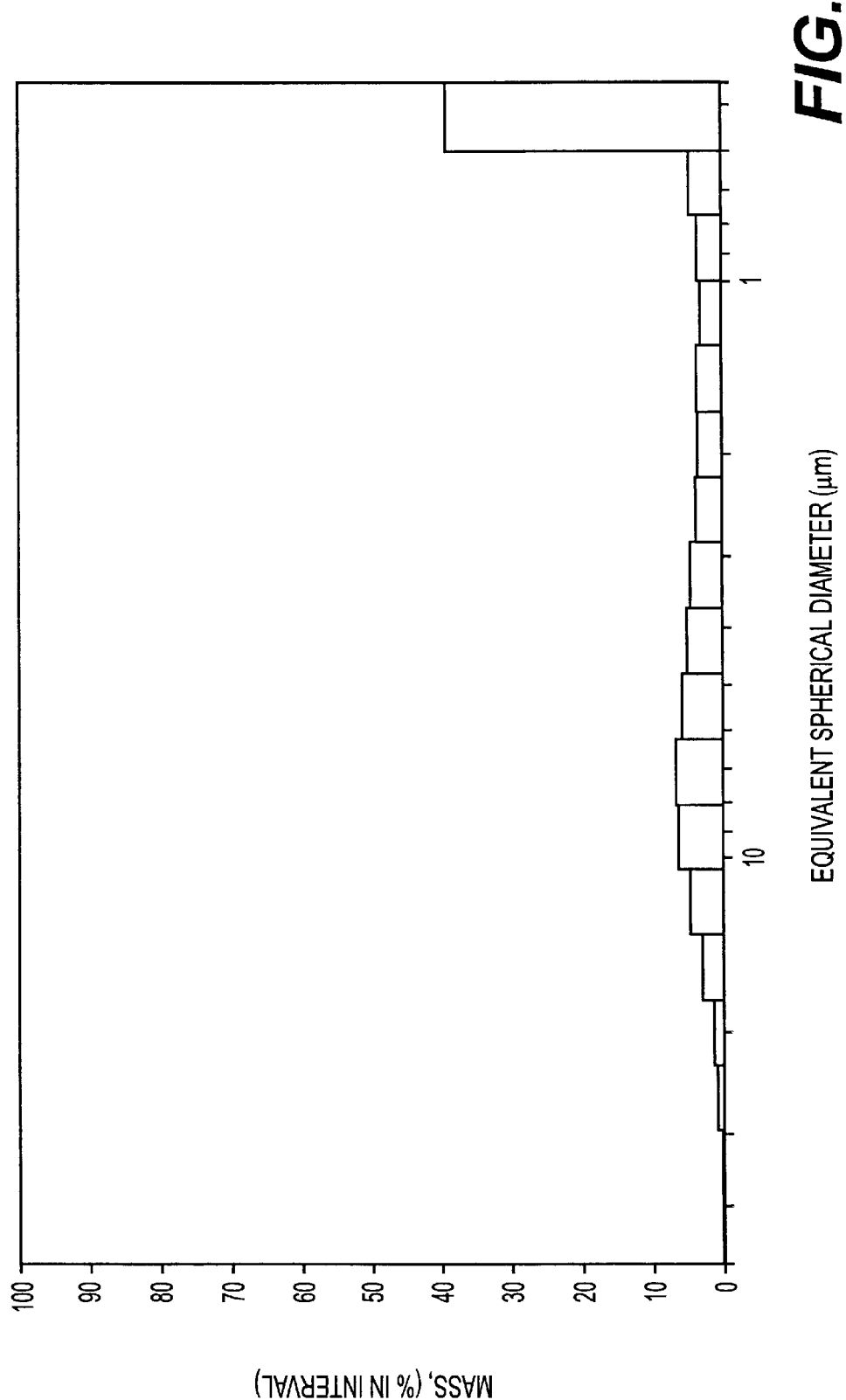
FIG. 48 depicts the information contained in FIG. 47 (the hydrous blend of Example 10) in histogram form.
Figure 49:
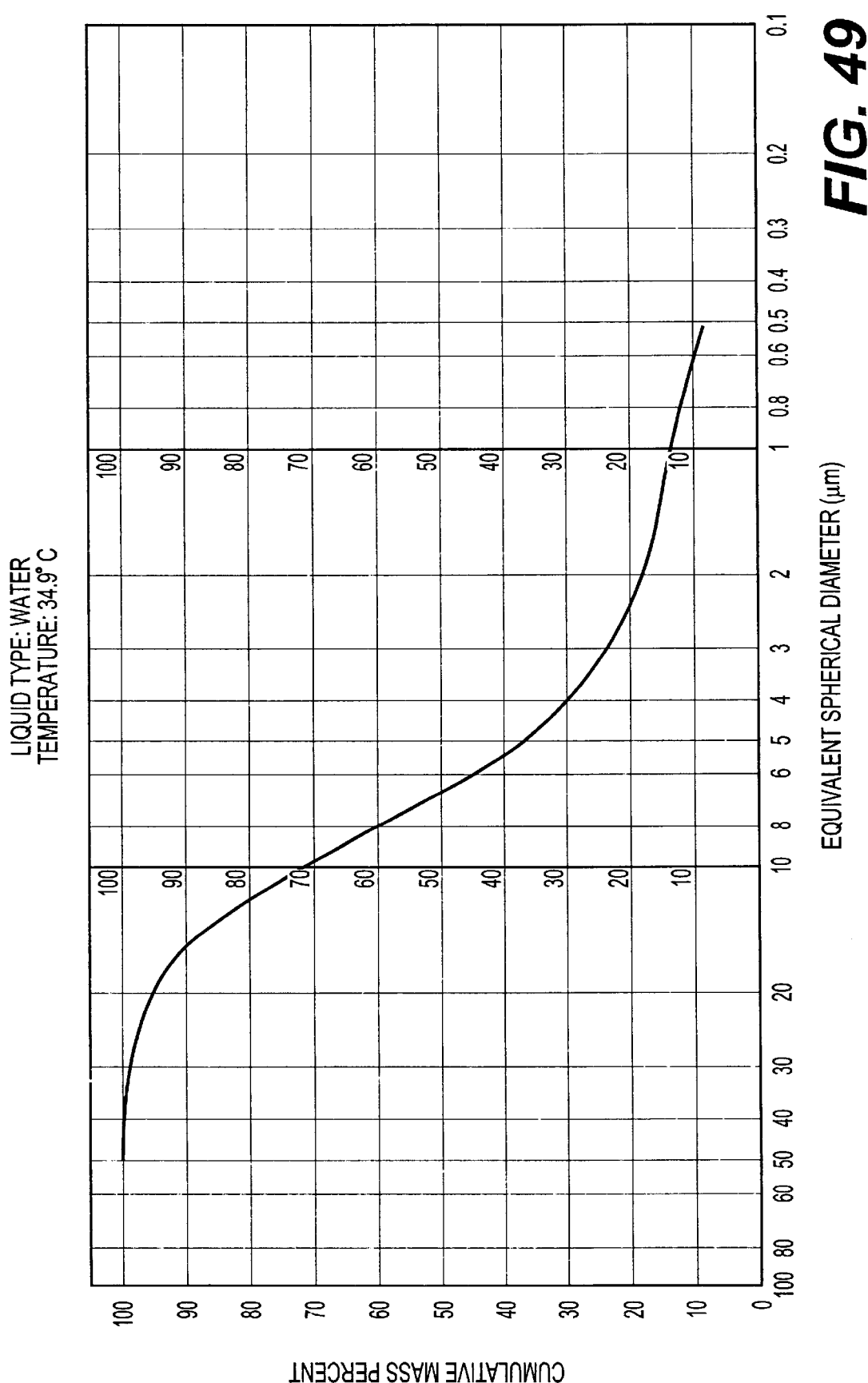
FIG. 49 is a SEDIGRAPH 5100 plot of the 10:90 hydrous blend of Example 10.
Figure 50:
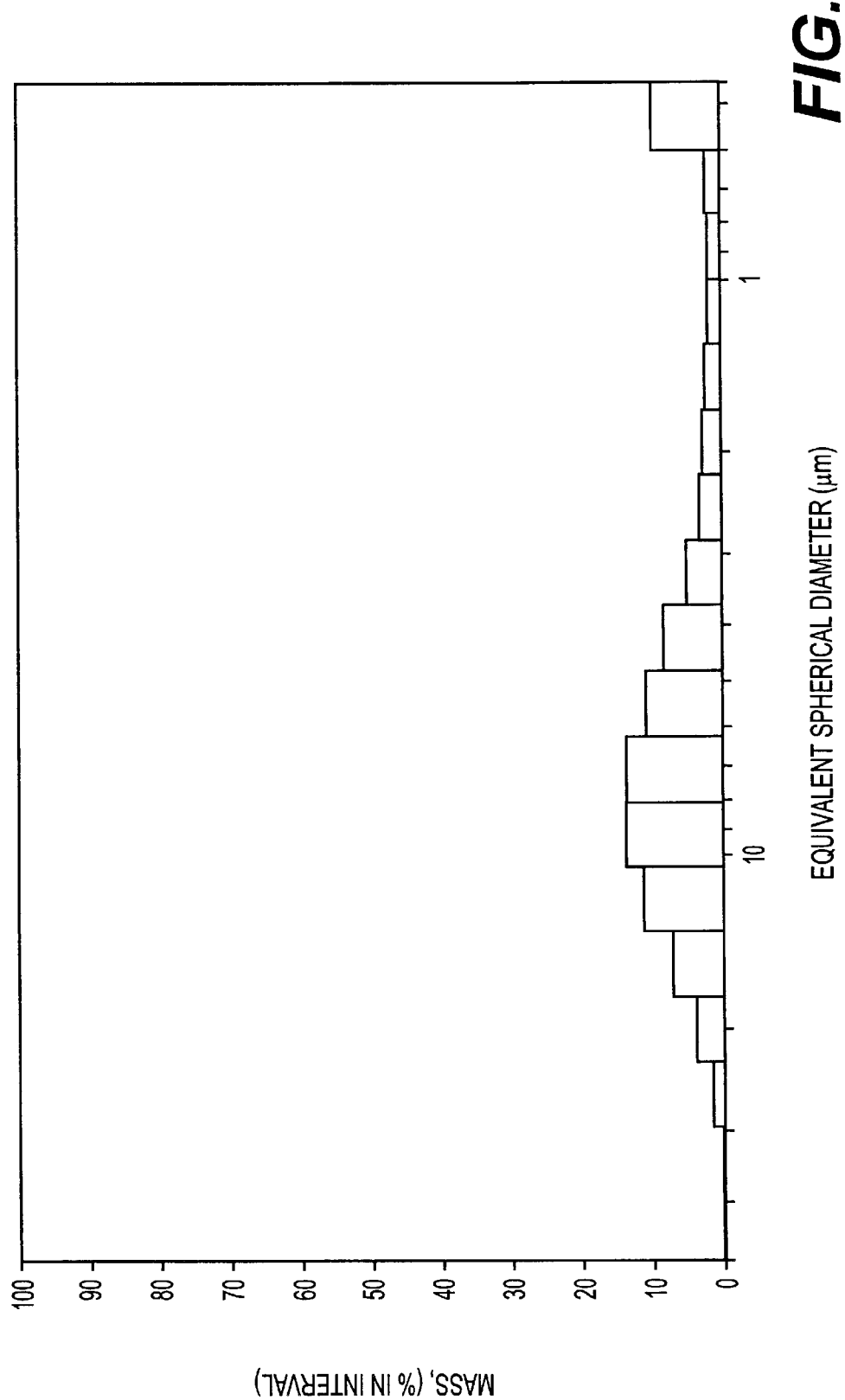
FIG. 50 depicts the information contained in FIG. 49 (the hydrous blend of Example 10) in histogram form.
Figure 51:
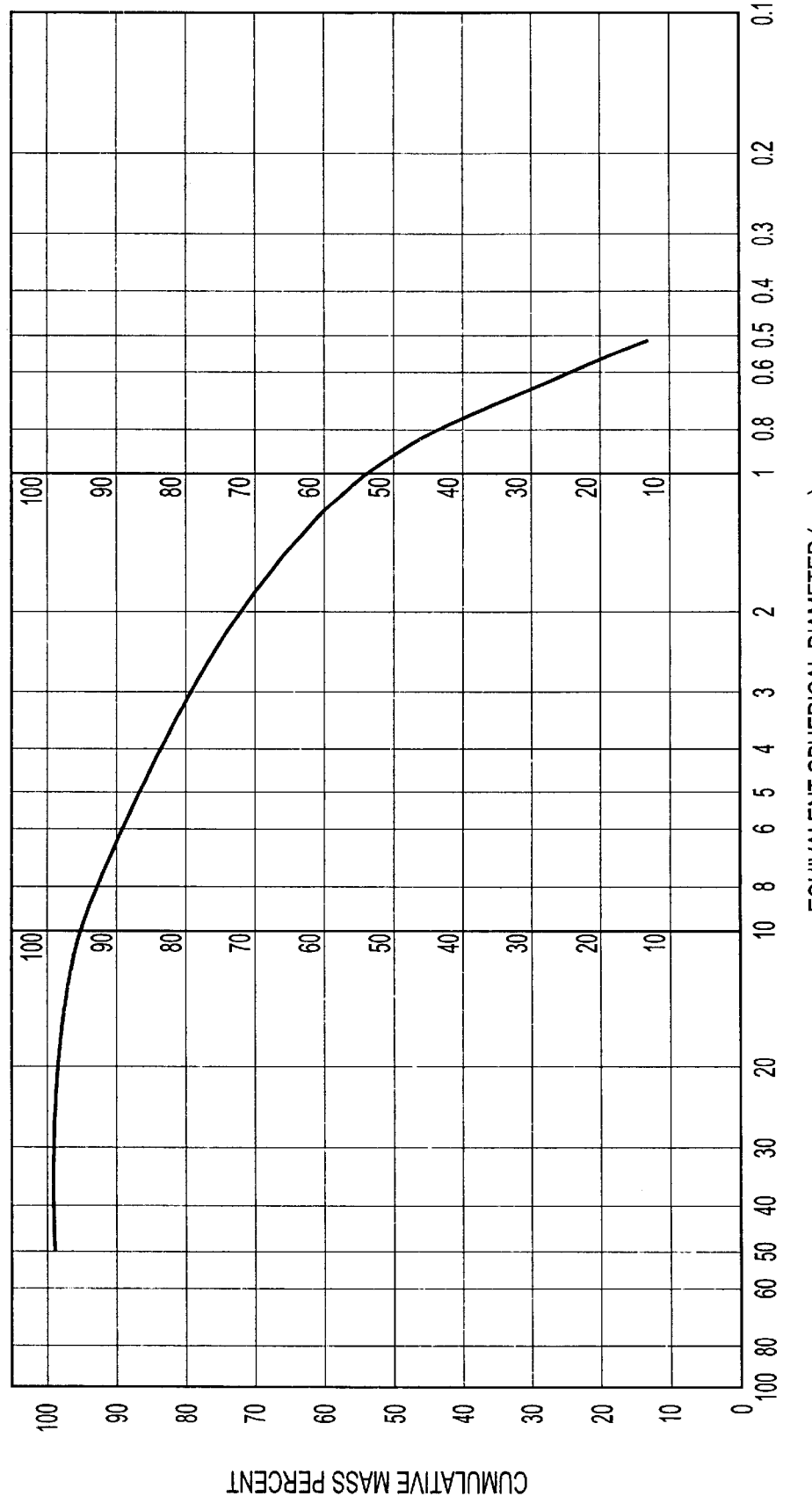
FIG. 51 depicts a SEDIGRAPH 5100 plot of the calcined kaolin product of Example 10A, produced from the 90:10 hydrous kaolin blend of Example 10 represented in FIGS. 45 and 46.
Figure 52:
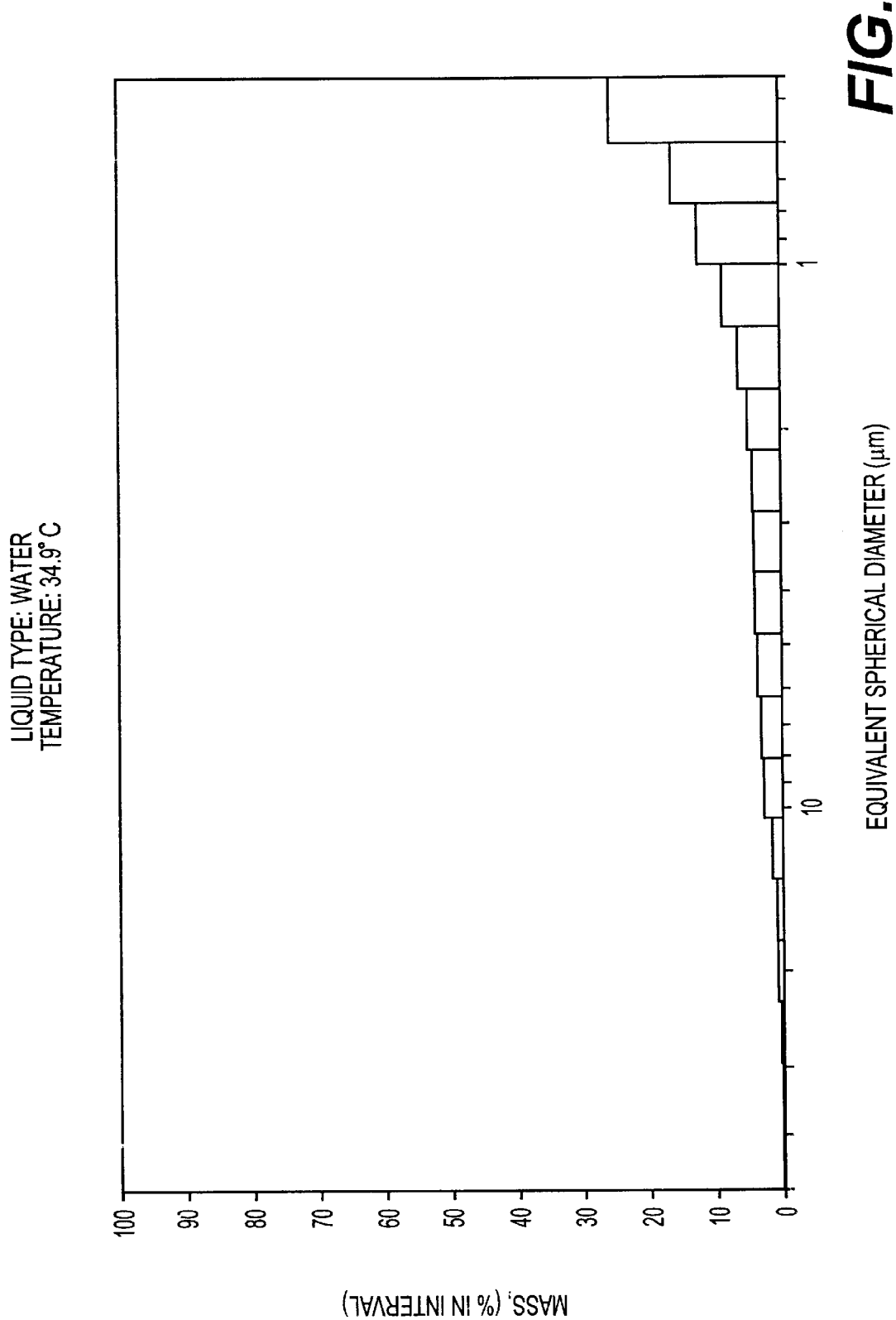
FIG. 52 depicts the information contained in FIG. 51 (the calcined kaolin product of Example 10A produced from the 90:10 hydrous kaolin blend) in histogram form.
Figure 53:
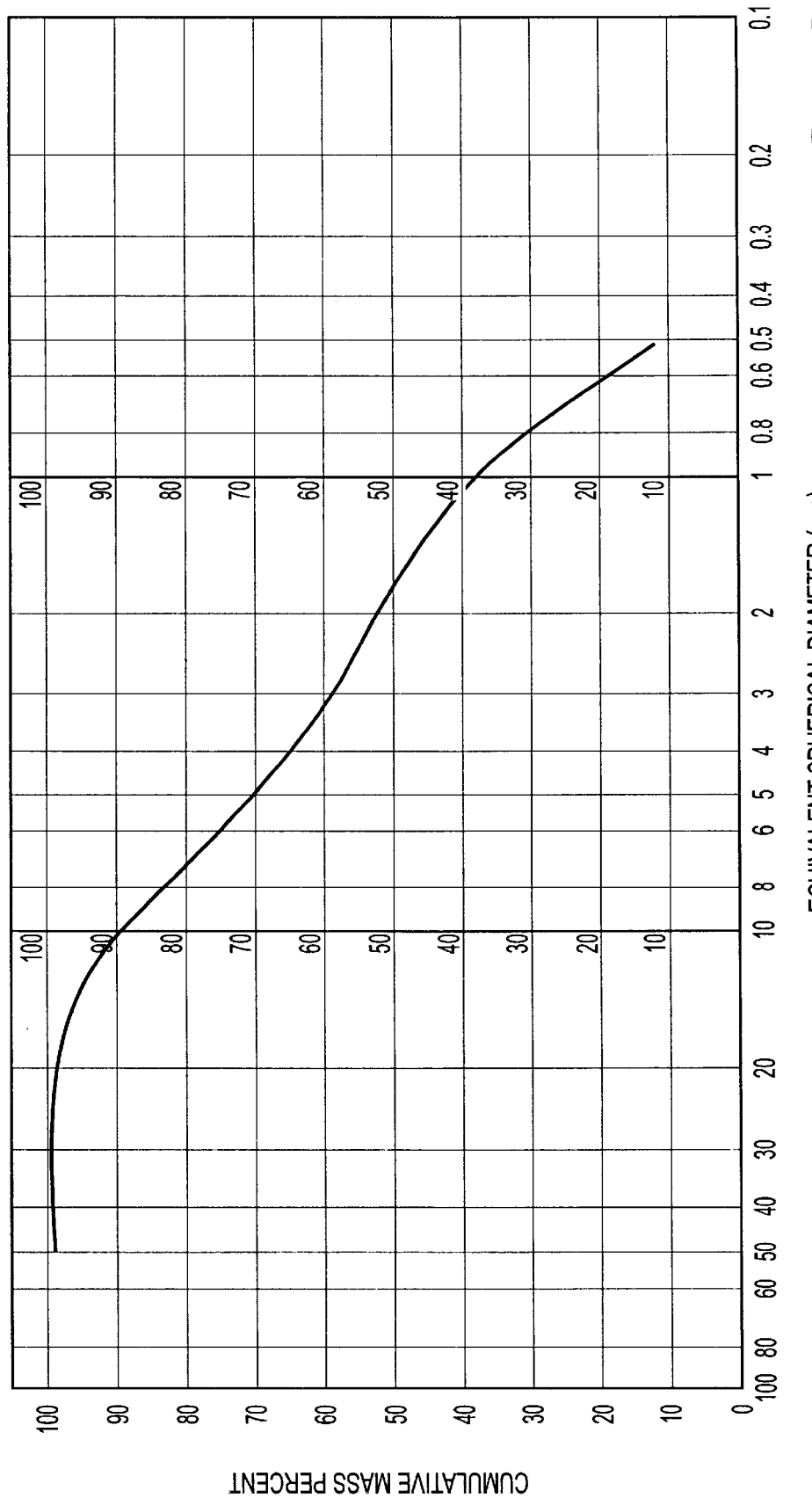
FIG. 53 depicts a SEDIGRAPH 5100 plot of the calcined kaolin product of Example 10A, produced from the 60:40 hydrous kaolin blend of Example 10 represented in FIGS. 47 and 48.
Figure 54:
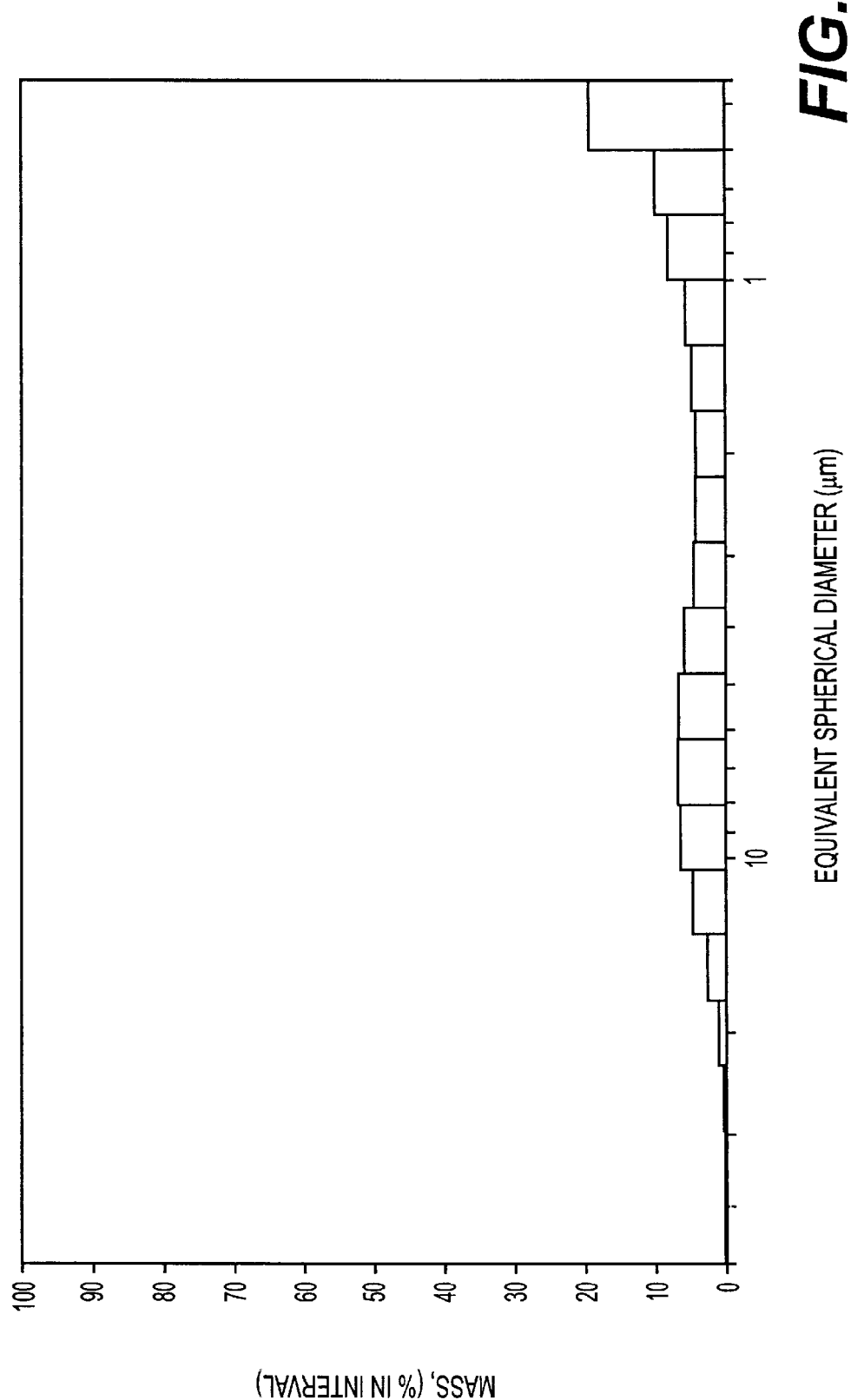
FIG. 54 depicts the information contained in FIG. 53 (the calcined kaolin product of Example 10A produced from the 60:40 hydrous kaolin blend) in histogram form.
Figure 55:
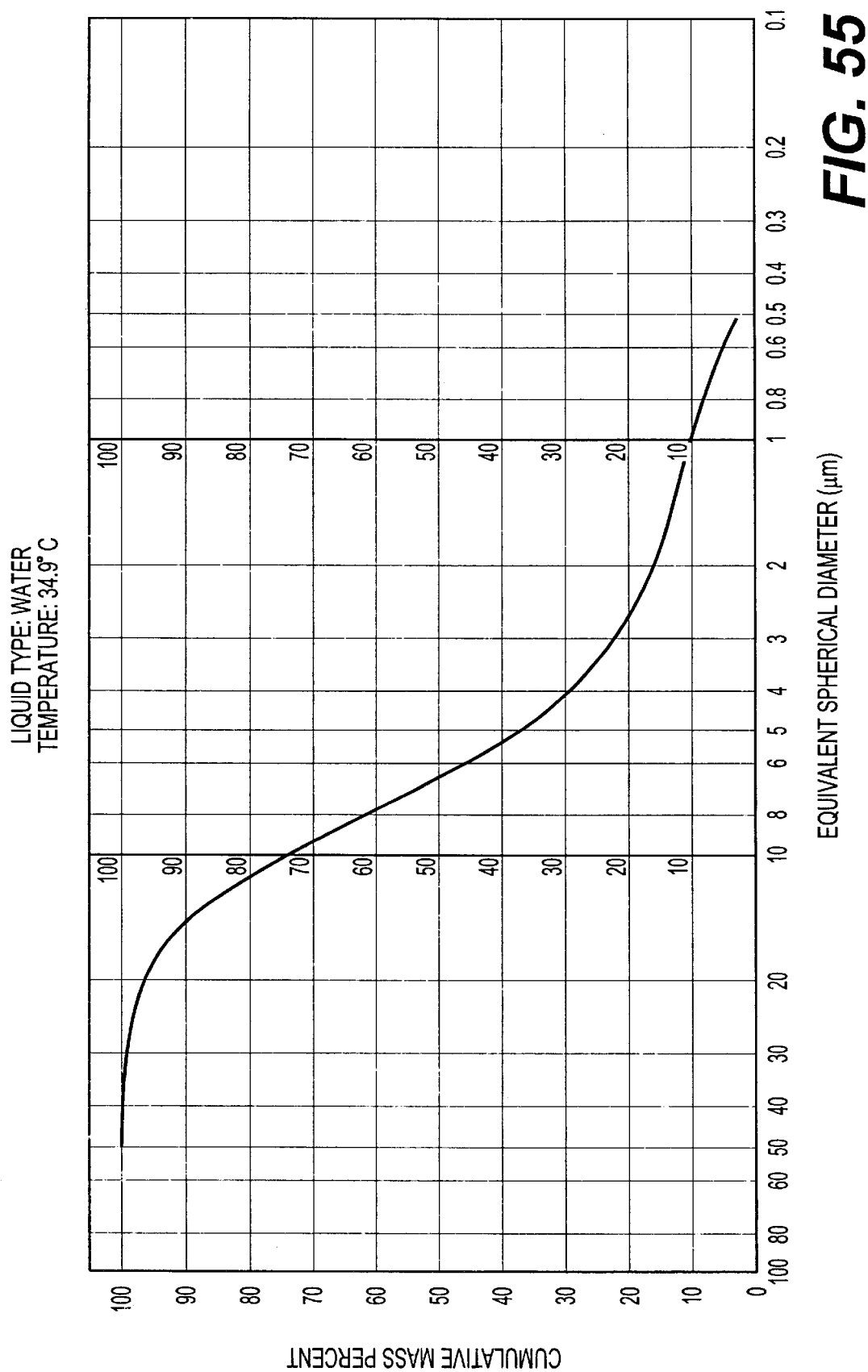
FIG. 55 depicts a SEDIGRAPH 5100 plot of the calcined kaolin product of Example 10A, produced from the 10:90 hydrous kaolin blend of Example 10 represented in FIGS. 49 and 50.
Figure 56:
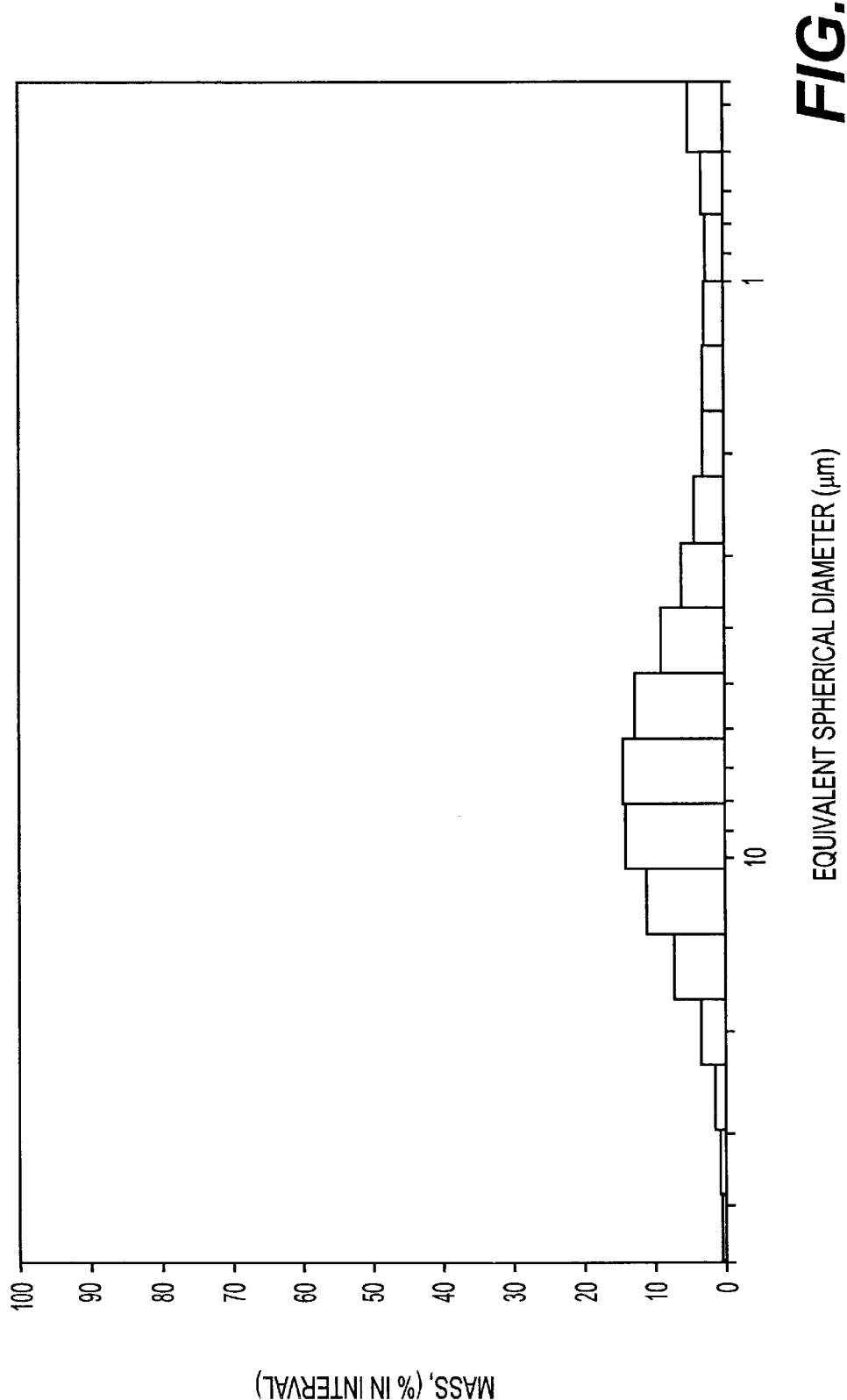
FIG. 56 depicts the information contained in FIG. 55 (the calcined kaolin product of Example 10A produced from the 10:90 hydrous kaolin blend) in histogram form.
Figure 57:
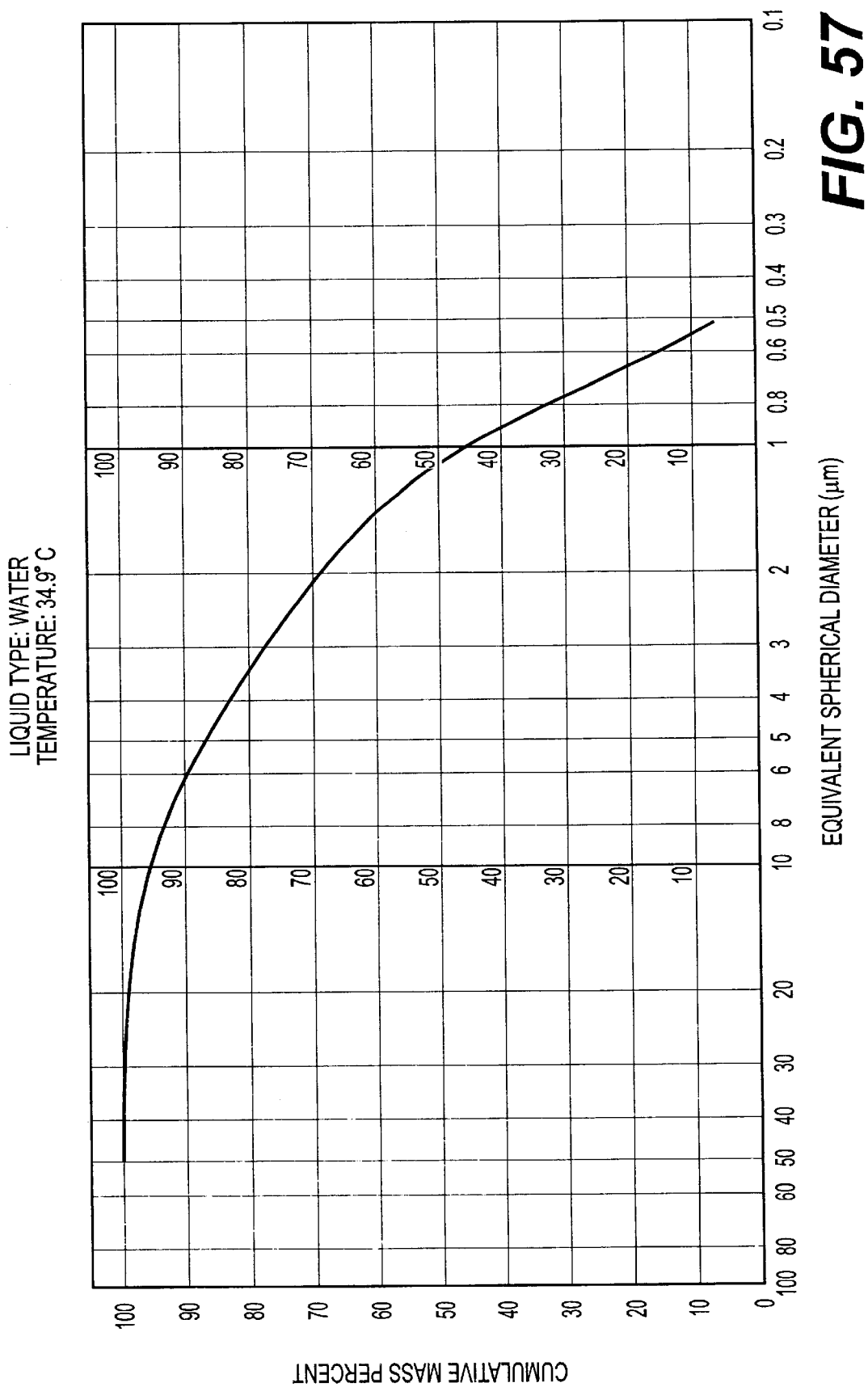
FIG. 57 depicts a SEDIGRAPH 5100 plot of the calcined kaolin product of Example 11A, produced from the 90:10 hydrous kaolin blend of Example 11.
Figure 58:
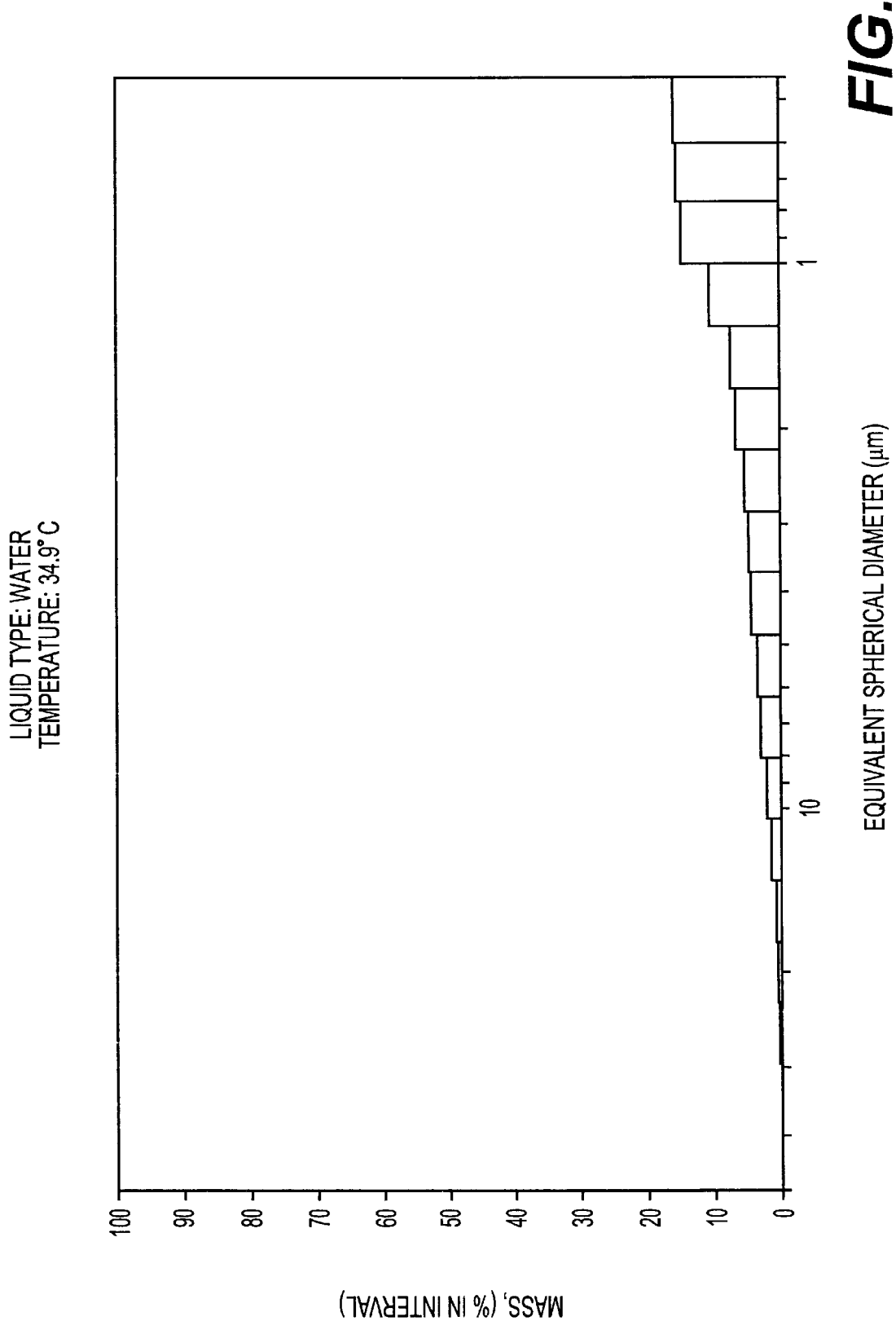
FIG. 58 depicts the information contained in FIG. 57 (the calcined kaolin product of Example 11A produced from the 90:10 hydrous kaolin blend) in histogram form.
Figure 59:
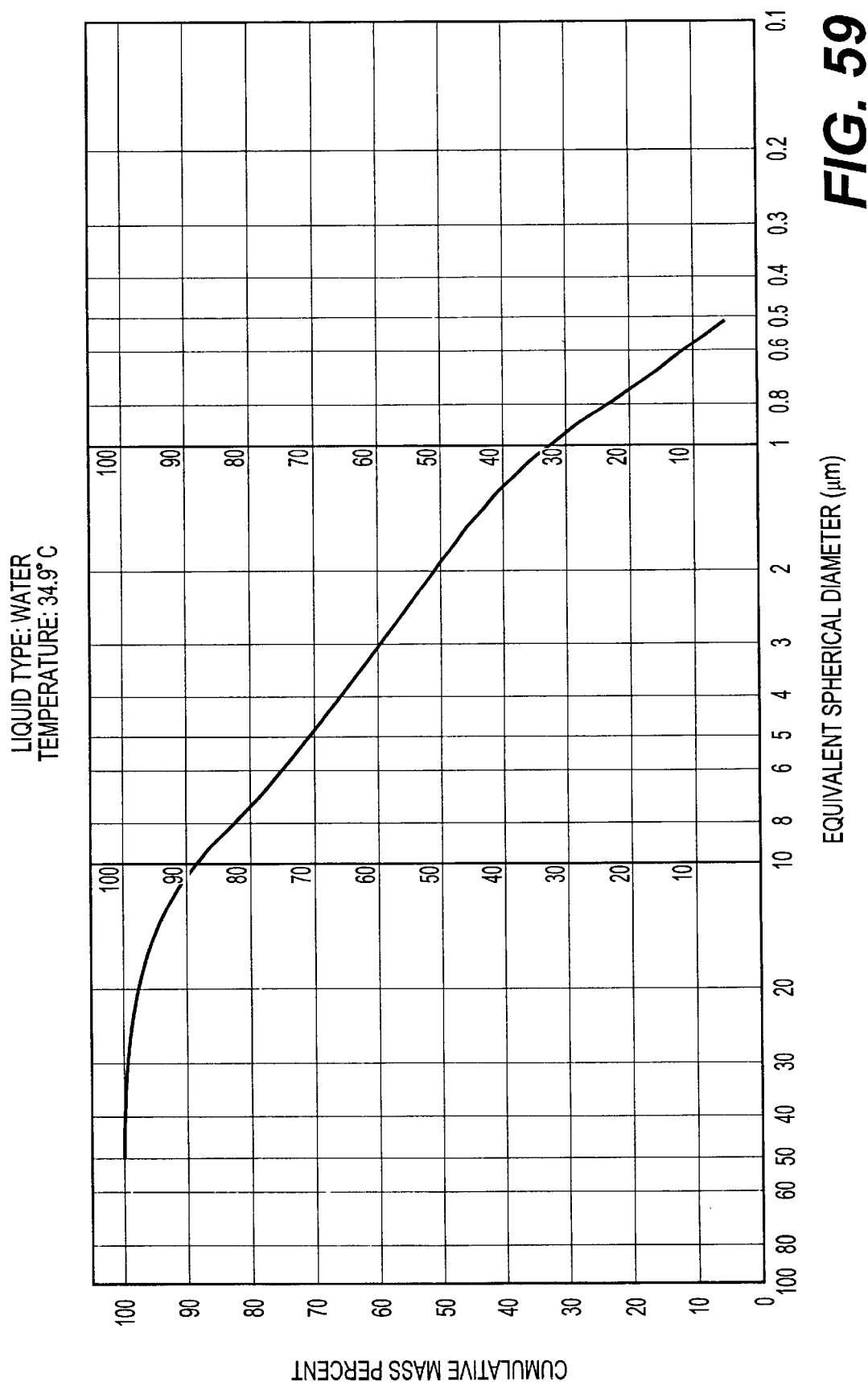
FIG. 59 depicts a SEDIGRAPH 5100 plot of the calcined kaolin product of Example 11A, produced from the 60:40 hydrous kaolin blend of Example 11.
Figure 60:
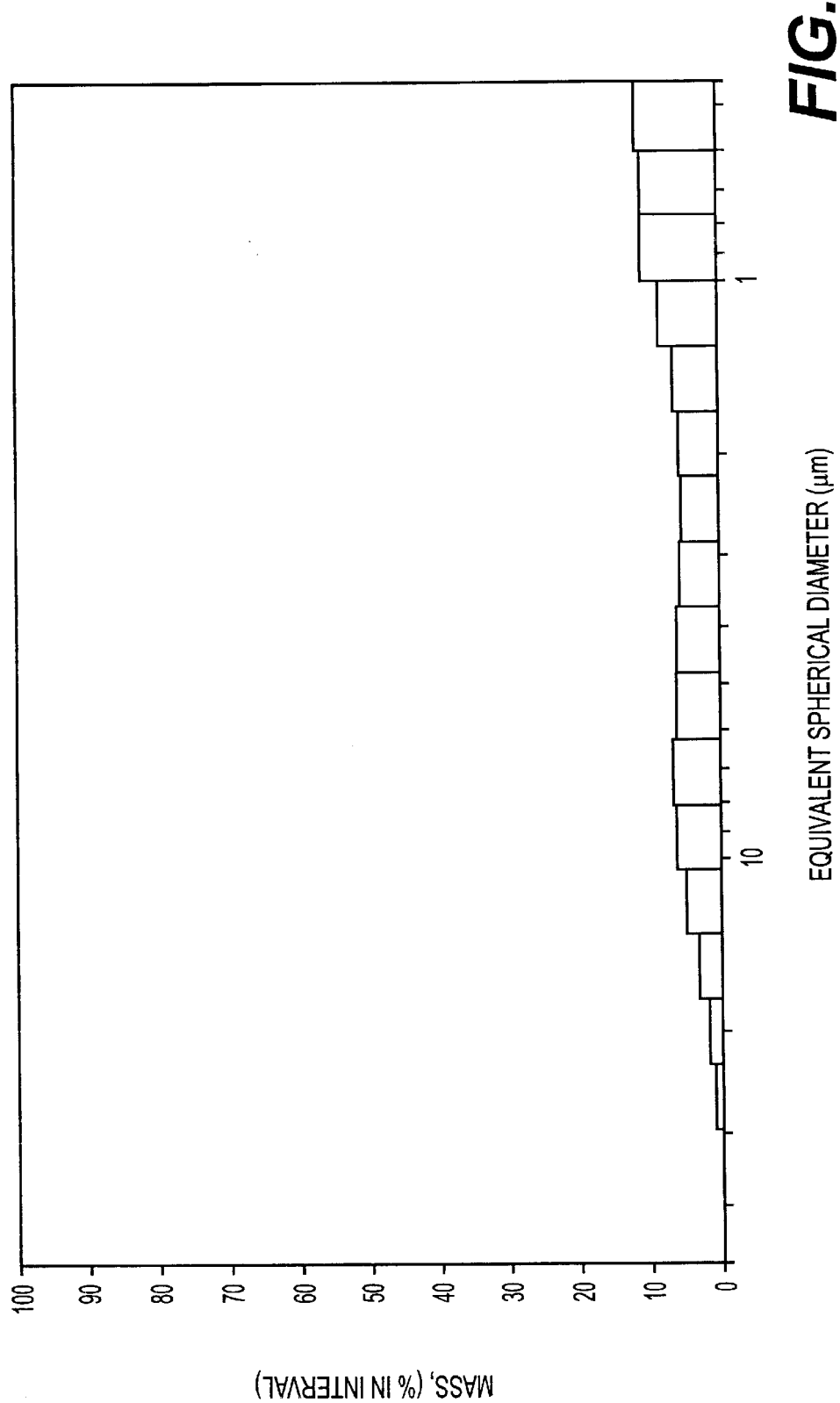
FIG. 60 depicts the information contained in FIG. 59 (the calcined kaolin product of Example 11A produced from the 60:40 hydrous kaolin blend) in histogram form.
Figure 61:
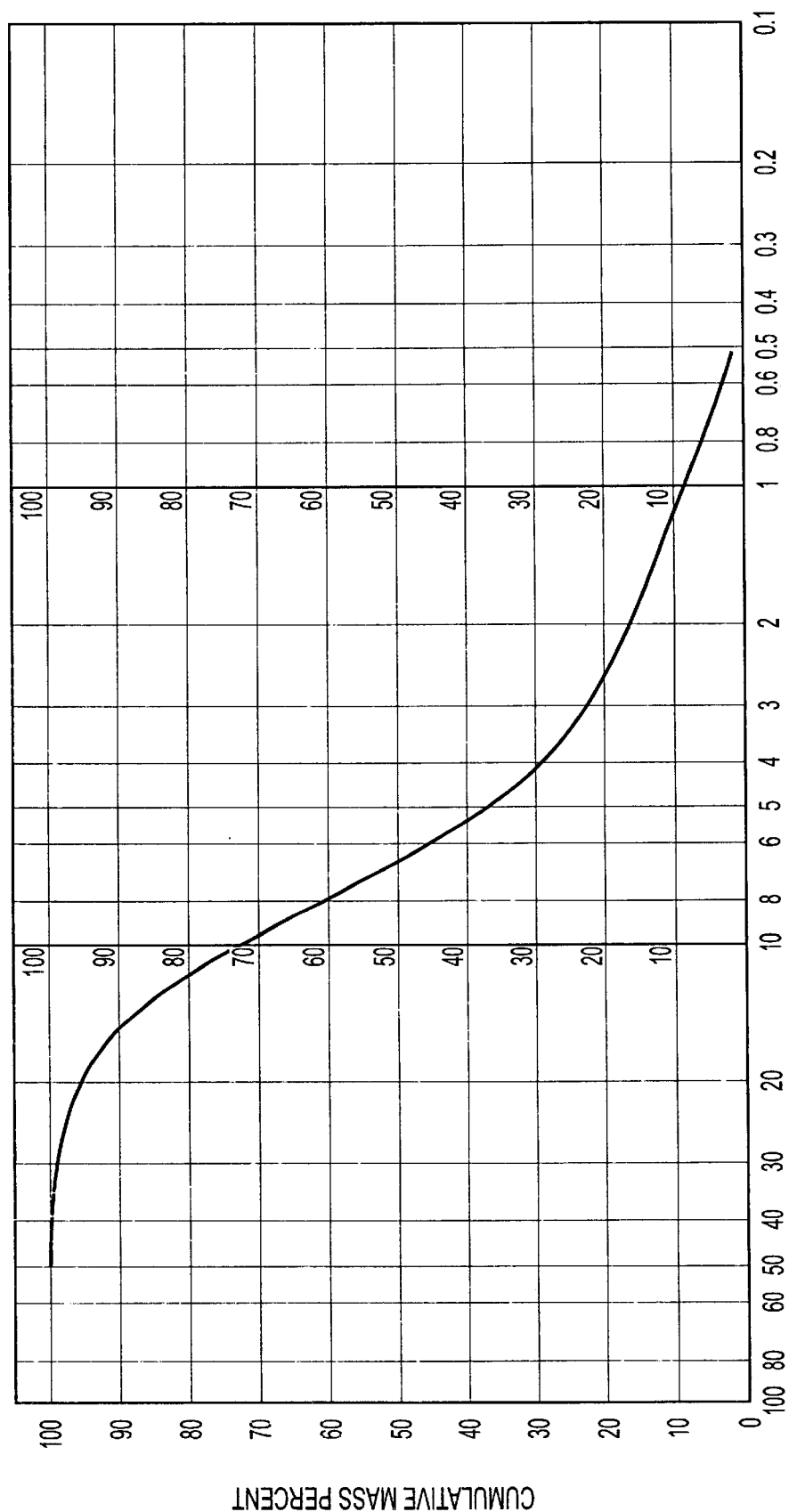
FIG. 61 depicts a SEDIGRAPH 5100 plot of the calcined kaolin product of Example 11A, produced from the 10:90 hydrous kaolin blend of Example 11.
Figure 62:
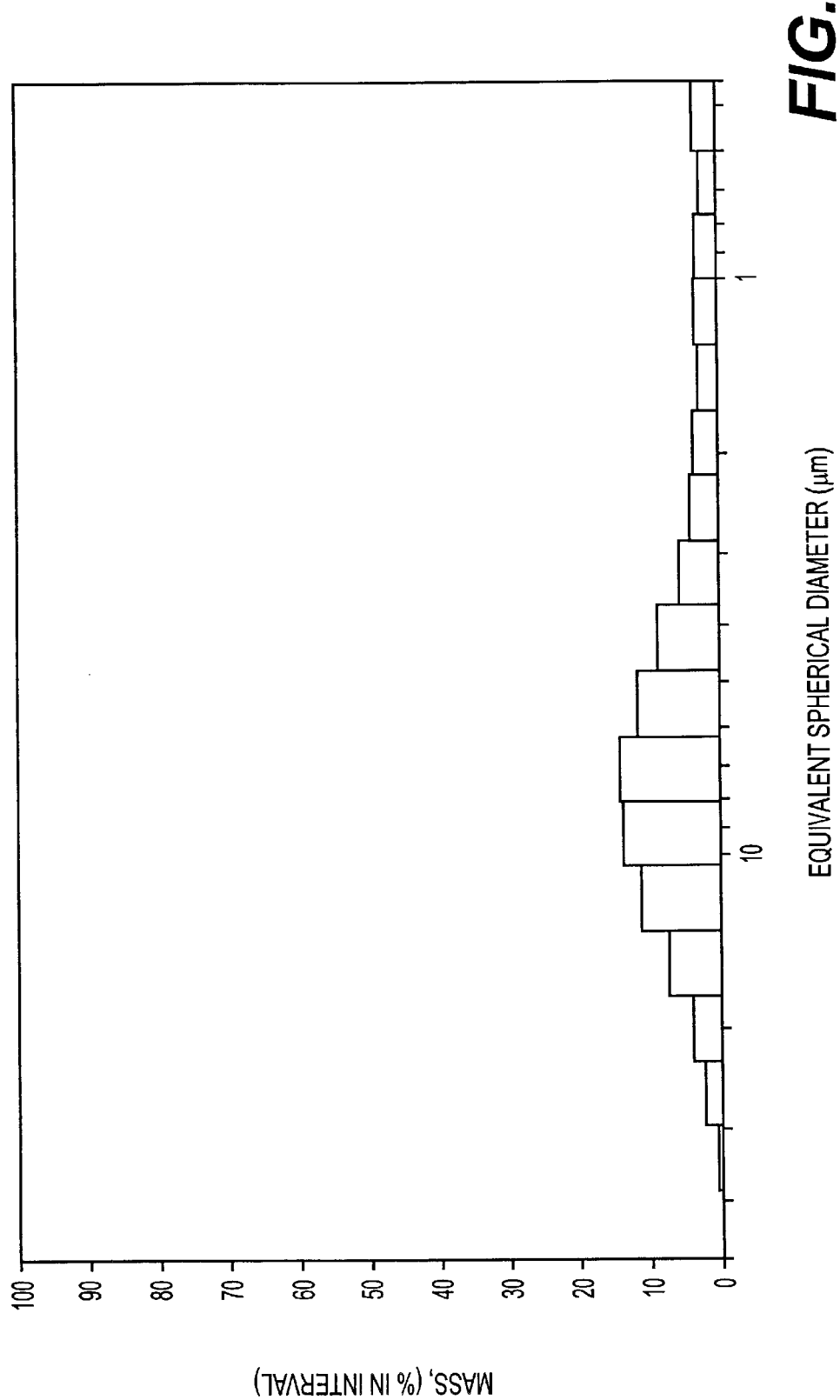
FIG. 62 depicts the information contained in FIG. 61 (the calcined kaolin product of Example 11A produced from the 10:90 hydrous kaolin blend) in histogram form.

The hydrous blend of Example 3 was calcined according to aforementioned methods. The calcined kaolin product produced had a particle size distribution as shown in FIGS. 7 and 8 (FIG. 8 in histogram form). The measured median diameter of this calcined kaolin product was 1.0 μm.

As seen from FIGS. 7 and 8, the particle size distribution of the calcined kaolin product is similar to that for the hydrous blend of Example 3, especially at the coarse end. At the fine end, some agglomeration of particles occurs owing to the calcination process. The calcined kaolin product of Example 3A was found to have properties similar to those of Example 1 described earlier.

Example 4

65:35 Hydrous Kaolin Blend (Inventive)

A hydrous kaolin blend was produced comprising 65 wt % of the fine hydrous kaolin component of Example 1, 35 wt % of the coarse component of Example 1. The hydrous kaolin blend particle size distribution is shown in Table 8. X and % are as defined above.

TABLE 8

| X | % |
|---|---|
| 10 | 95.4 |
| 5 | 85.5 |
| 2 | 74.4 |
| 1 | 67.3 |

Example 4A

65:35 Calcined Kaolin Blend (Inventive)

The blend of Example 4 was calcined according to aforementioned methods. The resulting calcined kaolin product had a mean particle size of 1.0 μm, and a particle size distribution as shown in Table 9. X and % are as defined above.

TABLE 9

| X | % |
|---|---|
| 10 | 95.6 |
| 5 | 83.7 |
| 2 | 68.1 |
| 1 | 51.8 |

Properties of the resulting calcined kaolin product were measured as described earlier. The properties measured and results obtained are shown in Table 10.

TABLE 10

| Property | Result |
|---|---|
| Brightness | 91.7 |
| Oil Absorption | 101 |
| L | 96.1 |
| a | −0.7 |
| b | 1.7 |

Example 5

55:45 Hydrous Kaolin Blend (Inventive)

A hydrous kaolin blend was produced comprising 55 wt % of the fine hydrous kaolin component of Example 1, and 45 wt % of the coarse component of Example 1. The blend had a particle size distribution as shown in Table 11.

TABLE 11

| X | % |
|---|---|
| 10 | 95.1 |
| 5 | 82.7 |
| 2 | 68.8 |
| 1 | 60.6 |

Example 5A

55:45 Calcined Kaolin Blend (Inventive)

The resulting hydrous kaolin blend of Example 5 was calcined according to aftermentioned methods. The particle size distribution of the resulting calcined kaolin had a mean particle size of 1.2 μm and a particle size distribution set forth in Table 12.

TABLE 12

| X | % |
|---|---|
| 10 | 94.6 |
| 5 | 80.6 |

TABLE 12-continued

| X | % |
|---|---|
| 2 | 61.1 |
| 1 | 43.8 |

Properties of the resulting calcined kaolin product were measured as described earlier. The properties measured and results obtained are shown in Table 13.

TABLE 13

| Property | Result |
|---|---|
| Brightness | 91.6 |
| Oil Absorption | 88 |
| L | 95.9 |
| a | −0.7 |
| b | 1.5 |

Example 6

90:10; 60:40; 10:90 Hydrous Kaolin Blend (Inventive)

A hydrous kaolin blend was prepared generally in the manner described in Example 1, except the coarse and fine hydrous kaolin components were employed to produce a 90:10, a 60:40, and a 10:90 fine:coarse hydrous blend. The fine hydrous kaolin component had a particle size distribution such that the percentage (%) by weight of particles having a size less than X for various values of X (in $\mu$m) was as in Table 14.

TABLE 14

| X | % |
|---|---|
| 10 | 98.4 |
| 5 | 97.6 |
| 2 | 96.2 |
| 1.5 | 95.5 |
| 1 | 92.8 |
| 0.8 | 90.1 |
| 0.5 | 79.2 |

The coarse hydrous kaolin had a particle size distribution as shown in Table 15.

TABLE 15

| X | % |
|---|---|
| 20 | 94.4 |
| 10 | 67.6 |
| 8 | 54.6 |
| 5 | 30.4 |
| 4 | 22.9 |
| 2 | 11.0 |
| 1 | 6.4 |

The measured median diameter of the hydrous kaolin blends produced, 90:10, 60:40, and 10:90 by weight of the fine and coarse kaolin components were <0.5 $\mu$m, 0.5 $\mu$m, and 6.5 $\mu$m, respectively. The particle size distributions are shown in FIGS. 9 and 10, 11 and 12, and 13 and 14, respectively.

Example 6A

90:10; 60:40; 10:90 Calcined Kaolin Blend (Inventive)

The resulting blends of Example 6 were calcined according to aforementioned methods. The measured median diameter of the calcined kaolins produced were 0.7 $\mu$m, 0.9 $\mu$m, and 6.5 $\mu$m, respectively. The resulting calcined kaolin products had a particle size distributions as shown in FIGS. 15 and 16, 17 and 18, and 19 and 20 respectively.

As seen by inspection of FIGS. 15–20, the particle size distributions of the calcined kaolin products are similar to those for the hydrous blends (FIGS. 9–14) especially at the coarse end. At the fine end, the agglomeration of particles occurs owing to the calcination process. As seen in FIGS. 13 and 14, and 19 and 20 one begins to see the bimodal character of the distributions when the minor amount component (coarse or fine) meets or exceeds 10%.

Example 7

90:10; 60:40; 10:90 Hydrous Kaolin Blend (Inventive)

Hydrous kaolin blends were prepared by carefully blending the dry fine and dry coarse components of Example 6 to produce a 90:10, a 60:40, and a 10:90 blend.

Example 7A

90:10; 60:40; 10:90 Calcined Kaolin Blend (Inventive)

The hydrous kaolin blends of Example 7 were calcined according to aforementioned techniques. The calcined kaolin products had particle size distributions as shown in FIGS. 21 and 22, 23 and 24, and 25 and 26, respectively. The measured median diameter of the calcined kaolins produced were 0.7 $\mu$m, 1.2 $\mu$m, and 6.6 $\mu$m, respectively. As can be seen by comparing FIGS. 15–20 and FIGS. 21–26, the particle size distributions of the calcined kaolin products of both Examples 6 and 7 are very similar in overall characteristics.

Example 8

90:10; 60:40; 10:90 Hydrous Kaolin Blend (Inventive)

A hydrous kaolin blend was prepared generally in the manner described in Example 1, except that the coarse and fine hydrous kaolin components were employed to produce a 90:10, a 60:40, and a 10:90 blend. The fine hydrous kaolin component used in this Example had a particle size distribution such that the percentage (%) by weight of particles having a size less than X for various values of X (in $\mu$m) was as in Table 16.

TABLE 16

| X | % |
|---|---|
| 10 | 98.5 |
| 5 | 96.6 |

TABLE 16-continued

| X | % |
|---|---|
| 2 | 89.1 |
| 1.5 | 84.9 |
| 1 | 78.5 |
| 0.8 | 74.1 |
| 0.5 | 61.7 |

The coarse hydrous kaolin had a particle size distribution as in Table 15.

The 90:10, 60:40, and 10:90 by weight of the fine and coarse blends produced had particle size distributions as shown in FIGS. 27 and 28, 29 and 30, and 31 and 32, respectively.

Example 8A

90:10; 60:40; 10:90 Calcined Kaolin Blend (Inventive)

The hydrous blends of Example 8 were calcined according to aforementioned techniques. The measured median diameter of the calcined kaolins produced were 0.9 µm, 1.5 µm, and 6.4 µm, respectively The resulting calcined kaolin products had particle size distributions as shown in FIGS. 33 and 34, 35 and 36, and 37 and 38, respectively.

As seen by inspection of FIGS. 27–32, the particle size distributions of the calcined kaolin products are similar to that for the hydrous blends of this Example, especially at the coarse end. At the fine end, the agglomeration of particles occurs owing to the calcination process. As can be seen in FIGS. 31 and 32, and 37 and 38, the bimodal character of the blend begins to occur when the minor amount component (coarse or fine) meets or exceeds 10%.

Example 9

90:10; 60:40; 10:90 Hydrous Kaolin Blend (inventive)

Hydrous kaolin blends were prepared by carefully blending the dry fine, and dry coarse components of Example 8 to produce 90:10, 60:40, and 10:90 blends.

Example 9A

90:10; 60:40; 10:90 Calcined Kaolin Blend (inventive)

The hydrous kaolin blends of Example 9 were calcined according to aforementioned techniques. The measured median diameter of the calcined kaolins produced were 1.0 µm, 1.7 µm, and 6.5 µm, respectively. The resulting calcined kaolin products had particle size distributions as shown in FIGS. 39 and 40, 41 and 42, and 43 and 44. As can be seen by inspection of FIGS. 33–38 with 39–44, the particle size distributions of the calcined kaolin products of both Examples 8 and 9 are very similar in overall characteristics.

Example 10

90:10; 60:40; 10:90 Hydrous Kaolin Blend (inventive)

Hydrous kaolin blends were prepared generally in the manner described in Example 1 except that the coarse and fine hydrous kaolin components were employed to produce a 90:10, a 60:40, and a 10:90 blend 60:40 fine:coarse hydrous blend. The fine and coarse hydrous kaolins of this Example were as follows. The fine hydrous kaolin component had a particle size distribution such that the percentage (%) by weight of particles having a size less than X for various values of X 9 (in µm) was as in Table 17 as follows:

TABLE 17

| X | % |
|---|---|
| 10 | 98.4 |
| 5 | 94.7 |
| 2 | 83.4 |
| 1.5 | 79.1 |
| 1 | 72.7 |
| 0.8 | 68.9 |
| 0.5 | 57.7 |

The coarse hydrous kaolin had a particle size distribution as shown in Table 15.

The hydrous kaolin blends produced, 90:10, 60:40, and 10:90 by weight, had particle size distributions as shown in FIGS. 45 and 46, 47 and 48, and 49 and 50, respectively.

Example 10A

90:10; 60:40; 10:90 Calcined Kaolin Blend (Inventive)

The hydrous kaolin blends of Example 10 were calcined according to aforementioned techniques. The measured median diameter of the calcined kaolins produced were 0.9 µm, 1.7 µm, and 6.4 µm, respectively. The resulting calcined kaolin products had particle size distributions as shown in FIGS. 51 and 52, 53 and 54, and 55 and 56 respectively.

As seen by inspection of FIGS. 45–50, the particle size distributions of the calcined kaolin products are similar to that for the hydrous blends especially at the coarse end. At the fine end, the agglomeration of particles occurs owing to the calcination process. As seen in FIGS. 49 and 50 and 55 and 56, the bimodal character of these two distributions is barely perceptible.

Example 11

90:10; 60:40; 10:90 Hydrous Kaolin Blend (Invention)

Hydrous kaolin blends were prepared by carefully blending the dry fine, and dry coarse components of Example 10 to produce a 90:10, a 60:40, and a 10:90 blend.

Example 11A

90:10; 60:40; 10:90 Calcined Kaolin Blend (Invention)

The hydrous kaolin blends of Example 11 were calcined according to aforementioned techniques. The measured median diameter of the calcined kaolins produced were 1.1 µm, 1.9 µm, and 6.6 µm, respectively. The resulting calcined kaolin products had particle size distributions as shown in FIGS. 57 and 58, 59 and 60, and 61 and 62 respectively. As can be seen by comparison of FIGS. 51–56 with FIGS. 57–62, the particles size distributions of the calcined kaolin products of both Examples 10 and 11 are very similar in overall characteristics.

Example 12

Multimodal Calcined Pigment (Inventive)

Calcined kaolin-containing products were made by dry blending from 80% to 50% of a fine particle, calcined kaolin, median diameter of <1 µm, and correspondingly 20% to 50% of a coarse particle calcined kaolin, median diameter of >3 µm, to exemplify this further embodiment to produce calcined kaolin-containing products which can be "tailored" to simultaneously provide both fine particle-related calcined kaolin, and large particle-related calcined kaolin attributes at desired levels, such as flatting and opacifying efficiency in paints and coatings.

The formulation comprised the ingredients shown in Table 18 as follows in the stated number of pounds weight per 100 gallons of paint.

TABLE 18

| | |
|---|---|
| Water | 339.9 |
| KTPP wetting agent | 1.8 |
| Wetting agent | 7.8 |
| Surfactant | 3.9 |
| Thickener | 3.9 |
| Titanium dioxide | 94.2 |
| Calcined kaolin (sample) | 198.1 |
| Calcium carbonate | 264.4 |
| Defoamer | 2.9 |
| Disperse to a 4N solution then add slowly with mixing: | |
| PVA resin | 213.5 |
| Ethylene glycol | 24.5 |
| Coalescent | 9.8 |
| Water | 45.1 |
| Weight solids % | 56.9 |
| Volume solids % | 37.6 |

Properties of the resulting paint formed into a dry paint film by standard laboratory paint film drawdown equipment and subsequent air drying in an essentially dirt-free drying cabinet were measured according to standard procedures (described previously in Example 1A and the results obtained are set forth in Table 19 below. In Table 19, the corresponding results for both the fine particle calcined kaolin component and the coarse particle calcined kaolin component used in the preparation of these columns are inventive products.

TABLE 19

| Paint | Example 100/0 | Product 80/20 | Product 70/30 | Product 60/40 | Product 50/50 | Example 0/100 | Product cocal 60/40 |
|---|---|---|---|---|---|---|---|
| 60° Gloss | 3.1 | 3.0 | 3.0 | 2.9 | 2.9 | 2.8 | 2.9 |
| 85° Sheen | 6.1 | 4.0 | 3.5 | 2.8 | 2.6 | 2.0 | 2.0 |
| ASTM-E-313 white | 85.5 | 84.5 | 83.8 | 83.0 | 82.2 | 78.8 | 84.7 |
| ASTM-E-313 yellow | 1.8 | 2.0 | 2.1 | 2.2 | 2.4 | 3.0 | 1.7 |
| Brightness | 90.6 | 90.1 | 89.7 | 89.2 | 88.8 | 87.0 | 89.6 |
| L | 96.0 | 95.7 | 95.6 | 95.4 | 95.2 | 94.6 | 95.4 |
| A | −0.9 | −0.9 | −0.9 | −0.9 | −0.9 | −0.8 | −0.9 |
| B | 1.4 | 1.5 | 1.6 | 1.6 | 1.7 | 2.1 | 1.4 |
| Opacity | 97.2 | 96.9 | 96.4 | 96.0 | 95.3 | 93.7 | 95.3 |

Example 12A

Paint Composition (Inventive)

A paint composition comprising 65% PVC (pigment volume concentration) was prepared using the 80:20, 70:30, 60:40 and 50:50 calcined kaolin products of Example 12. In addition, the 60%/40% co-calcined product of Example 3A was also used in the preparation of this paint composition.

Example 12B

Tinted Film (Inventive)

Tinted films were made from paint of Example 12A by adding the equivalent of 11 pounds by weight of phthalo blue dispersion to 100 gallons of paint. Optical properties of the resulting films made using drawdown-related procedures described above were measured and the results are set forth in Table 20 below.

TABLE 20

| Paint | Example 100/0 | Product 80/20 | Product 70/30 | Product 60/40 | Product 50/50 | Example 0/100 | Product cocal 60/40 |
|---|---|---|---|---|---|---|---|
| L | 81.6 | 80.1 | 79.7 | 79.2 | 78.7 | 76.7 | 79.6 |
| a | −10.8 | −11.4 | −11.6 | −11.8 | −12.0 | −12.9 | −11.7 |
| b | −15.4 | −16.5 | −16.8 | −17.2 | −17.5 | −19.0 | −17.1 |
| ΔL | 4.9 | 3.4 | 3.0 | 2.5 | 2.0 | — | 2.9 |
| Δa | 2.1 | 1.5 | 1.3 | 1.1 | 0.9 | — | 1.2 |
| Δb | 3.6 | 2.5 | 2.2 | 1.8 | 1.5 | — | 1.9 |
| ΔE | 6.4 | 5.1 | 3.9 | 3.3 | 2.7 | — | 3.7 |

Example 13

Multimodal MetaKaolin Pigment (Inventive)

Figure 63:
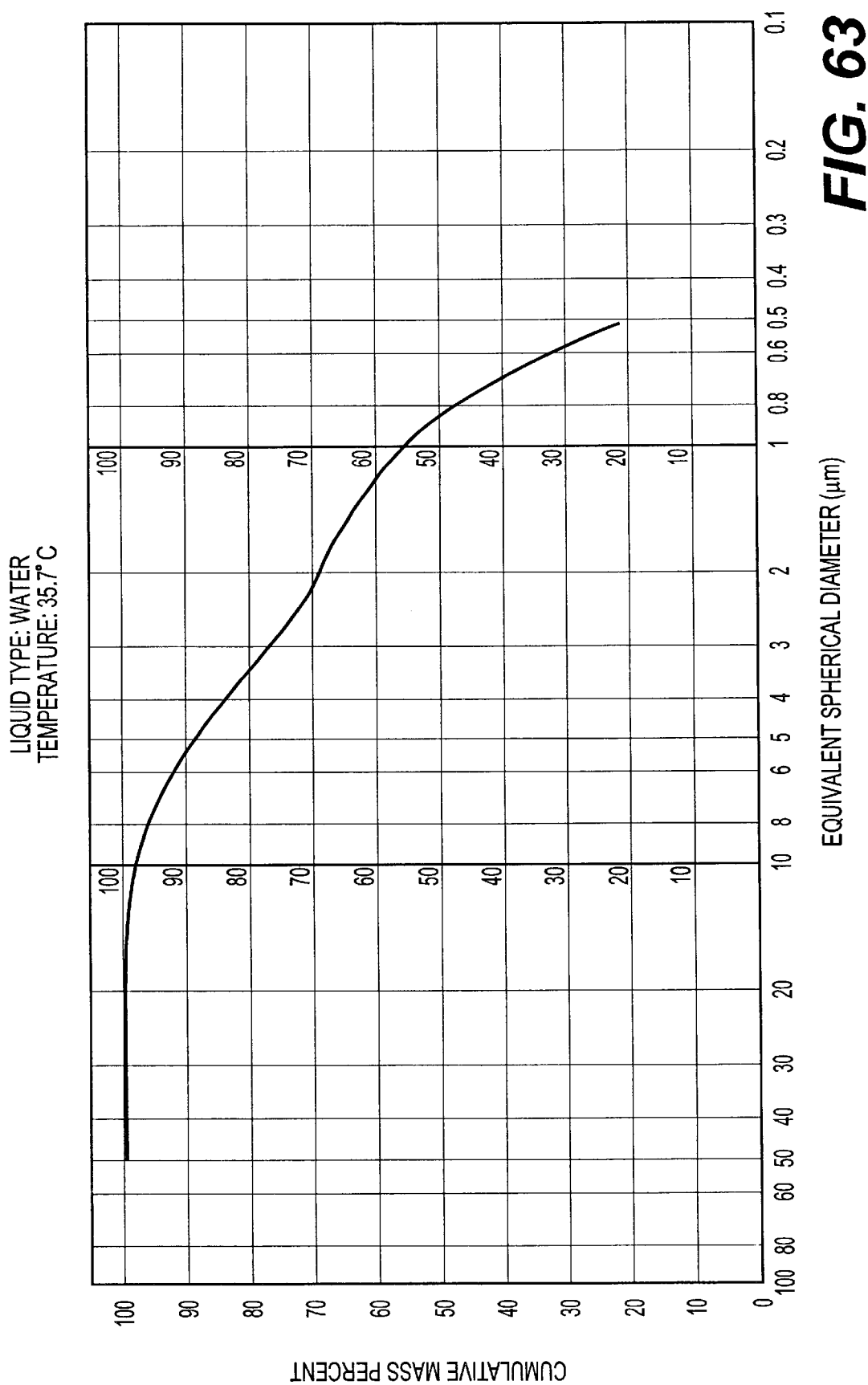
FIG. 63 depicts a SEDIGRAPH 5100 plot of the calcined metakaolin product of Example 13.
Figure 64:
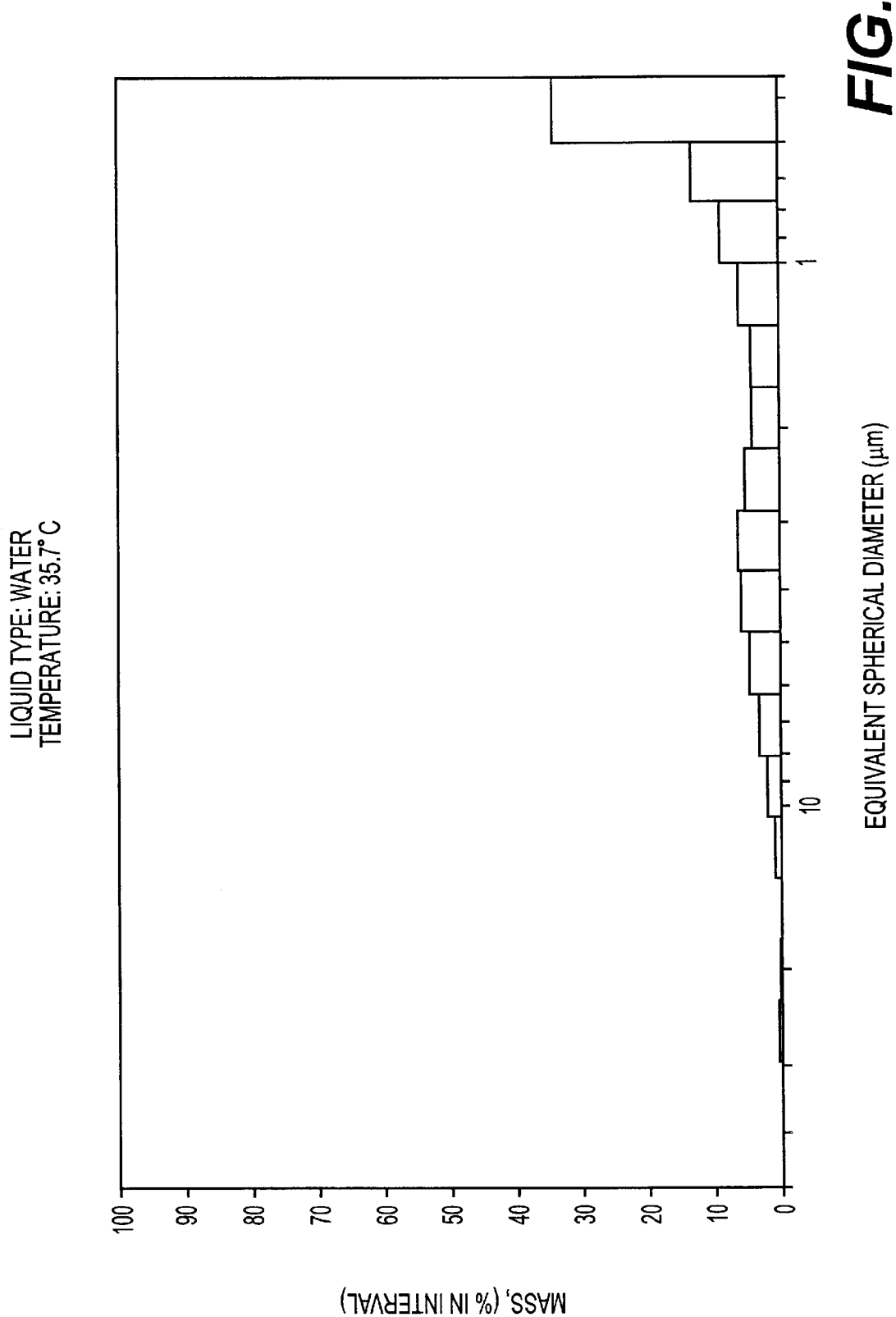
FIG. 64 depicts the information contained in FIG. 63 (the calcined metakaolin product of Example 13) in histogram form.

A hydrous kaolin blend was prepared generally in the manner described in Example 1 except the dry, pulverized hydrous kaolin blend was calcined in an oven at a temperature of 850° C. for one hour to produce a calcined metakaolin. The measured median diameter of the calcined metakaolin produced was 0.8 μm, and had a particle size distribution as shown in FIGS. 63 and 64. As seen by inspection of FIGS. 63 and 64, the particle size distribution of the calcined metakaolin product clearly exhibits a bimodal character.

Example 13A

Paint Composition (Inventive)

A paint composition comprising 65% PVC (pigment volume concentration) was prepared using the calcined metakaolin product of Example 13. In addition, a commercial calcined monomodal metakaolin was also used in the preparation of this paint composition. The formulation comprised the ingredients shown in Table 21 as follows in the stated number of pounds weight per 100 gallons of paint.

TABLE 21

| Water | 339.8 |
|---|---|
| KTPP wetting agent | 1.8 |
| Wetting agent | 7.8 |
| Surfactant | 3.9 |
| Thickener | 3.9 |
| Titanium dioxide | 94.2 |
| Calcined metakaolin (sample) | 188.4 |
| Calcium carbonate | 264.4 |
| Defoamer | 2.9 |
| Disperse to a 4N solution then add slowly with mixing: | |
| PVA resin | 213.5 |
| Ethylene glycol | 24.5 |
| Coalescent | 9.8 |
| Water | 45.0 |
| Weight solids % | 56.6 |
| Volume solids % | 37.6 |

Properties of the resulting paint formed into a dry paint film by standard laboratory paint film drawdown equipment and subsequent air drying in an essentially dirt-free drying cabinet were measured according to standard procedures (described previously in Example 1a and the results obtained are set forth in Table 22 below.

TABLE 22

| Paint | Commercial Metakaolin | Example Product |
|---|---|---|
| 60° Gloss | 3.0 | 3.0 |
| 85° Sheen | 3.8 | 3.9 |
| ASTM-E-313 white | 78.2 | 75.6 |
| ASTM-E-313 yellow | 3.6 | 4.3 |
| Brightness | 88.3 | 87.6 |
| L | 95.5 | 95.4 |
| a | −0.9 | −0.7 |
| b | 2.5 | 2.9 |
| Opacity | 97.2 | 97.8 |

Example 13B

Tinted Film (Inventive)

Tinted films were made from paint of Example 13A by adding the equivalent of 11 pounds by weight of phthalo blue dispersion to 100 gallons of paint. Optical properties of the resulting films made using drawdown-related procedures described above were measured and the results are set forth in Table 23 below.

TABLE 23

| Product | Commercial Metakaolin | Example Product |
|---|---|---|
| L | 80.4 | 81.2 |
| a | −12.0 | −11.5 |
| b | −15.4 | −14.1 |
| ΔL | — | −0.8 |
| Δa | — | −0.5 |
| Δb | — | −1.3 |
| ΔE | — | 1.6 |

Example 14

60:40 Hydrous Kaolin Blend (Comparative)

A hydrous kaolin blend was prepared generally in the manner described in Example 1 to produce a 60:40 fine:coarse hydrous blend. The fine hydrous kaolin component was similar to that used in Example 6.

The coarse hydrous kaolin had a particle size distribution as shown in Table 24.

TABLE 24

| X | % |
|---|---|
| 10 | 99.9 |
| 8 | 99.6 |
| 5 | 97.4 |
| 4 | 94.3 |
| 2 | 79.9 |
| 1 | 63.1 |
| 0.5 | 42.4 |

Figure 65:
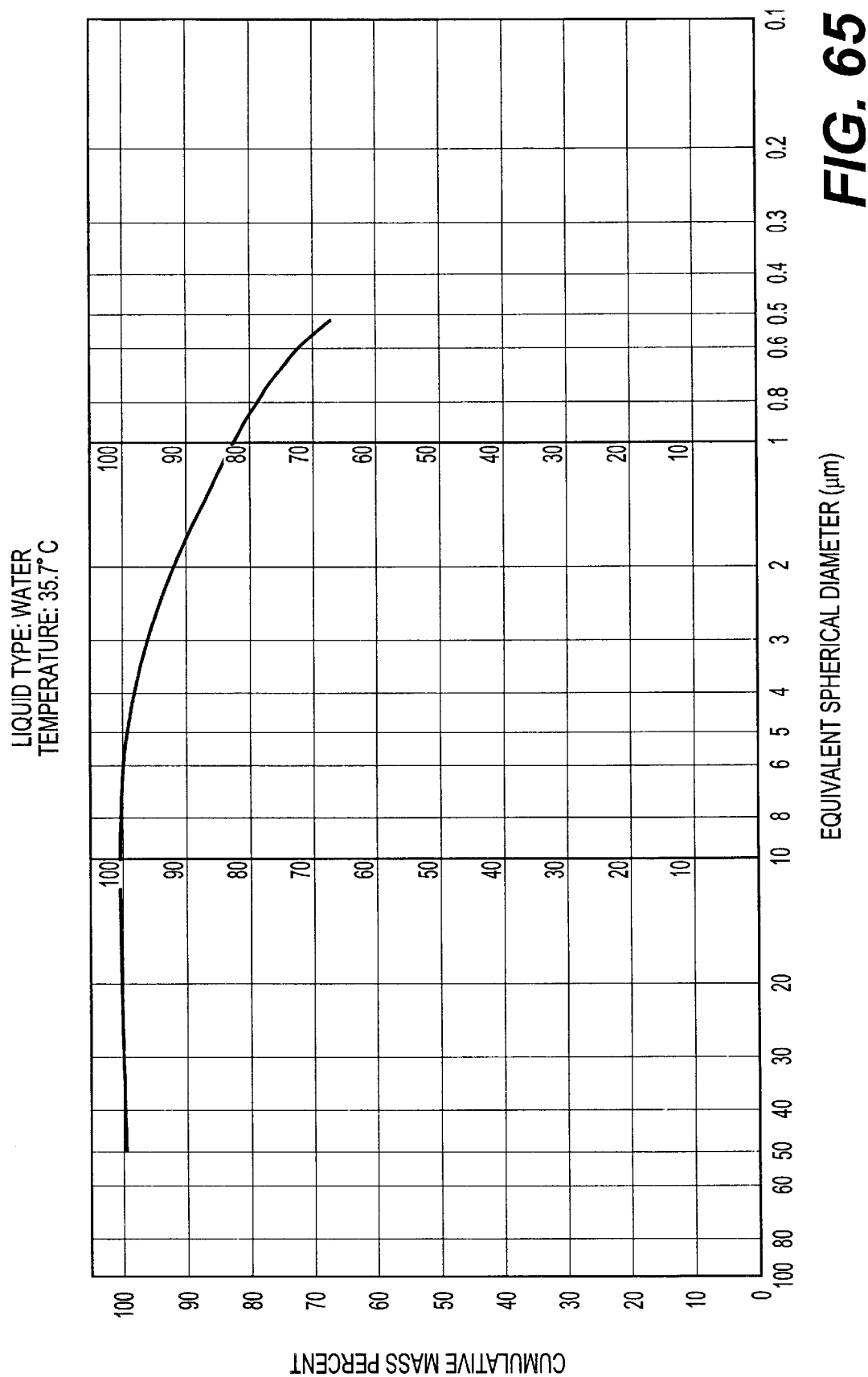
FIG. 65 is a SEDIGRAPH 5100 plot of the 60:40 hydrous blend of Example 14.
Figure 66:
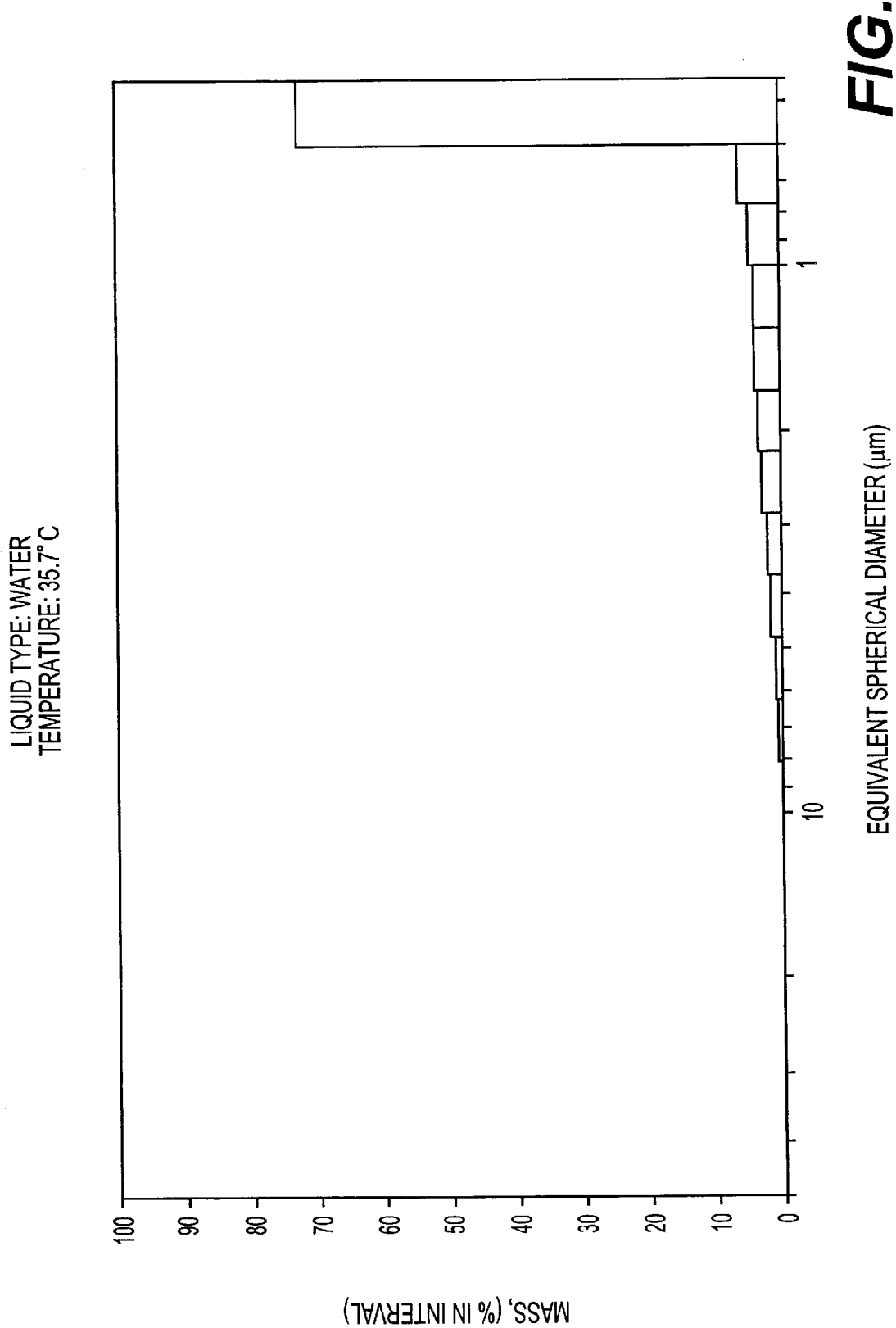
FIG. 66 depicts the information contained in FIG. 66 (the hydrous blend of Example 14) in histogram form.

The measured median diameter of the hydrous kaolin blend produced by weight of the fine and coarse kaolin components was <0.5 µm. The particle size distribution is shown in FIG. 65 (FIG. 66 in histogram form).

Example 14A

60:40 Calcined Kaolin Blend (Comparative)

The resulting blend of Example 14 was calcined according to aforementioned methods. The measured median diameter of the calcined kaolin produced was 1.2 µm, respectively. The resulting calcined kaolin product had a particle size distribution as shown in FIG. 67 (FIG. 68 in histogram form).

Figure 67:
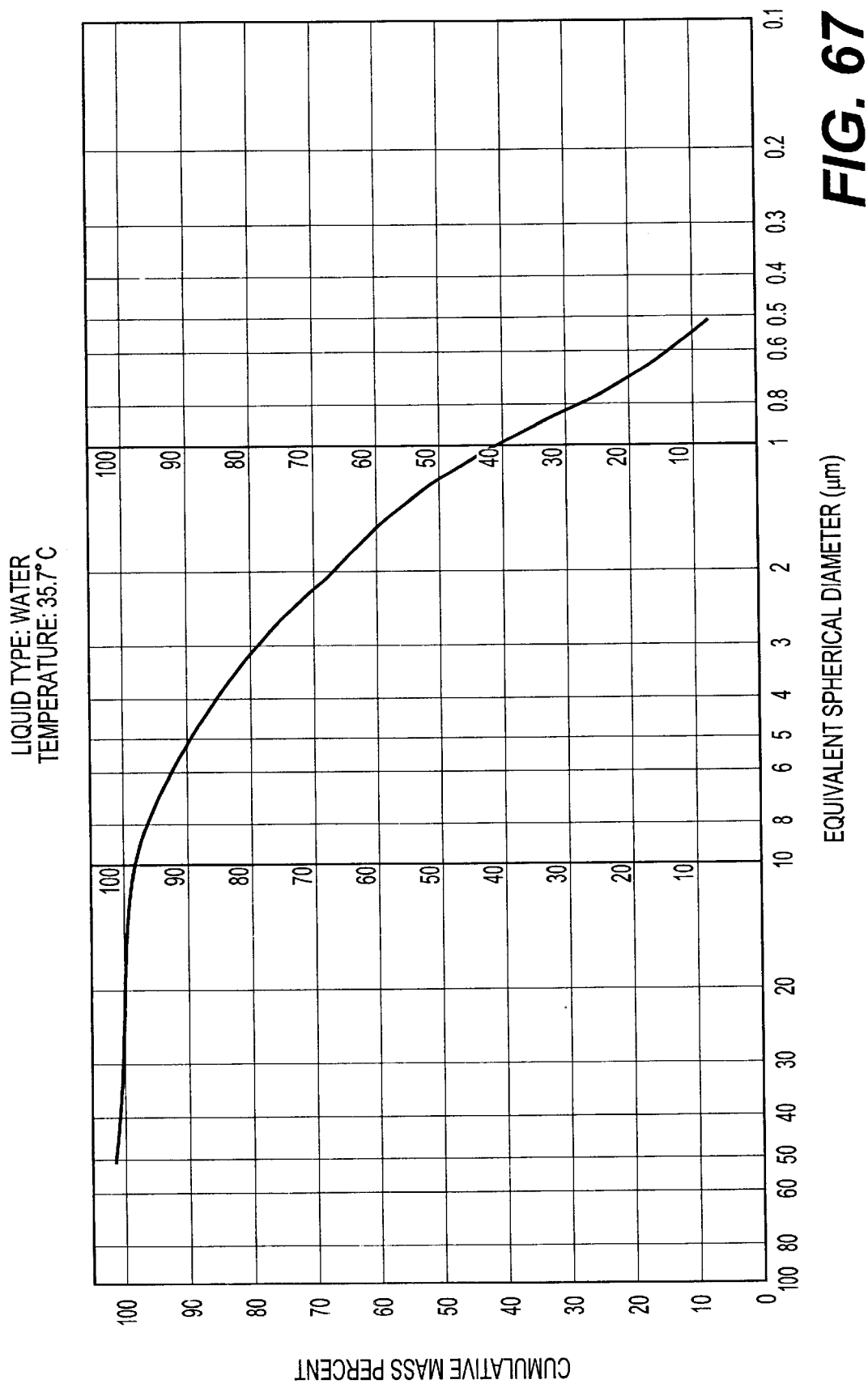
FIG. 67 depicts a SEDIGRAPH 5100 plot of the calcined kaolin product of Example 14A, produced from the 60:40 hydrous kaolin blend of Example 14 represented in FIG. 65.
Figure 68:
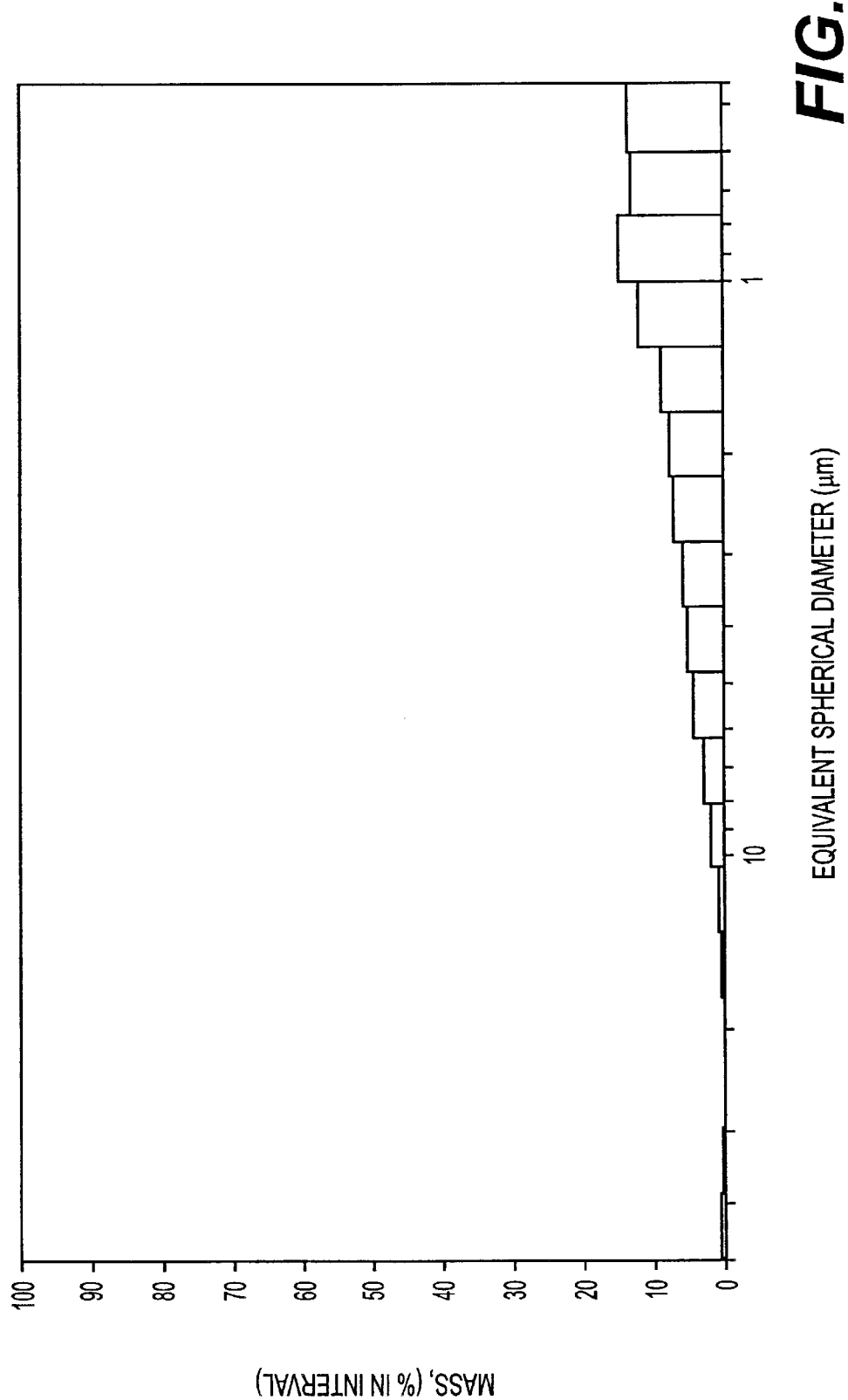
FIG. 68 depicts the information contained in FIG. 67 (the calcined kaolin product of Example 14A produced from the 60:40 hydrous kaolin blend) in histogram form.

As seen by inspection of FIG. 67, the particle size distribution of the calcined kaolin product of this example is significantly different than that for the hydrous blend (FIG. 65). As seen in FIG. 68, the calcined product of the comparative example does not exhibit the bimodal character of the inventive examples.

Example 15

Paint Composition (Inventive)

Four paint compositions comprising 78% PVC (pigment volume concentration) were prepared using a co-calcined, bimodal product similar in composition to that of Example 5, a fine, calcined unimodal product produced from a feed similar in composition to the fine hydrous component of Example 1, a coarse, calcined unimodal product produced from a feed similar in composition to the coarse hydrous component of Example 1, and the commercial, unimodal product used in Example 2, respectively. The formulation comprised the ingredients shown in Table 25 as follows in the stated number of pounds weight per 100 gallons of paint.

TABLE 25

| Water | 150.0 |
|---|---|
| KTPP wetting agent | 1.8 |
| Wetting agent | 8.0 |
| Surfactant | 4.0 |
| Thickener | 3.0 |
| Calcined kaolin (sample) | 200.0 |
| Defoamer | 3.0 |
| Disperse to a 4N solution then add slowly with mixing: | |
| PVA resin | 39.3 |
| Ethylene glycol | 25.0 |
| Coalescent | 10.0 |
| Water | 518.3 |
| Weight solids % | 24.7 |
| Volume solids % | 13.2 |

These paints differ significantly in composition to those used in previous Examples in that the sole pigment used is the calcined or co-calcined kaolin, and the weight and volume solids are both significantly lower. This composition was chosen specifically to illustrate the combination of optical-related and flatting-related properties imparted to the resultant paints. Properties of the resulting paint formed into a dry paint film by standard laboratory paint film drawdown equipment and subsequent air drying in an essentially dirt-free drying cabinet were measured according to standard procedures (described previously in Example 1 and the results obtained are set forth in Table 26 below).

TABLE 26

| Paint | Product Calcined Unimodal Fine | Product Cocalcined Bimodal | Product Calcined Unimodal Commercial | Product Calcined Unimodal Coarse |
|---|---|---|---|---|
| 60° Gloss | 4.0 | 3.3 | 3.0 | 2.8 |
| 85° Sheen | 30.9 | 10.7 | 8.6 | 2.4 |
| ASTM-E-313 white | 86.0 | 80.9 | 78.7 | 67.9 |
| ASTM-E-313 yellow | 1.4 | 2.2 | 2.7 | 5.1 |
| Brightness | 90.1 | 86.9 | 86.2 | 81.5 |
| L | 95.5 | 94.1 | 94.0 | 92.4 |
| a | −0.6 | −0.6 | −0.7 | −0.7 |
| b | 1.0 | 1.5 | 1.8 | 3.3 |
| Opacity | 94.8 | 90.6 | 86.1 | 81.3 |

Tinted films were made from paint of this Example by adding the equivalent of 11 pounds by weight of phthalo blue dispersion to 100 gallons of paint. Optical properties of the resulting films made using drawdown-related procedures described above were measured and the results are set forth in Table 27 below.

TABLE 27

| Product | Product Calcined Unimodal Fine | Product Cocalcined Bimodal | Product Calcined Unimodal Commercial | Product Calcined Unimodal Coarse |
|---|---|---|---|---|
| L | 78.7 | 72.8 | 69.8 | 65.8 |
| a | −12.9 | −15.1 | −16.2 | −20.0 |
| b | −18.7 | −24.0 | −26.9 | −30.0 |
| ΔL | −12.9 | −7.0 | −4.0 | — |
| Δa | −7.1 | −4.9 | −3.8 | — |
| Δb | −11.3 | −6.0 | −3.1 | — |
| ΔE | 18.6 | 10.5 | 3.1 | — |

A synergistic benefit achieved by the inventive product of this invention should be noted in this Example. In Table 28 and Table 29, it can be seen that the overall combination of optical property-related, gloss control and sheen control benefit achieved is significantly greater than the anticipated linear relationship.

TABLE 28

| Paint | Product Calcined Unimodal Fine | Calculated Property* | Product Cocalcined Bimodal | Product Calcined Unimodal Commercial | Product Calcined Unimodal Coarse |
|---|---|---|---|---|---|
| 60° Gloss | 4.0 | 3.6 | 3.3 | 3.0 | 2.8 |
| 85° Sheen | 30.9 | 21.4 | 10.7 | 8.6 | 2.4 |
| ASTM-E-313 white | 86.0 | 80.0 | 80.9 | 78.7 | 67.9 |
| ASTM-E-313 yellow | 1.4 | 2.6 | 2.2 | 2.7 | 5.1 |
| Brightness | 90.1 | 87.2 | 86.9 | 86.2 | 81.5 |
| L | 95.5 | 94.5 | 94.1 | 94.0 | 92.4 |
| a | −0.6 | −0.6 | −0.6 | −0.7 | −0.7 |
| b | 1.0 | 1.7 | 1.5 | 1.8 | 3.3 |
| Opacity | 94.8 | 90.3 | 90.6 | 86.1 | 81.3 |

*Calculated based on linear model

TABLE 29

| Product | Product Calcined Unimodal Fine | Calculated Property* | Product Cocalcined Bimodal | Product Calcined Unimodal Commercial | Product Calcined Unimodal Coarse |
|---|---|---|---|---|---|
| L | 78.7 | 74.4 | 72.8 | 69.8 | 65.8 |
| a | −12.9 | −15.3 | −15.1 | −16.2 | −20.0 |
| b | −18.7 | −22.5 | −24.0 | −26.9 | −30.0 |
| ΔL | −12.9 | −8.6 | −7.0 | −4.0 | — |
| Δa | −7.1 | −4.7 | −4.9 | −3.8 | — |
| Δb | −11.3 | −7.5 | −6.0 | −3.1 | — |
| ΔE | 18.6 | 12.3 | 10.5 | 3.1 | — |

*Calculated based on linear model

Other embodiments of the invention will be apparent to those skilled in the art from consideration of the specification and practice of the invention disclosed herein. It is intended that the specification and Examples be considered as exemplary only, with a true scope and spirit of the invention being indicated by the following claims.

What is claimed is:

1. A composition comprising co-calcined kaolin, said composition having median diameter particle size of from about 0.5 μm to about 10 μm and a multimodal particle size distribution: said multimodal particle size distribution exhibiting, when measured using SEDIGRAPH 5100, at least two distinguishable components, at least one of said distinguishable components corresponding to a fine calcined component and occurring at a particle size less than about 1 μm, and at least one other of said distinguishable components corresponding to a coarse calcined component and occurring at a particle size greater than about 2 μm, wherein said fine calcined component and said coarse calcined component are present in a ratio sufficient to result in an oil absorption value greater than about 70 g. oil/100 g. clay.

2. A composition of claim 1 comprising about 10% to about 90% by weight fine component and from about 90% to about 10% by weight coarse component.

3. A composition of claim 1 comprising about 20% to about 80% by weight fine component and from about 80% to about 20% by weight coarse component.

4. A composition of claim 1 comprising about 65% by weight having a particle size less than about 1.0 μm and about 35% by weight having a particle size greater than 3.0 μm.

5. A composition of claim 1 comprising about 60% by weight having a particle size less than about 1.0 μm and about 40% by weight having a particle size greater than 3.0 μm.

6. A composition of claim 1 comprising about 55% by weight having a particle size less than about 1.0 μm and about 45% by weight having a particle size greater than 3.0 μm.

7. A composition of claim 1 wherein the particle size distribution of said composition is such that at least about 40% by weight has a particle size less than about 1.0 μm and about 20% by weight has a particle size greater than 3.0 μm.

8. A composition of claim 1 wherein at least about 30% by weight of the composition has a particle size less than 0.8 μm and at least about 15% by weight of the composition has a particle size of greater than 4 μm.

9. A composition of claim 1 having a median particle size of from about 0.6 μm to about 1.3 μm.

10. A composition of claim 1 having a median particle size of from about 2 μm to about 10 μm.

11. A composition of claim 1 wherein said particle size distribution is bimodal.

12. A paint or coating composition comprising a composition according to claim 1.

13. A composition of claim 1, wherein said calcined kaolin is fully calcined.

14. A composition of claim 1, wherein said calcined kaolin is partially calcined.

15. A composition of claim 1, wherein said calcined kaolin comprises greater than or equal to about 2% (by weight) mullite.

16. A composition having characteristics suitable for use as a flattening agent and an opacifying agent in application paint or coating compositions comprising a kaolin-based pigment of at least two distinguishable components, including a fine calcined component and a coarse calcined component, wherein said kaolin-based pigment exhibits an 85° sheen of less than about 12, and an opacity of at least about 90, said fine calcined component and said coarse calcined component are present in a ratio sufficient to result in an oil absorption value greater than about 70 g. oil/100 g.

17. A composition of claim 16 which produces a dry paint film with a 60° gloss of less than about 4, an 85° sheen of less than about 12, an ASTM-E-313 whiteness of at least about 80, an opacity of at least about 90 when used as the sole pigment in an about 78% PVC, PVA latex-based paint formulation with a volume solids of about 13% and a weight solids of about 25% when applied as a wet film of about 3-mil thickness.

18. A composition of claim 16 which produces a dry paint film with a 60° gloss of less than about 4, an 85° sheen of less than about 12, a blue color (L value of about +73, a value of about −15, b value of about −24) when used as the sole pigment in an about 78% PVC, PVA latex-based paint formulation with a volume solids of about 13% and a weight solids of about 25% to which the equivalent of about 11 pounds by weight of phthalo blue dispersion has been added to 100 gallons of the formulation when applied as a wet film of about 3-mil thickness.

19. A method of preparing a composition comprising co-calcined kaolin, said composition having median diameter particle sizes of from about 0.5 µm to about 10 µm and a multimodal particle size distribution: said multimodal particle size distribution exhibiting, when measured using SEDIGRAPH 5100, at least two distinguishable components, at least one of said distinguishable components corresponding to a fine calcined component and occurring at a particle size less than about 1 µm, and at least one other of said distinguishable components corresponding to a coarse calcined component and occurring at a particle size greater than about 2 µm, wherein said fine calcined component and said coarse calcined component are present in a ratio sufficient to result in an oil absorption value greater than about 70 g. oil/100 g. clay, said method comprising:

(a) obtaining a coarse hydrous kaolin having a mean particle size greater than about 2 µm;
(b) obtaining a fine hydrous kaolin having a mean particle size less than about 1 µm;
(c) blending the coarse hydrous kaolin of (a) and the fine hydrous kaolin of (b); and
(d) calcining the blend of (c) to produce the pigment product.

20. A method of claim 19 wherein said calcination is by flash calcination.

21. A method of claim 19, wherein said calcination is by soak calcination.

22. A method of claim 19, wherein said calcining referred to in (d) renders said composition fully calcined.

23. A method of claim 19, wherein said calcining referred to in (d) renders said composition partially calcined.

24. A method of claim 19, wherein said calcining referred to in (d) gives rise to a calcined kaolin composition comprising greater than or equal to about 2% (by weight) mullite.

25. A method of claim 19, wherein said coarse fraction and said fine fraction is in flocculated form prior to blending.

26. A method of claim 19, wherein said coarse fraction is in dispersed form and said fine fraction is in flocculated form prior to blending.

27. A method of claim 19, wherein said coarse fraction and said fine fraction are in dispersed form prior to blending.

28. A method of claim 19, wherein said coarse fraction is in flocculated form and said fine fraction is in dispersed form prior to blending.

29. A method as claimed in claim 19 wherein said coarse hydrous kaolin component constitutes from about 10% to about 90% by weight, and said fine hydrous kaolin component constitutes from about 90% to about 10% by weight, of the blend of the two components.

30. A method as claimed in claim 19 wherein said fine hydrous kaolin component constitutes from about 50% to about 70% by weight of the hydrous kaolin blend.

31. The method claim 19 wherein an additional amount of coarse or fine component is added to the final blend.

32. A composition comprising a blend of at least one calcined kaolin component and at least one calcined or hydrous kaolin component and having median diameter particle sizes of from about 0.5 µm to about 10 µm and a multimodal particle size distribution: said multimodal particle size distribution exhibiting, when measured using SEDIGRAPH 5100, at least two distinguishable components, at least one of said distinguishable components corresponding to a fine calcined or hydrous kaolin component and occurring at a particle size less than about 1.5 µm, and at least one other of said distinguishable components corresponding to a coarse calcined or hydrous component and occurring at a particle size greater than about 3 µm, wherein said fine calcined component and said coarse calcined component are present in a ratio sufficient to result in an oil absorption value greater than about 70 g. oil/100 g. clay.

33. A composition of claim 32, wherein said calcined kaolin is fully calcined.

34. A composition of claim 32, wherein said calcined kaolin is partially calcined.

35. A composition of claim 32, wherein said calcined kaolin comprises greater than or equal to about 2% (by weight) mullite.

36. A composition of claim 32 comprising about 10% to about 90% by weight fine component and from about 90% to about 10% by weight coarse component.

37. A composition of claim 32 comprising about 20% to about 80% by weight fine component and from about 80% to about 20% by weight coarse component.

38. A composition of claim 32 comprising about 65% by weight having a particle size less than about 1.0 µm and about 35% by weight having a particle size greater than 3.0 µm.

39. A composition of claim 32 comprising about 60% by weight having a particle size less than about 1.0 µm and about 40% by weight having a particle size greater than 3.0 µm.

40. A composition of claim 32 comprising about 55% by weight having a particle size less than about 1.0 µm and about 45% by weight having a particle size greater than 3.0 µm.

41. A composition of claim 32 wherein the particle size distribution of said composition is such that at least about 40% by weight has a particle size less than about 1.0 µm and about 20% by weight has a particle size greater than 3.0 µm.

42. A composition of claim 32 wherein at least about 30% by weight of the composition has a particle size less than 0.8 µm and at least about 15% by weight of the composition has a particle size of greater than 4 µm.

43. A composition of claim 32 having a median particle size of from about 0.6 µm to about 1.3 µm.

44. A composition of claim 32 wherein said particle size distribution is bimodal.

45. A paint or coating composition comprising a composition according to claim 32.

46. A method of preparing a composition comprising a blend of at least one calcined kaolin component and at least one calcined or hydrous kaolin component and having median diameter particle sizes of from about 0.5 μm to about 10 μm and a multimodal particle size distribution: said multimodal particle size distribution exhibiting, when measured using SEDIGRAPH 5100, at least two distinguishable components, at least one of said distinguishable components corresponding to a fine calcined or hydrous kaolin component and occurring at a particle size less than about 1.5 μm, and at least one other of said distinguishable components corresponding to a coarse calcined or hydrous component and occurring at a particle size greater than about 3 μm, wherein said fine calcined component and said coarse calcined component are present in a ratio sufficient to result in an oil absorption value greater than about 70 g. oil/100 g. clay, said method comprising:

(a) obtaining a coarse calcined or hydrous kaolin having a mean particle size greater than about 3 μm;

(b) obtaining a fine calcined or hydrous kaolin having a mean particle size less than about 1 μm; with the proviso that at least one of said components (a) or (b) comprise calcined kaolin, and (c) blending the coarse kaolin of (a) and the fine kaolin of (b) to produce the pigment product.

47. A method of claim 46, wherein said calcined kaolin comprises fully calcined kaolin.

48. A method of claim 46, wherein said calcined kaolin comprises partially calcined kaolin.

49. A method of claim 46, wherein said calcined kaolin comprises greater than or equal to about 2% (by weight) mullite.

50. A method according to claim 32 wherein the coarse calcined kaolin component constitutes from about 10% to about 90% by weight, and the fine calcined kaolin component constitutes from about 90% to about 10% by weight, of the blend of the two components.

51. A method as claimed in claim 50 wherein the fine calcined kaolin component constitutes from about 50% to about 70% by weight of the kaolin blend.

52. A matte paint composition comprising a polymeric binder, titanium dioxide and one or more other pigments or extenders, wherein said pigments or extenders comprise as a flatting agent pigment, a calcined kaolin pigment according to claim 1.

53. A matte paint composition comprising a polymeric binder, titanium dioxide and one or more other pigments or extenders, wherein said pigments or extenders comprise as a flatting agent pigment, a calcined kaolin pigment according to claim 32.

54. A composition as claimed in claim 52 wherein the composition is a water based composition and the binder comprises a water dispersible binder.

55. A composition as claimed in claim 54 wherein said composition further comprises one or more additives selected from wetting agents, surfactants, defoamers, thickeners, dispersants and coalescents.

* * * * *